US008954051B2

(12) United States Patent
Tinnakornsrisuphap et al.

(10) Patent No.: US 8,954,051 B2
(45) Date of Patent: Feb. 10, 2015

(54) UNIQUELY IDENTIFYING TARGET FEMTOCELL TO FACILITATE FEMTO-ASSISTED ACTIVE HAND-IN

(75) Inventors: Peerapol Tinnakornsrisuphap, San Diego, CA (US); Soumya Das, San Diego, CA (US); Ravindra Patwardhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 13/009,317

(22) Filed: Jan. 19, 2011

(65) Prior Publication Data

US 2011/0263242 A1    Oct. 27, 2011

Related U.S. Application Data

(60) Provisional application No. 61/327,445, filed on Apr. 23, 2010.

(51) Int. Cl.
*H04W 4/00*      (2009.01)
*H04W 36/04*    (2009.01)
(Continued)

(52) U.S. Cl.
CPC .......... *H04W 36/04* (2013.01); *H04W 36/0055* (2013.01); *H04W 84/045* (2013.01)
USPC ........................................ 455/422.1; 370/331

(58) Field of Classification Search
USPC ................. 455/422.1, 450; 370/331; 725/110
See application file for complete search history.

(56) References Cited

U.S. PATENT DOCUMENTS 6,574,266 B1    6/2003   Haartsen
6,768,726 B2    7/2004   Dorenbosch et al.
(Continued)

FOREIGN PATENT DOCUMENTS

GB    2444756 A       6/2008
JP    2001320755 A   11/2001
(Continued)

OTHER PUBLICATIONS

Anonymous: "Interoperability Specification (IOS) for Femtocell Access Points", 3GGP2 3GGP2 A.S0024-0 vl.O, Mar. 1, 2010, p. 64PP, XP002659293, Retrieved from the Internet: URL:http://www.3gpp2.org/publi  cjitml/specs  /A.S0024-0_vl.0_100302.pdf [retrieved on Sep. 16, 2011].
(Continued)

*Primary Examiner* — Myron K Wyche
(74) *Attorney, Agent, or Firm* — Jeffrey Jacobs

(57) ABSTRACT

Systems, methods, devices, and computer program products are described for supporting macrocell-to-femtocell hand-ins of active macro communications for mobile access terminals. An out-of-band (OOB) link is used to detect that an access terminal is in proximity of a femtocell (e.g., using an OOB radio integrated with the femtocell or in a common subnet with the femtocell). Having detected the access terminal in proximity to the femtocell, an OOB presence indication is communicated to a femto convergence system disposed in a core network in communication with the macro network to effectively pre-register the access terminal with the femto-convergence system. When the femto convergence system receives a handoff request from the macro network implicating the pre-registered access terminal, it is able to reliably determine the appropriate target femtocell to use for the hand-in according to the pre-registration, even where identification of the appropriate target femtocell would otherwise be unreliable.

37 Claims, 22 Drawing Sheets

(51) Int. Cl.
*H04W 36/00* (2009.01)
*H04W 84/04* (2009.01)

(56) References Cited

U.S. PATENT DOCUMENTS

| | | | |
|---|---|---|---|
| 7,925,259 | B2 | 4/2011 | Nylander et al. |
| 8,086,236 | B2 | 12/2011 | Wu |
| 8,102,825 | B2 | 1/2012 | Kalhan |
| 8,180,368 | B2 | 5/2012 | Anderson et al. |
| 8,185,116 | B2 | 5/2012 | Wu |
| 8,204,481 | B2 | 6/2012 | Kone |
| 2005/0111409 | A1 | 5/2005 | Spear et al. |
| 2005/0186948 | A1 | 8/2005 | Gallagher et al. |
| 2006/0148485 | A1 | 7/2006 | Kangas et al. |
| 2006/0258323 | A1 | 11/2006 | Hara et al. |
| 2007/0037578 | A1 | 2/2007 | Besterman |
| 2008/0076386 | A1 | 3/2008 | Khetawat et al. |
| 2008/0076411 | A1 | 3/2008 | Khetawat et al. |
| 2008/0305801 | A1 | 12/2008 | Burgess et al. |
| 2009/0040972 | A1 | 2/2009 | Robson et al. |
| 2009/0044239 | A1* | 2/2009 | Cha .................. 725/110 |
| 2009/0082020 | A1 | 3/2009 | Ch'ng et al. |
| 2009/0092097 | A1 | 4/2009 | Nylander et al. |
| 2009/0098873 | A1 | 4/2009 | Gogic |
| 2009/0124235 | A1 | 5/2009 | Bosch et al. |
| 2009/0129341 | A1* | 5/2009 | Balasubramanian et al. 370/331 |
| 2009/0156213 | A1 | 6/2009 | Spinelli et al. |
| 2009/0163216 | A1* | 6/2009 | Hoang et al. .......... 455/450 |
| 2009/0186615 | A1 | 7/2009 | Kwon et al. |
| 2009/0196253 | A1 | 8/2009 | Semper |
| 2009/0207805 | A1 | 8/2009 | Zou |
| 2009/0219888 | A1 | 9/2009 | Chen et al. |
| 2009/0247170 | A1 | 10/2009 | Balasubramanian et al. |
| 2009/0286510 | A1 | 11/2009 | Huber et al. |
| 2009/0310568 | A1 | 12/2009 | Chen et al. |
| 2009/0325583 | A1 | 12/2009 | Burgess et al. |
| 2010/0029278 | A1 | 2/2010 | Fang et al. |
| 2010/0056132 | A1 | 3/2010 | Gallagher |
| 2010/0056160 | A1 | 3/2010 | Kim et al. |
| 2010/0120398 | A1 | 5/2010 | Chang et al. |
| 2010/0124927 | A1 | 5/2010 | Eskicioglu et al. |
| 2010/0144371 | A1 | 6/2010 | Savoor |
| 2010/0240365 | A1 | 9/2010 | Chen |
| 2010/0273432 | A1 | 10/2010 | Meshkati et al. |
| 2010/0273471 | A1 | 10/2010 | Meshkati et al. |
| 2010/0273473 | A1 | 10/2010 | Meshkati et al. |
| 2010/0273481 | A1 | 10/2010 | Meshkati et al. |
| 2010/0304741 | A1 | 12/2010 | Gogic et al. |
| 2010/0315974 | A1 | 12/2010 | Richardson et al. |
| 2010/0330903 | A1 | 12/2010 | Chabrerie |
| 2011/0085564 | A1 | 4/2011 | Taylor et al. |
| 2011/0170481 | A1 | 7/2011 | Gomes et al. |
| 2011/0171915 | A1 | 7/2011 | Gomes et al. |
| 2011/0189998 | A1 | 8/2011 | Joo et al. |
| 2011/0237269 | A1 | 9/2011 | Chen |
| 2011/0263258 | A1 | 10/2011 | Soliman et al. |
| 2012/0014267 | A1 | 1/2012 | Gomes et al. |
| 2012/0064903 | A1 | 3/2012 | Pani et al. |
| 2012/0083245 | A1 | 4/2012 | Adjakple et al. |
| 2012/0083280 | A1 | 4/2012 | Liu et al. |
| 2012/0094663 | A1 | 4/2012 | Awoniyi et al. |
| 2012/0094665 | A1 | 4/2012 | Soliman et al. |
| 2012/0094666 | A1 | 4/2012 | Awoniyi et al. |
| 2012/0106349 | A1 | 5/2012 | Adjakple et al. |
| 2012/0108234 | A1 | 5/2012 | Bao et al. |
| 2012/0115474 | A1 | 5/2012 | Lee et al. |
| 2012/0149362 | A1 | 6/2012 | Tooher et al. |
| 2012/0252435 | A1 | 10/2012 | Bienas et al. |
| 2012/0263145 | A1 | 10/2012 | Marinier et al. |
| 2012/0269095 | A1 | 10/2012 | Dalsgaard et al. |
| 2012/0322466 | A1 | 12/2012 | Das et al. |
| 2013/0003698 | A1 | 1/2013 | Olvera-Hernandez et al. |
| 2013/0017820 | A1 | 1/2013 | Drazynski et al. |

FOREIGN PATENT DOCUMENTS

| | | |
|---|---|---|
| JP | 2006319878 A | 11/2006 |
| JP | 2009302977 A | 12/2009 |
| JP | 2010147682 A | 7/2010 |
| JP | 2011528540 A | 11/2011 |
| WO | WO2008055251 | 5/2008 |
| WO | WO2008088592 | 7/2008 |
| WO | WO2009120902 A1 | 10/2009 |
| WO | WO2009139675 A1 | 11/2009 |
| WO | WO2010009162 A1 | 1/2010 |
| WO | WO2011020481 A1 | 2/2011 |
| WO | WO2011028954 A1 | 3/2011 |
| WO | WO-2011093531 A1 | 8/2011 |

OTHER PUBLICATIONS

Anonymous: "Interoperability Specification (IOS) for Femtocell Access Points", 3GPP2 3GGP2 A.S0024-A vl.O, Apr. 1, 2011, p. 128PP, XP002650581, Retrieved from the Internet: URL:http://www.3gpp2.org/public html/specs /A.S0024-A%20vl.0%20Femto%20IOS-Pub 201104 .pdf [retrieved on Jul. 15, 2011].
International Search Report and Written Opinion—PCT/US2011/033656, ISA/EPO—Oct. 7, 2011.
Tiedemann E G: "Femtocell Activities in 3GPP2 TSG-C", 3rd Generation Mar. 1, 2011 Partnership Project (3GPP); Technicalspecification Group (TSG).
Radio Access Network (RAN); Working Group 2 (WG2), XX, XX Mar. 31, 2009, pp. 1-18, XP002599307, Retrieved from the Internet : URL:fftp://ftp.3gpp2.org/TSGX/Working/2009 /2009-03-New%200rleans/A11%20TSG%20Femto%20Discussion/XS1-20090331-004 - TSG-C Femto%200 Overview-090330.p [retrieved on Sep. 2, 2010].
Airvana, QUALCOMM: "Active Call Hand-in in cdma2000 1x", A20-20081027-008r0, 3GPP2, Oct. 27, 2008, pp. 7.
Telefonica: "Dynamic H(e)NB Switching by Means of a Low Power Radio Interface for Energy Savings and Interference Reduction", R3-110030,3GPP,Jan. 21, 2011,pp. 1-5.

* cited by examiner

UNIQUELY IDENTIFYING TARGET FEMTOCELL TO FACILITATE FEMTO-ASSISTED ACTIVE HAND-IN

CROSS-REFERENCES TO RELATED APPLICATIONS

This application claims priority from co-pending U.S. Provisional Patent Application No. 61/327,445 filed Apr. 23, 2010, entitled "METHOD FOR UNIQUELY IDENTIFYING TARGET FEMOCELL TO FACILITATE FAP ASSISTED ACTIVE HAND-IN", which is hereby incorporated by reference, as if set forth in full in this document, for all purposes.

BACKGROUND

Information communication provided by various forms of networks is in wide use in the world today. Networks having multiple nodes in communication using wireless and wireline links are used, for example, to carry voice and/or data. The nodes of such networks may be computers, personal digital assistants (PDAs), phones, servers, routers, switches, multiplexers, modems, radios, access points, base stations, etc. Many client device nodes (also referred to as user equipment (UE) or access terminals (ATs)), such as cellular phones, PDAs, laptop computers, etc. are mobile and thus may connect with a network through a number of different interfaces.

Mobile client devices may connect with a network wirelessly via a base station, access point, wireless router, etc. (collectively referred to herein as access points). A mobile client device may remain within the service area of such an access point for a relatively long period of time (referred to as being "camped on" the access point) or may travel relatively rapidly through access point service areas, with cellular handoff or reselection techniques being used for maintaining a communication session or for idle mode operation as association with access points is changed.

Issues with respect to available spectrum, bandwidth, capacity, etc. may result in a network interface being unavailable or inadequate between a particular client device and access point. Moreover, issues with respect to wireless signal propagation, such as shadowing, multipath fading, interference, etc., may result in a network interface being unavailable or inadequate between a particular client device and access point.

Cellular networks have employed the use of various cell types, such as macrocells, microcells, picocells, and femtocells, to provide desired bandwidth, capacity, and wireless communication coverage within service areas. For example, the use of femtocells is often desirable to provide wireless communication in areas of poor network coverage (e.g., inside of buildings), to provide increased network capacity, to utilize broadband network capacity for backhaul, etc.

SUMMARY

The present disclosure is directed to systems and methods for supporting macrocell-to-femtocell hand-ins of active macro communications for mobile access terminals. A femtocell detects an access terminal in its proximity (e.g., using an out-of-band link established by an out-of-band radio integrated with the femtocell as part of a femto-proxy system). Having detected the access terminal in its proximity, the femtocell communicates an OOB presence indicator to pre-register the access terminal with a femto convergence system (e.g., a femto convergence server or other type of interface gateway) disposed in a core network in communication with the macro network. When the femto convergence system receives a handoff request from the macro network implicating the pre-registered access terminal, the femto convergence system is able to reliably determine the appropriate femtocell to use for the hand-in according to the OOB presence indication.

An exemplary method for macrocell-to-femtocell hand-in includes: detecting, with a femto-proxy system, an access terminal in proximity to the femto-proxy system and communicatively coupled with a macro network via a macrocell, the femto-proxy system including an out-of-band (OOB) femto-proxy and a femtocell communicatively coupled with the macro network via a femto convergence system; detecting an OOB identifier corresponding to the access terminal using the OOB femto-proxy over an OOB communications link; determining a cell identifier identifying the access terminal on the macro network according to a mapping between the OOB identifier and the cell identifier; and registering the access terminal for hand-in from the macrocell to the femtocell by communicating an OOB presence indication from the femtocell to the femto convergence system indicating proximity of the access terminal to the femtocell.

According to some such methods, detecting the access terminal in proximity to the femto-proxy system includes: paging the access terminal using the OOB femto-proxy over the OOB communications link; and detecting a response to the paging from the access terminal using the OOB femto-proxy over the OOB communications link, the response including the OOB identifier of the access terminal. Also or alternatively, detecting the access terminal in proximity to the femto-proxy system includes: receiving a request for a network address from the access terminal using the OOB femto-proxy over the OOB communications link, the request including the OOB identifier of the access terminal, the OOB femto-proxy disposed as part of a subnet including the femtocell; and communicating the request for the network address to the femtocell. For example, the request for the network address is a Dynamic Host Configuration Protocol (DHCP) request; the OOB identifier of the access terminal is a MAC address; and communicating the request for the network address to the femtocell includes broadcasting the DHCP request to the subnet such that the request is received at least by the femtocell.

According to other such methods, determining the cell identifier includes using the femto-proxy system to determine the cell identifier according to the mapping between the OOB identifier and the cell identifier, the mapping being maintained at the femto-proxy system; and communicating the OOB presence indication includes communicating the cell identifier of the access terminal as part of the OOB presence indication. Also or alternatively, determining the cell identifier includes using the femto convergence system to determine the cell identifier according to the mapping between the OOB identifier and the cell identifier, the mapping being maintained at the femto convergence system; and communicating the OOB presence indication includes communicating the OOB identifier of the access terminal as part of the OOB presence indication.

In some embodiments, the method further includes determining, with the femto-proxy system, whether the access terminal is authorized to access the macro network via the femtocell, wherein the detecting the OOB identifier step is performed only when the access terminal is authorized to access the macro network via the femtocell. For example, the method may further include maintaining an access control list at the femto-proxy system including a list of cell identifiers corresponding to access terminals authorized to access the macro network via the femtocell, wherein determining whether the access terminal is authorized to access the macro network via the femtocell includes determining whether the access terminal is authorized to access the macro network via the femtocell according to the access control list.

Some such methods further include receiving a handoff request for the access terminal at the femtocell from the femto convergence system, the handoff request being: configured to direct the access terminal to hand off active communications with the macro network from the macrocell to the femtocell; generated by the macro network according to a measurement message received from the access terminal via the macrocell; and communicated from the macro network to the femtocell via the femto convergence system according to the registering of the access terminal. For example, the handoff request is received subsequent to registering the access terminal for hand-in from the macrocell to the femtocell. Alternatively, the handoff request is received prior to registering the access terminal for hand-in from the macrocell to the femtocell; and detecting the access terminal includes detecting the access terminal in response to receiving the handoff request. For example, detecting the access terminal in response to receiving the handoff request includes directing the OOB femto-proxy to detect the access terminal over the OOB communications link according to its OOB identifier (e.g., using reverse link sensing to detect the access terminal according to a fixed public identifier of the access terminal and/or using reverse link sensing to detect the access terminal according to a fixed public identifier of the access terminal, wherein the mapping maintained at the femto-proxy system is further between the OOB identifier, the cell identifier, and the fixed public identifier of the access terminal).

Also or alternatively, the method may include detecting a loss of the OOB communications link between the access terminal and the OOB femto-proxy of the femto-proxy system; and de-registering the access terminal according to detecting the loss of the OOB communications link. In some embodiments, the OOB presence indication includes a timestamp corresponding to a registration time. Further, in some embodiments, detecting, with the femto-proxy system, the access terminal in proximity to the femto-proxy system includes detecting an OOB subsystem of the access terminal using the OOB femto-proxy of the femto-proxy system over the OOB communications link.

An exemplary femto-proxy system includes a femtocell, communicatively coupled with a macro network via a femto convergence system and configured to provide macro network access to access terminals; an out-of-band (OOB) femto-proxy, communicatively coupled with the femtocell and configured to communicate with the access terminals over an OOB communications link; and a communications management subsystem, communicatively coupled with the femtocell and the OOB femto-proxy, and configured to: detect a proximate access terminal that is in its proximity and communicatively coupled with the macro network via a macrocell; detect the OOB identifier of the proximate access terminal using the OOB femto-proxy over the OOB communications link; and register the proximate access terminal for hand-in from the macrocell to the femtocell by communicating an OOB presence indication from the femtocell to the femto convergence system indicating proximity of the proximate access terminal to the femtocell.

Some such femto-proxy systems further include: a data store, configured to maintain a mapping, for each of a number of authorized access terminals, between an OOB identifier and a cell identifier corresponding to the authorized access terminal, the proximate access terminal being one of the authorized access terminals, wherein the communications management subsystem is further configured to determine the cell identifier of the proximate access terminal according to the mapping maintained at the data store, and communicating an OOB presence indication includes communicating the cell identifier of the access terminal to the femto convergence system.

An exemplary processor for macrocell-to-femtocell hand-in in a femto-proxy system having a femtocell communicatively coupled with a macro network via a femto convergence system, and an out-of-band (OOB) femto-proxy configured to communicate over an OOB communications link, includes: a communications management controller configured to: detect a proximate access terminal that is in its proximity and communicatively coupled with the macro network via a macrocell; detect the OOB identifier of the proximate access terminal using the OOB femto-proxy over the OOB communications link; and register the proximate access terminal for hand-in from the macrocell to the femtocell by communicating an OOB presence indication from the femtocell to the femto convergence system indicating proximity of the proximate access terminal to the femtocell.

Some such processors further include a mapping controller in communication with a data store configured to maintain a mapping, for each of a number of authorized access terminals, between an OOB identifier and a cell identifier corresponding to the authorized access terminal, the proximate access terminal being one of the authorized access terminals, the mapping controller configured to determine the cell identifier of the proximate access terminal according to the mapping, wherein communicating an OOB presence indication includes communicating the cell identifier of the proximate access terminal to the femto convergence system.

An exemplary computer program product residing on a processor-readable medium and having processor-readable instructions, which, when executed, causes a processor to perform steps including: detecting an access terminal in proximity to a femto-proxy system and communicatively coupled with a macro network via a macrocell, the femto-proxy system including an out-of-band (OOB) femto-proxy and a femtocell communicatively coupled with the macro network via a femto convergence system; directing the OOB femto-proxy to detect an OOB identifier corresponding to the access terminal over an OOB communications link; directing the femtocell to register the access terminal for hand-in from the macrocell to the femtocell by communicating an OOB presence indication from the femtocell to the femto convergence system indicating proximity of the access terminal to the femtocell.

According to some such computer program products, the processor-readable instructions, when executed, cause the processor to perform steps further including: maintaining, at a data store in communication with the processor, a mapping, for each of a number of authorized access terminals, between an OOB identifier and a cell identifier corresponding to the authorized access terminal, the access terminal being one of the authorized access terminals; determining the cell identifier of the proximate access terminal according to the mapping, wherein communicating an OOB presence indication includes communicating the cell identifier of the access terminal to the femto convergence system.

Another exemplary system for macrocell-to-femtocell hand-in includes: means for detecting an access terminal in proximity to a femto-proxy system and communicatively coupled with a macro network via a macrocell, the femto-proxy system including an out-of-band (OOB) femto-proxy and a femtocell communicatively coupled with the macro network via a femto convergence system; means for directing the OOB femto-proxy to detect an OOB identifier corresponding to the access terminal over an OOB communications link; means for directing the femtocell to register the access terminal for hand-in from the macrocell to the femtocell by communicating an OOB presence indication from the femtocell to the femto convergence system indicating proximity of the access terminal to the femtocell.

Some such systems further include: means for maintaining a mapping, for each of a number of authorized access terminals, between an OOB identifier and a cell identifier corresponding to the authorized access terminal, the access terminal being one of the authorized access terminals; determining the cell identifier of the proximate access terminal according to the mapping, wherein communicating an OOB presence indication includes communicating the cell identifier of the access terminal to the femto convergence system.

Another exemplary method for macrocell-to-femtocell hand-in includes: receiving, at a femto convergence system from a macro network, a handoff request configured to direct an access terminal to hand off active communications with a macro network from a macrocell to a designated femtocell, the designated femtocell being one of a number of femtocells in communication with the macro network via the femto convergence system, each being addressable by the macro network according to a first femtocell identifier and addressable by the femto convergence system according to a second identifier, the handoff request including a cell identifier of the access terminal and the first femtocell identifier of the designated femtocell; determining, with the femto convergence system, whether any of the number of femtocells registered the access terminal prior to receiving the handoff request; when a registering femtocell of the number of femtocells registered the access terminal prior to receiving the handoff request, determining that the designated femtocell is the registering femtocell; and when none of the number of femtocells registered the access terminal prior to receiving the handoff request: determining a set of candidate femtocells from the number of femtocells according to the first femtocell identifier received as part of the handoff request; directing each of the set of candidate femtocells to detect the access terminal in its proximity; receiving an indication from a successful femtocell of the candidate femtocells that the access terminal is in its proximity; and determining that the designated femtocell is the successful femtocell; and communicating the handoff request from the femto convergence system to the designated femtocell according to its second femtocell identifier.

An exemplary femto convergence system includes: a macro interface subsystem communicatively coupled with a core node of a macro network and configured to receive communications from the macro network; a femto interface subsystem communicatively coupled with a number of femtocells configured as part of the macro network, each femtocell being addressable by the macro network according to a first femtocell identifier and addressable by the femto interface subsystem according to a second identifier; and a communications management subsystem, communicatively coupled with the macro interface subsystem and the femto interface subsystem, and configured to: receive a handoff request from a macro network configured to direct an access terminal to hand off active communications with a macro network from a macrocell to a designated femtocell of the number of femtocells, the handoff request including a cell identifier of the access terminal and the first femtocell identifier of the designated femtocell; determine whether any of the number of femtocells registered the access terminal prior to receiving the handoff request; when a registering femtocell of the number of femtocells registered the access terminal prior to receiving the handoff request, determine that the designated femtocell is the registering femtocell; and when none of the number of femtocells registered the access terminal prior to receiving the handoff request: determine a set of candidate femtocells from the number of femtocells according to the first femtocell identifier received as part of the handoff request; direct each of the set of candidate femtocells to detect the access terminal in its proximity; receive an indication from a successful femtocell of the candidate femtocells that the access terminal is in its proximity; and determine that the designated femtocell is the successful femtocell; and communicate the handoff request from the femto convergence system to the designated femtocell according to its second femtocell identifier.

An exemplary processor for macrocell-to-femtocell hand-in in a femto convergence system, the femto convergence system including a macro interface subsystem communicatively coupled with a core node of a macro network and configured to receive communications from the macro network, and the femto convergence system including a femto interface subsystem communicatively coupled with a number of femtocells configured as part of the macro network, each femtocell being addressable by the macro network according to a first femtocell identifier and addressable by the femto interface subsystem according to a second identifier, includes: a communications management controller configured to: receive a handoff request from a macro network configured to direct an access terminal to handoff active communications with a macro network from a macrocell to a designated femtocell of the number of femtocells, the handoff request including a cell identifier of the access terminal and the first femtocell identifier of the designated femtocell; determine whether any of the number of femtocells registered the access terminal prior to receiving the handoff request; when a registering femtocell of the number of femtocells registered the access terminal prior to receiving the handoff request, determine that the designated femtocell is the registering femtocell; and when none of the number of femtocells registered the access terminal prior to receiving the handoff request: determine a set of candidate femtocells from the number of femtocells according to the first femtocell identifier received as part of the handoff request; direct each of the set of candidate femtocells to detect the access terminal in its proximity; receive an indication from a successful femtocell of the candidate femtocells that the access terminal is in its proximity; and determine that the designated femtocell is the successful femtocell; and direct communication of the handoff request from the femto convergence system to the successful femtocell according to its second femtocell identifier.

An exemplary computer program product residing on a processor-readable medium disposed at a femto convergence system and including processor-readable instructions, which, when executed, causes a processor to perform steps including: receiving, from a macro network, a handoff request configured to direct the access terminal to hand off active communications with a macro network from a macrocell to a designated femtocell, the designated femtocell being one of a number of femtocells in communication with the macro network via the femto convergence system, each being addressable by the macro network according to a first femtocell identifier and addressable by the femto convergence system according to a second identifier, the handoff request including a cell identifier of the access terminal and the first femtocell identifier of the designated femtocell; determining whether any of the number of femtocells registered the access terminal prior to receiving the handoff request; when a registering femtocell of the number of femtocells registered the access terminal prior to receiving the handoff request, determining that the designated femtocell is the registering femtocell; and when none of the number of femtocells registered the access terminal prior to receiving the handoff request: determining a set of candidate femtocells from the number of femtocells according to the first femtocell identifier received as part of the handoff request; directing each of the set of candidate femtocells to detect the access terminal in its proximity; receiving an indication from a successful femtocell of the candidate femtocells that the access terminal is in its proximity; and determining that the designated femtocell is the successful femtocell; and directing communication of the handoff request from the femto convergence system to the designated femtocell according to its second femtocell identifier.

Another exemplary system for macrocell-to-femtocell hand-in includes: means for receiving, at a femto convergence system from a macro network, a handoff request configured to direct an access terminal to hand off active communications with a macro network from a macrocell to a designated femtocell, the designated femtocell being one of a number of femtocells in communication with the macro network via the femto convergence system, each being addressable by the macro network according to a first femtocell identifier and addressable by the femto convergence system according to a second identifier, the handoff request including a cell identifier of the access terminal and the first femtocell identifier of the designated femtocell; means for determining, with the femto convergence system, whether any of the number of femtocells registered the access terminal prior to receiving the handoff request; means for determining that the designated femtocell is the registering femtocell when a registering femtocell of the number of femtocells registered the access terminal prior to receiving the handoff request; and when none of the number of femtocells registered the access terminal prior to receiving the handoff request: means for determining a set of candidate femtocells from the number of femtocells according to the first femtocell identifier received as part of the handoff request; means for directing each of the set of candidate femtocells to detect the access terminal in its proximity; means for receiving an indication from a successful femtocell of the candidate femtocells that the access terminal is in its proximity; means for determining that the designated femtocell is the successful femtocell; and means for communicating the handoff request from the femto convergence system to the designated femtocell according to its second femtocell identifier.

Another exemplary method for macrocell-to-femtocell hand-in includes: receiving, at a femto convergence system from a registering femtocell, an OOB presence indication to register an access terminal detected by the registering femtocell to be in proximity to the registering femtocell, the registering femtocell being one of a number of femtocells in communication with the macro network via the femto convergence system, each being addressable by the macro network according to a first femtocell identifier and addressable by the femto convergence system according to a second identifier; determining whether a handoff request is received at the femto convergence system directing handoff of the access terminal from a macrocell to a designated femtocell of the number of femtocells; when the handoff request is received at the femto convergence system subsequent to receiving the OOB presence indication, determining that the designated femtocell is the registering femtocell, and communicating the handoff request from the femto convergence system to the registering femtocell according to its second femtocell identifier; and de-registering the access terminal at the femto convergence system when a de-registration condition occurs subsequent to receiving the OOB presence indication and prior to receiving any handoff request implicating the access terminal.

Another exemplary femto convergence system includes: a macro interface subsystem communicatively coupled with a core node of a macro network and configured to receive communications from the macro network; a femto interface subsystem communicatively coupled with a number of femtocells configured as part of the macro network, each femtocell being addressable by the macro network according to a first femtocell identifier and addressable by the femto interface subsystem according to a second identifier; and a communications management subsystem, communicatively coupled with the macro interface subsystem and the femto interface subsystem, and configured to: receive, from a registering femtocell of the number of femtocells via the femto interface subsystem, an OOB presence indication to register a cell identifier of an access terminal detected by the registering femtocell to be in proximity of the registering femtocell; when a handoff request directing handoff of the access terminal from a macrocell to a designated femtocell of the number of femtocells is received from the core node via the macro interface subsystem subsequent to receiving the OOB presence indication from the registering femtocell via the femto interface subsystem, determine that the designated femtocell is the registering femtocell, and communicating the handoff request via the femto interface subsystem to the registering femtocell according to its second femtocell identifier; and de-register the access terminal when a de-registration condition occurs subsequent to receiving the OOB presence indication and prior to receiving any handoff request implicating the access terminal.

Another exemplary processor for macrocell-to-femtocell hand-in in a femto convergence system, the femto convergence system including a macro interface subsystem communicatively coupled with a core node of a macro network and configured to receive communications from the macro network, and the femto convergence system including a femto interface subsystem communicatively coupled with a number of femtocells configured as part of the macro network, each femtocell being addressable by the macro network according to a first femtocell identifier and addressable by the femto interface subsystem according to a second identifier, includes: a communications management controller configured to: receive, from a registering femtocell of the number of femtocells via the femto interface subsystem, an OOB presence indication to register a cell identifier of an access terminal detected by the registering femtocell to be in proximity of the registering femtocell; when a handoff request directing handoff of the access terminal from a macrocell to a designated femtocell of the number of femtocells is received from the core node via the macro interface subsystem subsequent to receiving the OOB presence indication from the registering femtocell via the femto interface subsystem, determine that the designated femtocell is the registering femtocell, and communicating the handoff request via the femto interface subsystem to the registering femtocell according to its second femtocell identifier; and de-register the access terminal when a de-registration condition occurs subsequent to receiving the OOB presence indication and prior to receiving any handoff request implicating the access terminal.

Another exemplary computer program product residing on a processor-readable medium disposed at a femto convergence system and including processor-readable instructions, when executed, causes a processor to perform steps including: receiving, from a registering femtocell, an OOB presence indication to register a cell identifier of an access terminal detected by the registering femtocell to be in proximity to the registering femtocell, the registering femtocell being one of a number of femtocells in communication with the macro network via the femto convergence system, each being addressable by the macro network according to a first femtocell identifier and addressable by the femto convergence system according to a second identifier; when a handoff request directing handoff of the access terminal from a macrocell to a designated femtocell of the number of femtocells is received at the femto convergence system subsequent to receiving the OOB presence indication, determining that the designated femtocell is the registering femtocell, and communicating the handoff request from the femto convergence system to the registering femtocell according to its second femtocell identifier; and de-registering the access terminal at the femto convergence system when a de-registration condition occurs subsequent to receiving the OOB presence indication and prior to receiving any handoff request implicating the access terminal.

Another exemplary system for macrocell-to-femtocell hand-in includes: means for receiving, at a femto convergence system from a registering femtocell, an OOB presence indication to register a cell identifier of an access terminal detected by the registering femtocell to be in proximity to the registering femtocell, the registering femtocell being one of a number of femtocells in communication with the macro network via the femto convergence system, each being addressable by the macro network according to a first femtocell identifier and addressable by the femto convergence system according to a second identifier; when a handoff request directing handoff of the access terminal from a macrocell to a designated femtocell of the number of femtocells is received at the femto convergence system subsequent to receiving the OOB presence indication: means for determining that the designated femtocell is the registering femtocell; and means for communicating the handoff request from the femto convergence system to the registering femtocell according to its second femtocell identifier; and means for de-registering the access terminal at the femto convergence system when a de-registration condition occurs subsequent to receiving the OOB presence indication and prior to receiving any handoff request implicating the access terminal.

The foregoing has outlined rather broadly the features and technical advantages of examples according to disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of examples provided by the disclosure may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
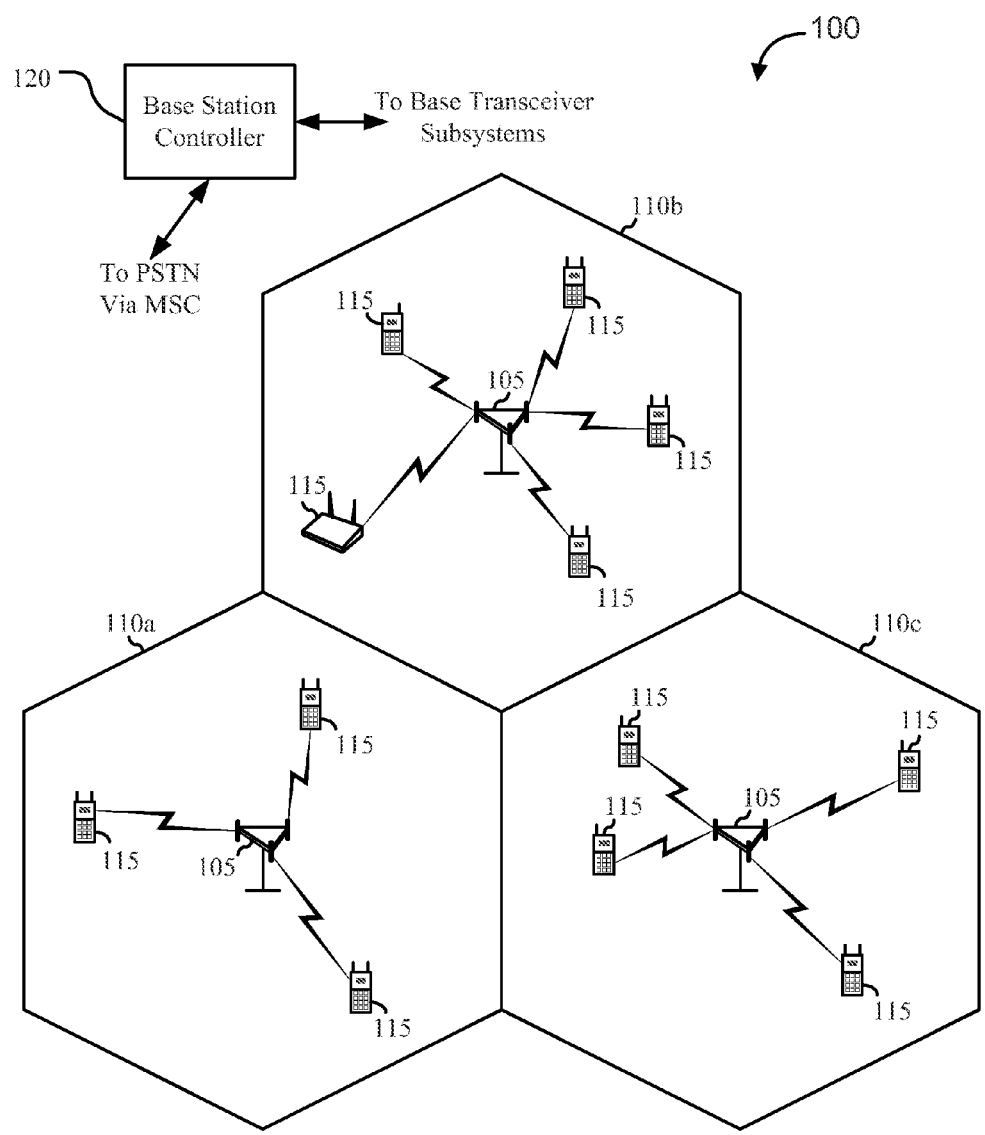
FIG. 1 shows a block diagram of a wireless communications system.

Embodiments are described for supporting macrocell-to-femtocell hand-ins of active macro communications for mobile access terminals. A femtocell detects an access terminal in its proximity (e.g., using an out-of-band link established by an out-of-band radio integrated with the femtocell as part of a femto-proxy system). Having detected the access terminal in its proximity, the femtocell communicates an OOB presence indicator to pre-register the access terminal with a femto convergence system (e.g., a femto convergence server or other type of interface gateway) disposed in a core network in communication with the macro network. When the femto convergence system receives a handoff request from the macro network implicating the pre-registered access terminal, the femto convergence system is able to reliably determine the appropriate femtocell to use for the hand-in according to the OOB presence indication.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above, as well as for other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various operations may be added, omitted, or combined. Also, features described with respect to certain examples may be combined in other examples.

Referring first to FIG. 1, a block diagram illustrates an example of a wireless communications system 100. The system 100 includes base transceiver stations (BTSs) 105, disposed in cells 110, mobile access terminals 115 (ATs), and a base station controller (BSC) 120. It is worth noting that terminology like access terminal (AT), mobile station (MS), and others are used interchangeably herein and are not intended to imply a particular network topology or implementation. For example, while the "AT" terminology may typically be used for circuit switched (e.g., CDMA 1X) networks, and the "MS" terminology may typically be used for packet data service (e.g., EV-DO, HRPD) networks, the techniques described herein may be applied in the context of any of these or other networks.

The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc. The system 100 may be a multi-carrier LTE network capable of efficiently allocating network resources.

The BTSs 105 can wirelessly communicate with the ATs 115 via a base station antenna. The BTSs 105 are configured to communicate with the ATs 115 under the control of the BSC 120 via multiple carriers. Each of the BTSs 105 can provide communication coverage for a respective geographic area, here the cell 110-*a*, 110-*b*, or 110-*c*. The system 100 may include BTSs 105 of different types, e.g., macro, pico, and/or femto base stations.

The ATs 115 can be dispersed throughout the cells 110. The ATs 115 may be referred to as mobile stations, mobile devices, user equipment (UE), or subscriber units. The ATs 115 here include cellular phones and a wireless communication device, but can also include personal digital assistants (PDAs), other handheld devices, netbooks, notebook computers, etc.

For the discussion below, the ATs 115 operate on (are "camped" on) a macro or similar network facilitated by multiple "macro" BTSs 105. Each macro BTS 105 may cover a relatively large geographic area (e.g., several kilometers in radius) and may allow unrestricted access by terminals with service subscription. The ATs 115 are also registered to operate on at least one femto network facilitated by a "femto" or "home" BTS 105. It will be appreciated that, while the macro BTSs 105 may typically be deployed according to network planning (e.g., resulting in the illustrative hexagonal cells 110 shown in FIG. 1), a femto BTS 105 may typically be deployed by individual users (or user representatives) to create a localized femtocell. The localized femtocell does not typically follow the macro network planning architecture (e.g., the hexagonal cells), although it may be accounted for as part of various macro-level network planning and/or management decisions (e.g., load balancing, etc.).

The AT 115 may generally operate using an internal power supply, such as a small battery, to facilitate highly mobile operations. Strategic deployment of network devices, such as femtocells, can mitigate mobile device power consumption to some extent. For example, femtocells may be utilized to provide service within areas which might not otherwise experience adequate or even any service (e.g., due to capacity limitations, bandwidth limitations, signal fading, signal shadowing, etc.), thereby allowing client devices to reduce searching times, to reduce transmit power, to reduce transmit times, etc. Femtocells provide service within a relatively small service area (e.g., within a house or building). Accordingly, a client device is typically disposed near a femtocell when being served, often allowing the client device to communicate with reduced transmission power.

For example, the femto cell is implemented as a femto access point (FAP) located in a user premises, such as a residence, an office building, etc. The location may be chosen for maximum coverage (e.g., in a centralized location), to allow access to a global positioning satellite (GPS) signal (e.g., near a window), and/or in any other useful location. For the sake of clarity, the disclosure herein assumes that a set of ATs 115 are registered for (e.g., on a whitelist of) a single FAP that provides coverage over substantially an entire user premises. The "home" FAP provides the ATs 115 with access to communication services over the macro network. As used herein, the macro network is assumed to be a wireless wide-area network (WWAN). As such, terms terms like "macro network" and "WWAN network" are interchangeable. Similar techniques may be applied to other types of network environments without departing from the scope of the disclosure or claims.

In example configurations, the FAP is integrated with one or more out-of-band (OOB) proxies as a femto-proxy system. As used herein, "out-of-band," or "OOB," includes any type of communications that are out of band with respect to the WWAN link. For example, the OOB proxies and/or the ATs 115 may be configured to operate using Bluetooth (e.g., class 1, class 1.5, and/or class 2), ZigBee (e.g., according to the IEEE 802.15.4-2003 wireless standard), WiFi, and/or any other useful type of communications out of the macro network band. Notably, OOB integration with the FAP may provide a number of features, including, for example, reduced interference, lower power femto discovery, etc.

Further, the integration of OOB functionality with the FAP may allow the ATs 115 attached to the FAP to also be part of an OOB piconet. The piconet may facilitate enhanced FAP functionality, other communications services, power management functionality, and/or other features to the ATs 115. These and other features will be further appreciated from the description below.

Figure 2A:
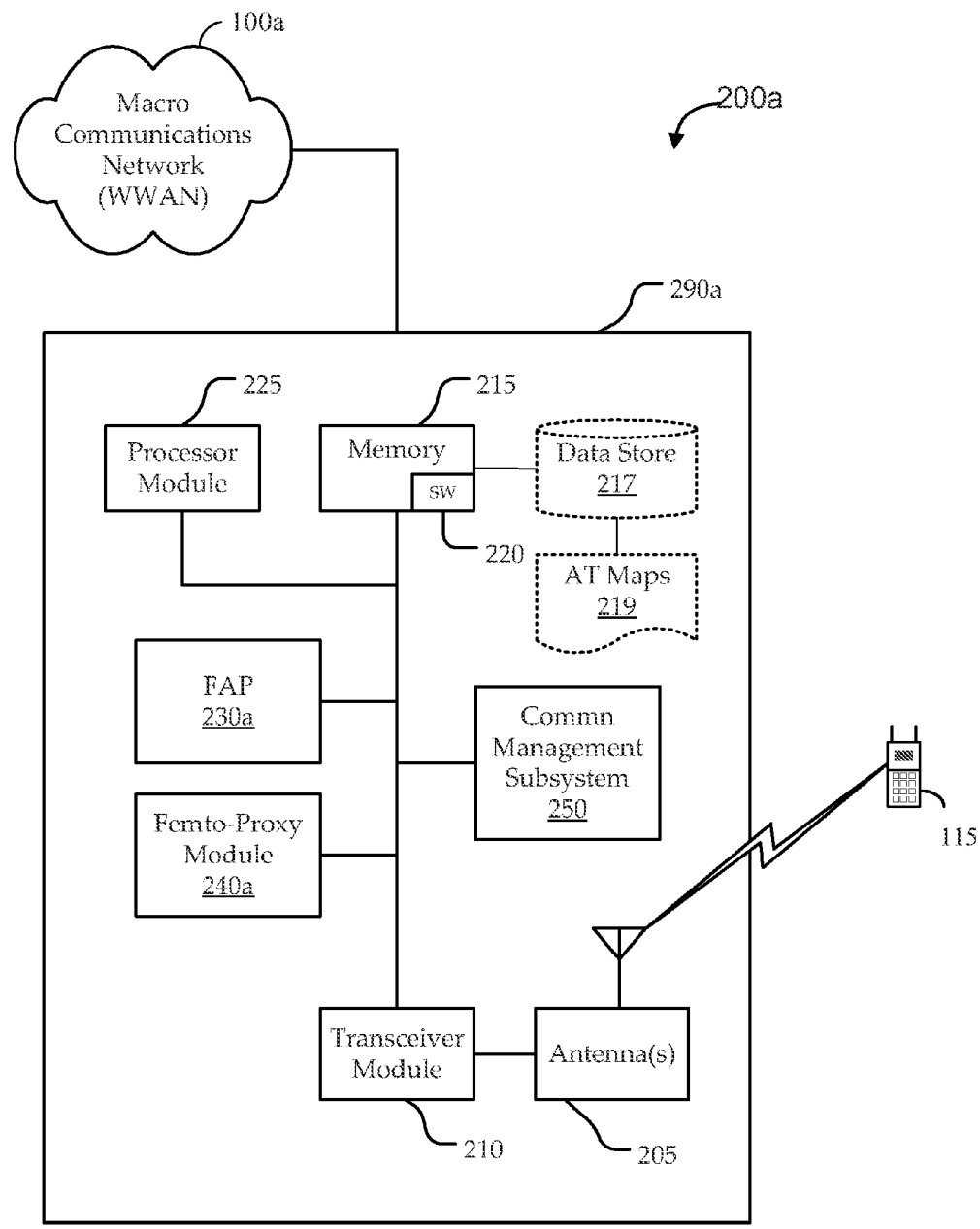
FIG. 2A shows a block diagram of an exemplary wireless communications system that includes a femto-proxy system.

FIG. 2A shows a block diagram of a wireless communications system 200a that includes a femto-proxy system 290a. The femto-proxy system 290a includes a femto-proxy module 240a, an FAP 230a, and a communications management subsystem 250. The FAP 230a may be a femto BTS 105, as described with reference to FIG. 1. The femto-proxy system 290a also includes antennas 205, a transceiver module 210, memory 215, and a processor module 225, which each may be in communication, directly or indirectly, with each other (e.g., over one or more buses). The transceiver module 210 is configured to communicate bi-directionally, via the antennas 205, with the ATs 115. The transceiver module 210 (and/or other components of the femto-proxy system 290a) is also configured to communicate bi-directionally with a macro communications network 100a (e.g., a WWAN). For example, the transceiver module 210 is configured to communicate with the macro communications network 100a via a backhaul network. The macro communications network 100a may be the communications system 100 of FIG. 1.

The memory 215 may include random access memory (RAM) and read-only memory (ROM). In some embodiments, the memory 215 includes (or is in communication with) a data store 217 configured to store AT mappings 219. As described more fully below, these AT mappings 219 are used to facilitate certain FAP-assisted hand-in functionality. Typically the AT mappings 219 map a cell identifier of each AT 115 (e.g., the International Mobile Subscriber Identity (IMSI) associated with the AT's 115 SIM card) with an OOB identifier corresponding to the AT's 115 OOB radio (e.g., the AT's 115 Bluetooth address). In certain embodiments, further mappings are maintained for each AT 115 by the AT mappings 219 including, for example, a public long code mask.

The memory 215 may also store computer-readable, computer-executable software code 220 containing instructions that are configured to, when executed, cause the processor module 225 to perform various functions described herein (e.g., call processing, database management, message routing, etc.). Alternatively, the software 220 may not be directly executable by the processor module 225 but be configured to cause the computer, e.g., when compiled and executed, to perform functions described herein.

The processor module 225 may include an intelligent hardware device, e.g., a central processing unit (CPU) such as those made by Intel® Corporation or AMD®, a microcontroller, an application specific integrated circuit (ASIC), etc. The processor module 225 may include a speech encoder (not shown) configured to receive audio via a microphone, convert the audio into packets (e.g., 30 ms in length) representative of the received audio, provide the audio packets to the transceiver module 210, and provide indications of whether a user is speaking. Alternatively, an encoder may only provide packets to the transceiver module 210, with the provision or withholding/suppression of the packet itself providing the indication of whether a user is speaking.

The transceiver module 210 may include a modem configured to modulate the packets and provide the modulated packets to the antennas 205 for transmission, and to demodulate packets received from the antennas 205. While some examples of the femto-proxy system 290a may include a single antenna 205, the femto-proxy system 290a preferably includes multiple antennas 205 for multiple links. For example, one or more links may be used to support macro communications with the ATs 115. Also, one or more out-of-band links may be supported by the same antenna 205 or different antennas 205.

Notably, the femto-proxy system 290a is configured to provide both FAP 230a and femto-proxy module 240a functionality. For example, when the AT 115 approaches the femtocell coverage area, the AT's 115 OOB radio may begin searching for the OOB femto-proxy module 240a. Upon discovery, the AT 115 may have a high level of confidence that it is in proximity to the femtocell coverage area, and a scan for the FAP 230a can commence.

The scan for the FAP 230a may be implemented in different ways. For example, due to the femto-proxy module 240a discovery by the AT's 115 OOB radio, both the AT 115 and the femto-proxy system 290a may be aware of each other's proximity. The AT 115 scans for the FAP 230a. Alternatively, the FAP 230a polls for the AT 115 (e.g., individually, or as part of a round-robin polling of all registered ATs 115), and the AT 115 listens for the poll. When the scan for the FAP 230a is successful, the AT 115 may attach to the FAP 230a.

When the AT 115 is in the femtocell coverage area and attached to the FAP 230a, the AT 115 may be in communication with the macro communications network 100a via the FAP 230a. As described above, the AT 115 may also be a slave of a piconet for which the femto-proxy module 240a acts as the master. For example, the piconet may operate using Bluetooth and may include Bluetooth communications links facilitated by a Bluetooth radio (e.g., implemented as part of the transceiver module 210) in the FAP 230a.

Examples of the FAP 230a have various configurations of base station or wireless access point equipment. As used herein, the FAP 230a may be a device that communicates with various terminals (e.g., client devices (ATs 115, etc.), proximity agent devices, etc.) and may also be referred to as, and include some or all the functionality of, a base station, a Node B, and/or other similar devices. Although referred to herein as the FAP 230a, the concepts herein are applicable to access point configurations other than femtocell configuration (e.g., picocells, microcells, etc.). Examples of the FAP 230a utilize communication frequencies and protocols native to a corresponding cellular network (e.g., the macro communications network 100a, or a portion thereof) to facilitate communication within a femtocell coverage area associated with the FAP 230a (e.g., to provide improved coverage of an area, to provide increased capacity, to provide increased bandwidth, etc.).

The FAP 230a may be in communication with other interfaces not explicitly shown in FIG. 2A. For example, the FAP 230a may be in communication with a native cellular interface as part of the transceiver module 210 (e.g., a specialized transceiver utilizing cellular network communication techniques that may consume relatively large amounts of power in operation) for communicating with various appropriately configured devices, such as the AT 115, through a native cellular wireless link (e.g., an "in band" communication link). Such a communication interface may operate according to various communication standards, including but not limited to wideband code division multiple access (W-CDMA), CDMA2000, global system for mobile telecommunication (GSM), worldwide interoperability for microwave access (WiMax), and wireless LAN (WLAN). Also or alternatively, the FAP 230a may be in communication with one or more backend network interfaces as part of the transceiver module 210 (e.g., a backhaul interface providing communication via the Internet, a packet switched network, a switched network, a radio network, a control network, a wired link, and/or the like) for communicating with various devices or other networks.

As described above, the FAP 230a may further be in communication with one or more OOB interfaces as part of the transceiver module 210 and/or the femto-proxy module 240a. For example, the OOB interfaces may include transceivers that consume relatively low amounts of power in operation and/or may cause less interference in the in-band spectrum with respect to the in-band transceivers. Such an OOB interface may be utilized according to embodiments to provide low power wireless communications with respect to various appropriately configured devices, such as an OOB radio of the AT 115. The OOB interface may, for example, provide a Bluetooth link, an ultra-wideband (UWB) link, an IEEE 802.11 (WLAN) link, etc.

The terms "high power" and "low power" as used herein are relative terms and do not imply a particular level of power consumption. Accordingly, OOB devices (e.g., OOB femto-proxy module 240a) may simply consume less power than native cellular interface (e.g., for macro WWAN communications) for a given time of operation. In some implementations, OOB interfaces also provide relatively lower bandwidth communications, relatively shorter range communication, and/or consume relatively lower power in comparison to the macro communications interfaces. There is no limitation that the OOB devices and interfaces be low power, short range, and/or low bandwidth. Devices may use any suitable out-of-band link, whether wireless or otherwise, such as IEEE 802.11, Bluetooth, PEANUT, UWB, ZigBee, an IP tunnel, a wired link, etc. Moreover, devices may utilize virtual OOB links, such as through use of IP based mechanisms over a wireless wide area network (WWAN) link (e.g., IP tunnel over a WWAN link) that act as a virtual OOB link.

Femto-proxy modules 240a may provide various types of OOB functionality and may be implemented in various ways. A femto-proxy module 240a may have any of various configurations, such as a stand-alone processor-based system, a processor-based system integrated with a host device (e.g., access point, gateway, router, switch, repeater, hub, concentrator, etc.), etc. For example, the femto-proxy modules 240a may include various types of interfaces for facilitating various types of communications.

Some femto-proxy modules 240a include one or more OOB interfaces as part of the transceiver module 210 (e.g., a transceiver that may consume relatively low amounts of power in operation and/or may cause less interference than in the in-band spectrum) for communicating with other appropriately configured devices (e.g., an AT 115) for providing interference mitigation and/or femtocell selection herein through a wireless link. One example of a suitable communication interface is a Bluetooth-compliant transceiver that uses a time-division duplex (TDD) scheme.

Femto-proxy modules 240a may also include one or more backend network interfaces as part of the transceiver module 210 (e.g., packet switched network interface, switched network interface, radio network interface, control network interface, a wired link, and/or the like) for communicating with various devices or networks. A femto-proxy module 240a that is integrated within a host device, such as with FAP 230a, may utilize an internal bus or other such communication interface in the alternative to a backend network interface to provide communications between the femto-proxy module 240a and other devices, if desired. Additionally or alternatively, other interfaces, such as OOB interfaces, native cellular interfaces, etc., may be utilized to provide communication between the femto-proxy module 240a and the FAP 230a and/or other devices or networks.

Various communications functions (e.g., including those of the FAP 230a and/or the femto-proxy module 240a) may be managed using the communications management subsystem 250. For example, the communications management subsystem 250 may at least partially handle communications with the macro (e.g., WWAN) network, one or more OOB networks (e.g., piconets, AT 115 OOB radios, other femto-proxies, OOB beacons, etc.), one or more other femtocells (e.g., FAPs 230), ATs 115, etc. For example, the communications management subsystem 250 may be a component of the femto-proxy system 290a in communication with some or all of the other components of the femto-proxy system 290a via a bus.

Various other architectures are possible other than those illustrated by FIG. 2A. The FAP 230a and femto-proxy module 240a may or may not be collocated, integrated into a single device, configured to share components, etc. For example, the femto-proxy system 290a of FIG. 2A has an integrated FAP 230a and femto-proxy module 240a that at least partially share components, including the antennas 205, the transceiver module 210, the memory 215, and the processor module 225.

Figure 2B:
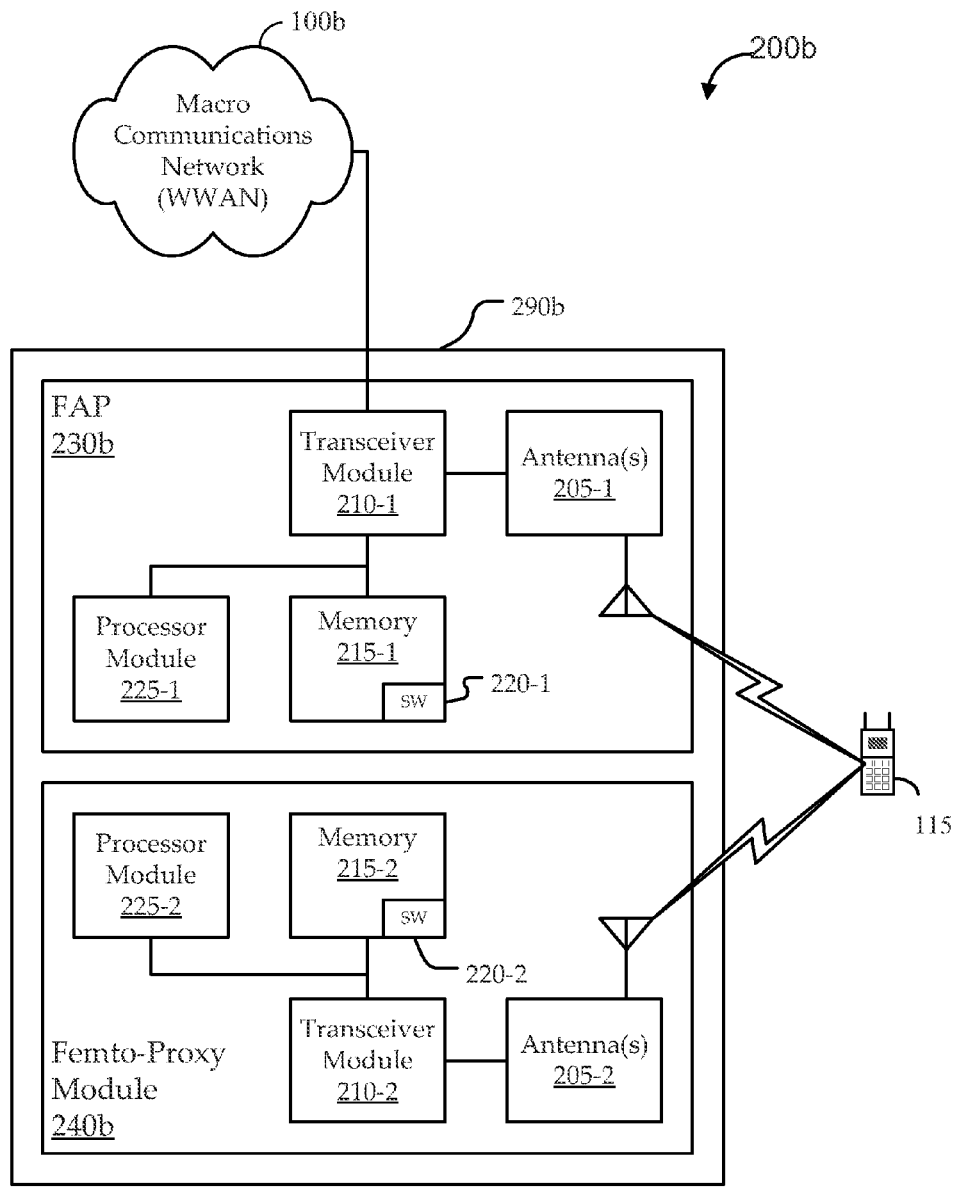
FIG. 2B shows a block diagram of an exemplary wireless communications system that includes an architecture of a femto-proxy system that is different from the architecture shown in FIG. 2A.

FIG. 2B shows a block diagram of a wireless communications system 200b that includes an architecture of a femto-proxy system 290b that is different from the architecture shown in FIG. 2A. Similar to the femto-proxy system 290a, the femto-proxy system 290b includes a femto-proxy module 240b and a FAP 230b. Unlike the system 290a, however, each of the femto-proxy module 240b and the FAP 230b has its own antenna 205, transceiver module 210, memory 215, and processor module 225. Both transceiver modules 210 are configured to communicate bi-directionally, via their respective antennas 205, with ATs 115. The transceiver module 210-1 of the FAP 230b is illustrated in bi-directional communication with the macro communications network 100b (e.g., typically over a backhaul network).

For the sake of illustration, the femto-proxy system 290b is shown without a separate communications management subsystem 250. In some configurations, a communications management subsystem 250 is provided in both the femto-proxy module 240b and the FAP 230b. In other configurations, the communications management subsystem 250 is implemented as part of the femto-proxy module 240b. In still other configurations, functionality of the communications management subsystem 250 is implemented as a computer program product (e.g., stored as software 220-1 in memory 215-1) of one or both of the femto-proxy module 240b and the FAP 230b.

Figure 3:
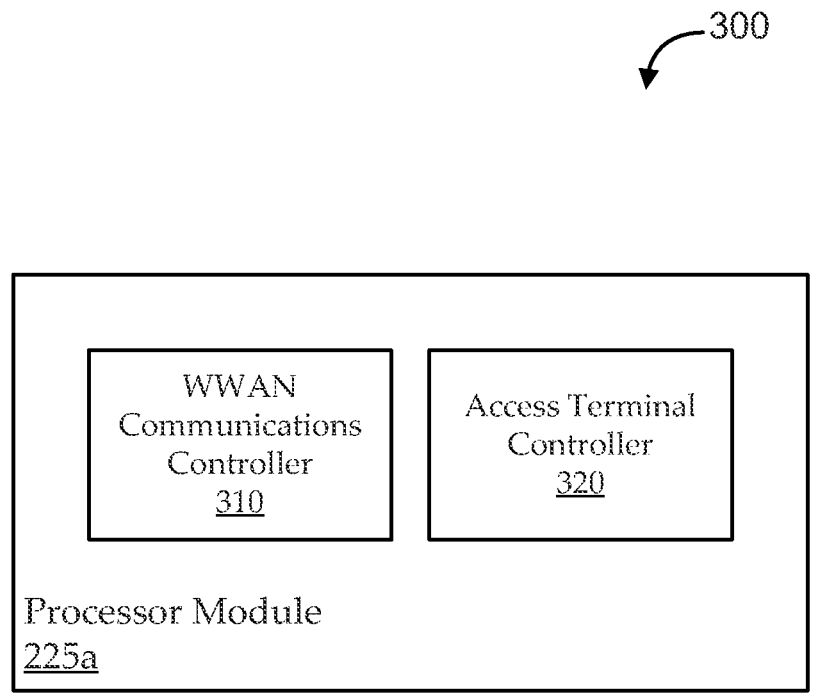
FIG. 3 shows a block diagram of an example of a processor module for implementing functionality of a communications management subsystem shown in FIG. 2A.

In yet other configurations, some or all of the functionality of the communications management subsystem 250 is implemented as a component of the processor module 225. FIG. 3 shows a block diagram 300 of a processor module 225a for implementing functionality of the communications management subsystem 250. The processor module 225a includes a WWAN communications controller 310 and an access terminal controller 320. The processor module 225a is in communication (e.g., as illustrated in FIGS. 2A and 2B) with the FAP 230 and the femto-proxy module 240. The WWAN communications controller 310 is configured to receive a WWAN communication (e.g., a page) for a designated AT 115. The access terminal controller 320 determines how to handle the communication, including affecting operation of the FAP 230 and/or the femto-proxy module 240.

Both the FAP 230a of FIG. 2A and the FAP 230b of FIG. 2B are illustrated as providing a communications link only to the macro communications network 100a. However, the FAP 230 may provide communications functionality via many different types of networks and/or topologies. For example, the FAP 230 may provide a wireless interface for a cellular telephone network, a cellular data network, a local area network (LAN), a metropolitan area network (MAN), a wide area network (WAN), the public switched telephone network (PSTN), the Internet, etc.

Figure 4A:
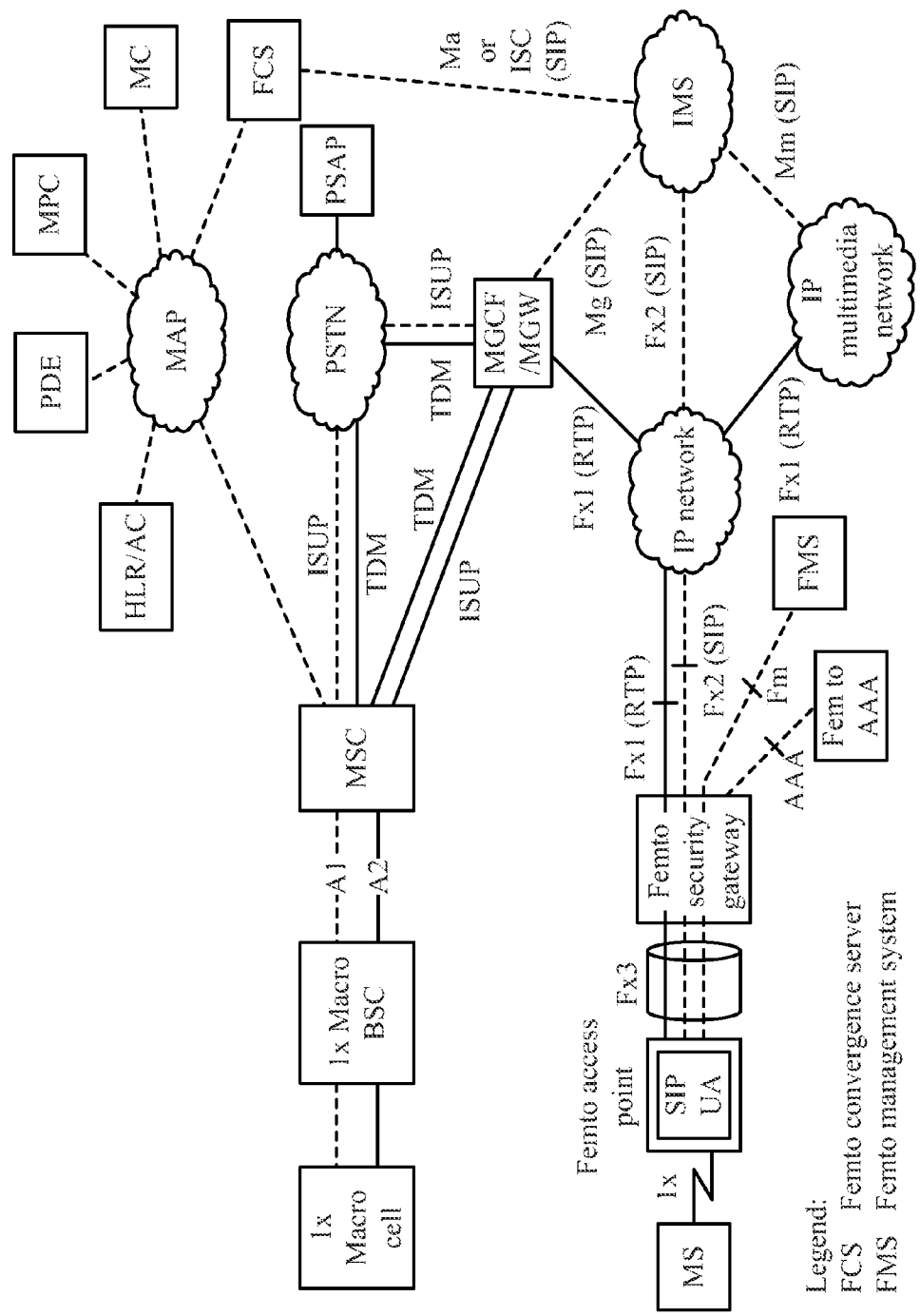
FIG. 4A shows detail regarding an example of a femtocell architecture for legacy circuit services.
Figure 4B:
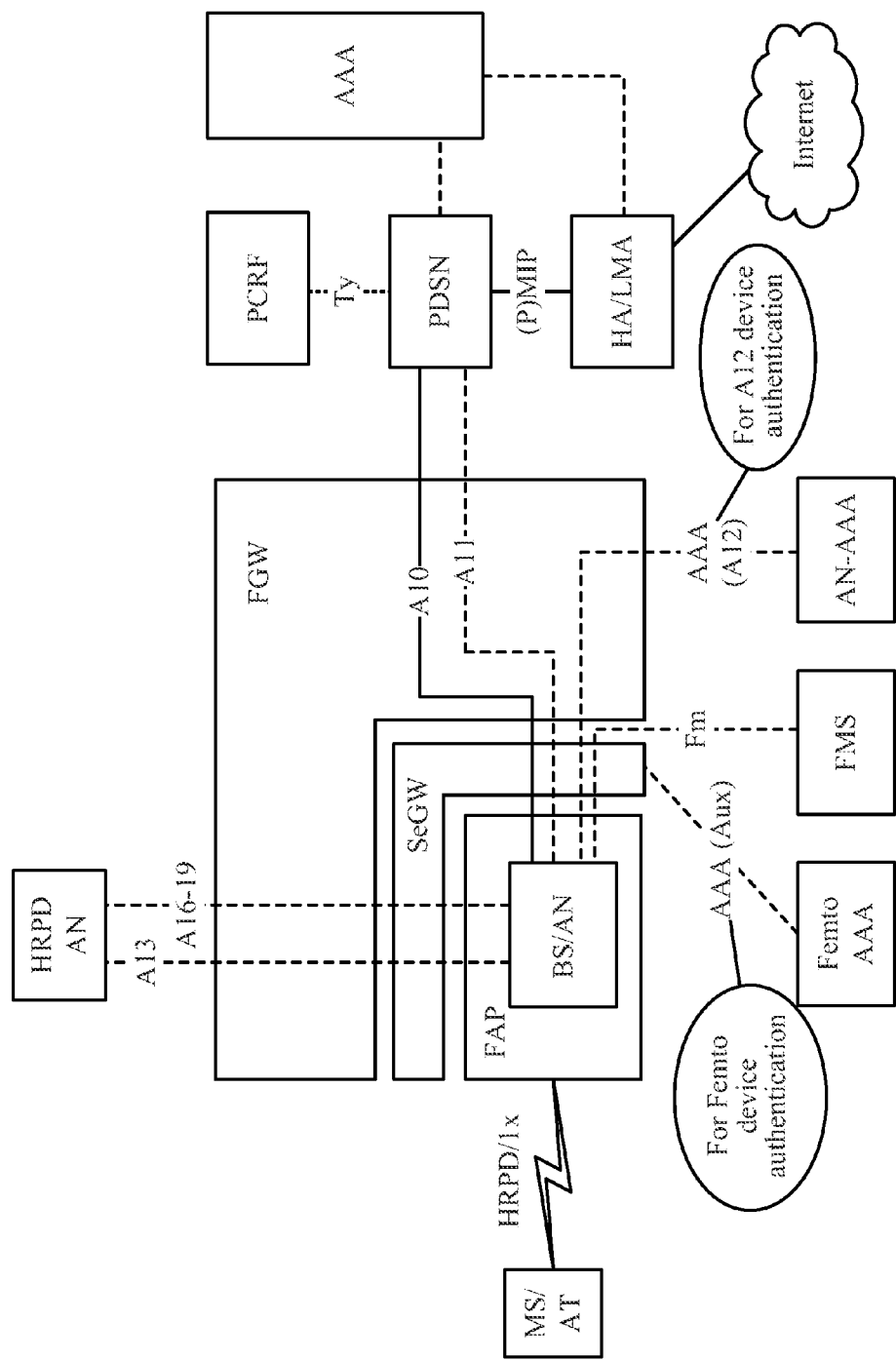
FIG. 4B shows detail regarding an example of a femtocell architecture for packet data service access using legacy interfaces.

FIGS. 4A and 4B show further detail with respect to femtocell architecture in communication networks for providing various services. Specifically, FIG. 4A shows detail regarding an exemplary femtocell architecture for legacy circuit services. For example, the network of FIG. 4A may be a CDMA 1X circuit switched services network. FIG. 4B shows detail regarding an exemplary femtocell architecture for packet data service access using legacy interfaces. For example, the network of FIG. 4B may be a 1x EV-DO (HRPD) packet data services network. These architectures illustrate possible portions of the communications systems and networks shown in FIGS. 1-3.

Figure 5:
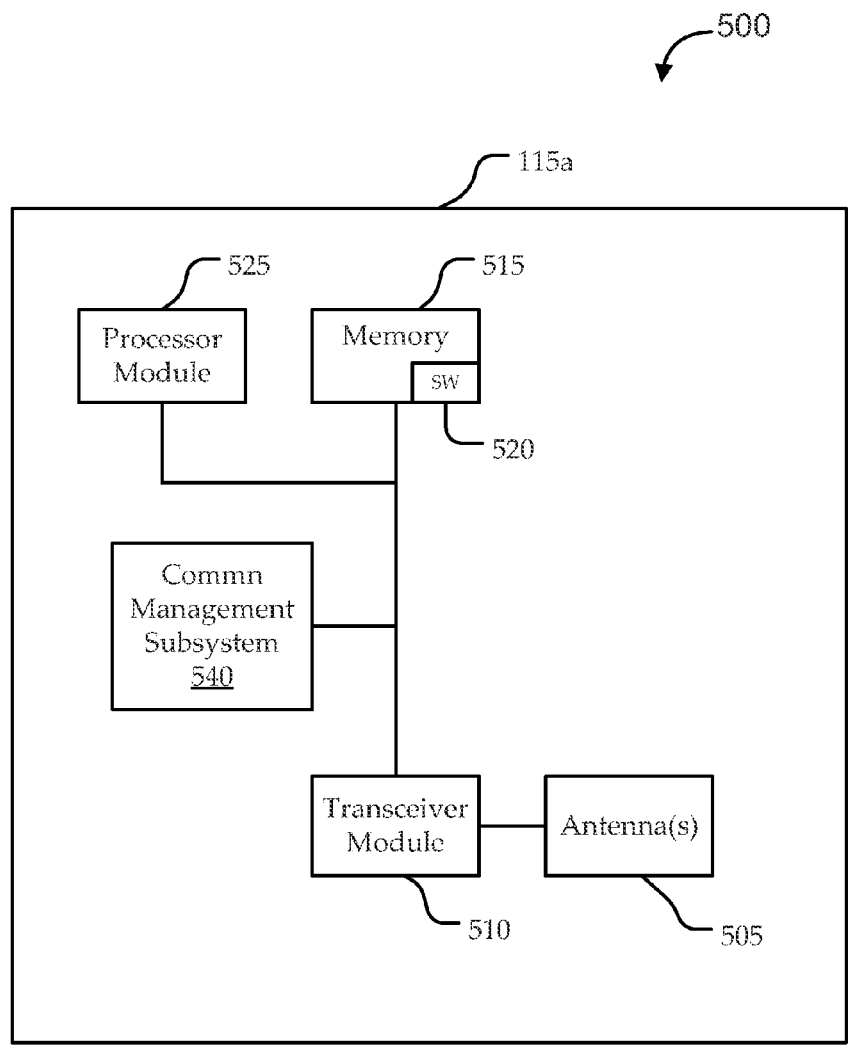
FIG. 5 shows a block diagram of an example of a mobile access terminal for use with the femto-proxy systems of FIGS. 3A and 3B in the context of the communications systems and networks of FIGS. 1-4B.

As described above, the femto-proxy systems 290 are configured to communicate with client devices, including the ATs 115. FIG. 5 shows a block diagram 500 of a mobile access terminal (AT) 115a for use with the femto-proxy systems 290 of FIGS. 2A and 2B in the context of the communications systems and networks of FIGS. 1-4B. The AT 115a may have any of various configurations, such as personal computers (e.g., laptop computers, netbook computers, tablet computers, etc.), cellular telephones, PDAs, digital video recorders (DVRs), internet appliances, gaming consoles, e-readers, etc. For the purpose of clarity, the AT 115a is assumed to be provided in a mobile configuration, having an internal power supply (not shown), such as a small battery, to facilitate mobile operation.

The AT 115a includes antennas 505, a transceiver module 510, memory 515, and a processor module 525, which each may be in communication, directly or indirectly, with each other (e.g., via one or more buses). The transceiver module 510 is configured to communicate bi-directionally, via the antennas 505 and/or one or more wired or wireless links, with one or more networks, as described above. For example, the transceiver module 510 is configured to communicate bi-directionally with BTSs 105 of the macro communications network (e.g., the communications system 100 of FIG. 1), and, in particular, with at least one FAP 230.

As described above, the transceiver module 510 may be configured to further communicate over one or more OOB links. For example, the transceiver module 510 communicates with a femto-proxy system 290 (e.g., as described with reference to FIGS. 2A and 2B) over both an in-band (e.g., macro) link to the FAP 230 and at least one OOB link to the femto-proxy module 240. The transceiver module 510 may include a modem configured to modulate the packets and provide the modulated packets to the antennas 505 for transmission, and to demodulate packets received from the antennas 505. While the AT 115a may include a single antenna 505, the AT 115a will typically include multiple antennas 505 for multiple links.

The memory 515 may include random access memory (RAM) and read-only memory (ROM). The memory 515 may store computer-readable, computer-executable software code 520 containing instructions that are configured to, when executed, cause the processor module 525 to perform various functions described herein (e.g., call processing, database management, message routing, etc.). Alternatively, the software 520 may not be directly executable by the processor module 525 but be configured to cause the computer, e.g., when compiled and executed, to perform functions described herein.

The processor module 525 may include an intelligent hardware device, e.g., a central processing unit (CPU) such as those made by Intel® Corporation or AMD®, a microcontroller, an application specific integrated circuit (ASIC), etc. The processor module 525 may include a speech encoder (not shown) configured to receive audio via a microphone, convert the audio into packets (e.g., 30 ms in length) representative of the received audio, provide the audio packets to the transceiver module 510, and provide indications of whether a user is speaking. Alternatively, an encoder may only provide packets to the transceiver module 510, with the provision or withholding/suppression of the packet itself providing the indication of whether a user is speaking.

According to the architecture of FIG. 5, the AT 115a further includes a communications management subsystem 540. The communications management subsystem 540 may manage communications with the macro (e.g., WWAN) network, one or more OOB networks (e.g., piconets, femto-proxy modules 240, etc.), one or more femtocells (e.g., FAPs 230), other ATs 115 (e.g., acting as a master of a secondary piconet), etc. For example, the communications management subsystem 540 may be a component of the AT 115a in communication with some or all of the other components of the AT 115a via a bus. Alternatively, functionality of the communications management subsystem 540 is implemented as a component of the transceiver module 510, as a computer program product, and/or as one or more controller elements of the processor module 525.

The AT 115a includes communications functionality for interfacing with both the macro (e.g., cellular) network and one or more OOB networks (e.g., the femto-proxy module 240 link. For example, some ATs 115 include native cellular interfaces as part of the transceiver module 510 or the communications management subsystem 540 (e.g., a transceiver utilizing cellular network communication techniques that consume relatively large amounts of power in operation) for communicating with other appropriately configured devices (e.g., for establishing a link with a macro communication network via FAP 230) through a native cellular wireless link. The native cellular interfaces may operate according to one or more communication standards, including, but not limited to, W-CDMA, CDMA2000, GSM, WiMax, and WLAN.

Furthermore, the ATs 115 may also include OOB interfaces implemented as part of the transceiver module 510 and/or the communications management subsystem 540 (e.g., a transceiver that may consume relatively low amounts of power in operation and/or may cause less interference than in the in-band spectrum) for communicating with other appropriately configured devices over a wireless link. One example of a suitable OOB communication interface is a Bluetooth-compliant transceiver that uses a time-division duplex (TDD) scheme.

Active-Hand-in Embodiments

In many cases, it is desirable to support active hand-in from a macrocell (e.g., macro BTS 105 of FIG. 1) to the FAP 230 and/or active hand-out from the FAP 230 to the macro BTS 105 using handoffs to provide seamless voice and data service to active users (active ATs 115). Active handouts are relatively simple to implement and are supported by most operators with legacy macro networks 100 and ATs 115. However, active hand-in is challenging and is not typically supported by operators.

For example, as an AT 115 moves during the course of active communications with the macro network 100 (e.g., during a voice call, an active data transfer, etc.), a determination may be made that a handoff is needed (e.g., the current macro BTS 105 signal may become weak). The need for a handoff may be determined according to measurement reports sent by the active AT 115. Notably, the phrase "measurement report" may be generally associated with 3GPP networks, but is intended herein to include any similar types of measurement reporting in any similar type of network (e.g., including "PSMMs," or pilot strength measurements, in 3GPP2 networks).

The measurement reports include a measurement of the strength of the pilot observed by the AT 115 and the forward link cell identifier of the target cell. The cell identifier may be any identifier used by the macro network 100 to identify a particular cell. For example, the cell identifier may be a "PN offset" in a 3GPP2 network, a "PSC" (primary scrambling code) in a 3GPP network, etc. On a typical macro network 100, enough cell identifiers (e.g., PN Offsets) are available to substantially ensure that, given the geographical distribution of macro BTSs 105, each macro BTS 105 can effectively be uniquely identified by its cell identifier (e.g., by a base station controller (BSC) 120 in the macro network 100, a Mobile Switching Center (MSC) in the core of the network, etc.).

While macro BTSs 105 may effectively be uniquely identified by the macro network 100, there are typically not enough remaining cell identifiers to uniquely identify all FAPs 230 added to the network. For example, a typical macro network 100 may have 512 PN offset values available for assignment to all the cells in its network. PN offsets may be reused on different carriers, in different geographic regions, etc. to extend the number of cells that can effectively be identified without confusion. However, only a small portion of the PN offset values may be available for use by FAPs 230 (i.e., other than the values reserved for use by macro BTSs 105), and the number and density of FAPS may be relatively large in some areas. For example, only a small number of PN offset values must be reused among possibly hundreds of FAPs 230 per macro sector.

When a handoff is required for an active AT 115 to a macro BTS 105 (as a handoff from another macro BTS 105 or as a hand-out from a FAP 230), the cell identifier provided in the measurement report may be sufficient to reliably determine the appropriate macro BTS 105 for handoff. The active communication may be handed off to the correct target cell without ambiguity. However, when a handoff is required for an active AT 115 to a FAP 230 (as a hand-in from a macro BTS 105), the same cell identifier provided in the measurement report may be shared by multiple FAPs 230 in the same macro sector. As such, the cell identifier alone may be insufficient to reliably determine the appropriate FAP 230 for hand-in in all cases. For example, the AT 115 may be near its home FAP 230, and it may be desirable to hand-in to that home FAP 230, but another FAP 230 in the macro sector may be associated with the same cell identifier.

In some newer networks, additional identifiers are available that may mitigate or solve this issue. For example, in CDMA2000 networks, cells are upgraded to broadcast an access point identification message (APIDM), location information, and/or other information that may make identification of a particular FAP 230 based only on its cell identifier(s) more unique and reliable. Upgraded ATs 115 can exploit new cell identifier(s), for example, by decoding the APIDM messages of neighboring cells and reporting the identifiers in measurement reports during active communications. The controllers (e.g., macro BSC 120 and MSC) can then include the APIDM in the handoff messages to uniquely identify the target FAP 230 (e.g., to the FCS). It is important to note that this technique is only available for communications between upgraded networks and upgraded ATs 115. For operators who do not want to upgrade the air interface, this technique is not available.

Operators of legacy networks (including those desiring to communicate with legacy ATs 115) may address this difficulty with active hand-in in different ways. Some typical networks do not support active hand-in at all. In the event that the hand-in would be the only way to maintain the active communications with the AT 115, the active communications may simply be lost (e.g., a call may be dropped when signals from macro BTSs 105 are lost, even when the AT 115 is otherwise in the FAP coverage area).

According to one technique for addressing the difficulty with active hand-in in legacy networks, some operators implement blind hand-off. For example, when the measurement report includes a cell identifier that is shared by multiple FAPs 230 in the same macro sector, the network may blindly select any of the FAPs 230 having that cell identifier for the hand-in. If blind selection results in hand-in to an appropriate FAP 230, the hand-in may be successful. However, if blind selection results in hand-in to an inappropriate FAP 230 (e.g., one that is out of range of the AT 115, one for which the AT 115 is not authorized to attach, etc.), the active communications may be lost.

According to another technique, operators use reverse-link sensing to improve the type of blind hand-in discussed above. The reverse-link sensing may result in an educated guess or even an accurate determination as to the selection among FAPs 230 sharing the cell identifier identified for the hand-in. For example, as discussed above, the AT 115 in active communications with the macro network 100 sends a measurement report (e.g., MR, PSMM, etc.) to the source macro BTS 105 (the macro BTS 105 via which the AT 115 is currently communicating), and the measurement report includes the cell identifier (e.g., PN offset, PSC, etc.) of a target FAP 230 as the strongest neighboring cell. Based on the measurement report, the source macro BTS 105 determines to perform a hard hand-off. The source macro BTS 105 sends a Handoff Required message to its source MSC (e.g., via its source BSC 120), and the source MSC sends a FACDIR2 message to a target femto convergence system (FCS) via core network messaging. As used herein, the FCS is intended to include any type of interface gateway for providing an interface between the FAPs 230 and the core network. Typically, the FCS is implemented as a femto convergence server. The core network messaging may direct the target FCS to initiate the handoff.

Assuming that the target FCS cannot reliably determine the appropriate target FAP 230 (i.e., multiple FAPs 230 share the cell identifier of the measurement report), the target FCS sends a measurement request message to all FAPs 230 sharing the cell identifier. The measurement request may include the public long code mask (e.g., scrambling code, IMSI, etc.) of the AT 115. Typically, the measurement request is sent simultaneously to all potential target FAPs 230 to avoid waiting for serialized responses. Upon receiving this message, the FAPs 230 attempt to detect the AT 115 by its long code mask and measure the signal strength of the reverse link of the AT 115. Each FAP 230 responds to the target FCS providing at least the signal strength measured on the reverse link of the AT 115. In some cases, the FAPs 230 further determine whether the AT's 115 (e.g., their respective IMSIs) are authorized to access services via the FAP 230, and notify the FCS, accordingly. Further, some FAPs 230 may not send a measurement response. For example, certain network configurations allow FAPs 230 to omit responding with a measurement response message when detection of the AT 115 is not successful, when the measurement result is below an operator's configurable threshold, etc. Based on the measurement response results, the target FCS attempts to uniquely determine the appropriate target FAP 230, and continues with the active hand-in process.

It is worth noting certain aspects of this reverse link measurement technique. One aspect is that, upon sending the Measurement Request message to the candidate target FAPs 230, the target FCS may typically start an instance of a timer to await the arrival of the corresponding Measurement Response messages from the FAPs 230. The duration that the FCS waits for responses from the FAPs 230 should be large enough to account for round-trip delays between the FCS and any of the candidate target FAPs 230 plus the value of a Measurement Response Timer field included in the Measurement Response Options for certain network components. This may impose an undesirable delay on the hand-in, which, in a worst-case, may cause the hand-in process to fail.

Another aspect of the reverse link measurement technique is that each FAP 230 may need an extra radio receiver to detect the presence of nearby active ATs 115 communicating with the macro network 100 by measuring reverse links of the ATs 115. It may be undesirable (e.g., it may increase the cost and complexity of the FAP 230 design and implementation) to include the extra radio receiver to enable reverse link sensing. Yet another aspect of the reverse link measurement technique is that reverse link measurements of ATs 115 by the FAPs 230 is not completely reliable. For example, when an AT 115 is at a cell edge, it may have higher transmit power, such that more than one FAP 230 may simultaneously detect the AT 115. Similarly, when an AT 115 is transmitting at a power that is too low, no FAPs 230 may detect the AT 115.

Figure 6A:
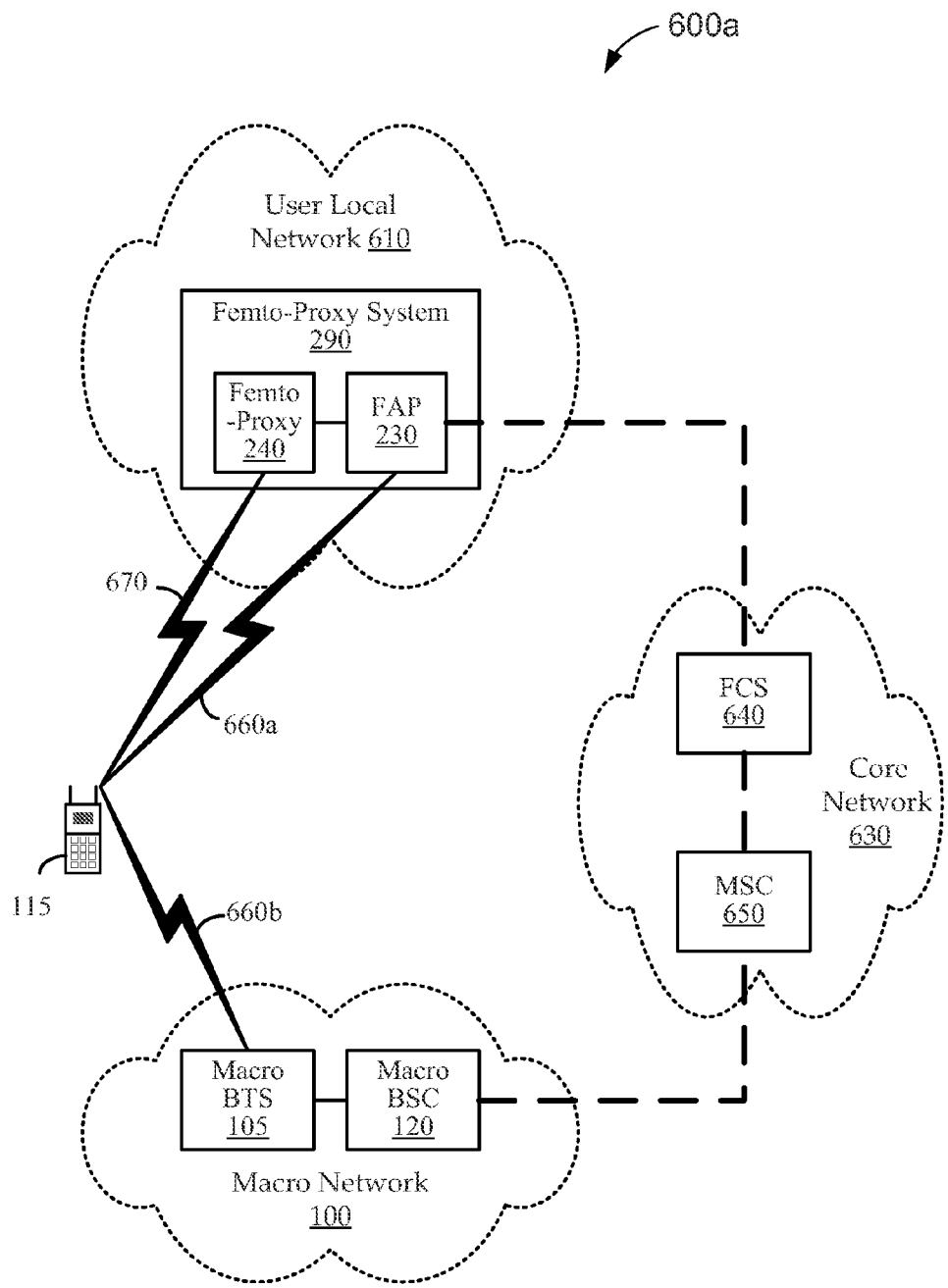
FIG. 6A shows a simplified network diagram of a communications system for facilitating active hand-in using a femto-proxy system having a femtocell integrated with a femto-proxy module.

It will now be appreciated that operators of legacy systems may be unable to reliably support active hand-ins to FAPs 230 using existing techniques. Embodiments include novel techniques for supporting active hand-ins for legacy networks and/or for legacy ATs 115. Turning to FIG. 6A, a simplified network diagram is shown of a communications system 600a for facilitating active hand-in.

The communications system 600a includes a macro network 100, a user local network 610, and a core network 630. The core network 630 includes, among other things, a femto convergence system (FCS) 640 and a mobile switching center (MSC) 650. The FCS 640 is in communication with a number of FAPs 230 (only one FAP 230 is shown for clarity), and the MSC 650 is in communication with multiple macro BTSs 105 via one or more macro BSCs 120 (only one macro BTS 105 is show for clarity). The FAP 230 is in communication with the macro network 100 via core network 630 elements, such that cellular communications may be facilitated through the FAP 230 using functionality of the FCS 640 and MSC 650.

An AT 115 in active communications with the macro BTS 105 (over a macro communications link 660) may approach a coverage area of the FAP 230. As described above, the macro network 100 (e.g., the macro BSC 120) determines that a handoff is needed based on a measurement report from the AT 115. The measurement report identifies the target FAP 230 by its cell identifier (e.g., its PN offset). A handoff request may then be sent by the MSC 650 to the target FCS 640 for identifying an appropriate FAP 230 for the hand-in.

As discussed, particularly where multiple FAPs 230 share a cell identifier, it may be difficult or impossible for the FCS 640 to reliably determine the appropriate target FCS 230 for hand-in using the cell identifier alone. Some embodiments exploit features of femto-proxy systems 290. As shown, the user local network 610 includes the FAP 230 functionality integrated with OOB functionality of a femto-proxy module 240 as part of a femto-proxy system 290. This OOB functionality is facilitated over an OOB communications link 670 that can be established between the AT 115 and the femto-proxy module 240.

While many different types of out-of-band communications may be used to facilitate functionality described here (e.g., as discussed above), the discussion below focuses on Bluetooth as facilitating the OOB communications of these embodiments. Bluetooth provides certain features. One feature is that Bluetooth radios are integrated into many ATs 115, so that the Bluetooth functionality can be exploited for many users without modifying their existing ATs 115. Another feature is that the tolerable path loss between two "Class 1.5" Bluetooth devices may be comparable or even higher than between a FAP 230 and an AT 115. In any given environment, this higher tolerable path loss can translate to higher effective range (e.g., facilitating FAP 230 discovery, handover, and/or interference mitigation, as described herein).

Yet another feature of Bluetooth is that the Bluetooth address (BD_ADDR) is a unique, 48-bit address used to identify each Bluetooth enabled device. The Bluetooth address is used when a device communicates with another device, and is divided into a 24-bit LAP (Lower Address Part), a 16-bit NAP (Non-significant Address Part), and an 8-bit UAP (Upper Address Part). The LAP is assigned by a manufacturer and is unique for each Bluetooth device, while UAP and NAP are part of an Organizationally Unique Identifier (OUI). Using the Bluetooth address, each Bluetooth adapter in any device can be identified according to a globally unique value.

As described more fully below, embodiments may operate in the context of a system, like the communications system 600 of FIG. 6, to support active hand-ins with minimal or no change to legacy macro networks 100 and/or to legacy ATs 115. One set of such embodiments uses modifications to ATs 115 and the FCS 640 to facilitate active hand-in. In particular, an OOB identifier of the FAP 230 is detected by the AT 115 and communicated as part of the measurement report to facilitate identification of the target FAP 230 by the FCS 640.

Each of the AT 115 and the FAP 230 has a unique Bluetooth device address (BD_ADDR) that is used for paging the other device (e.g., AT 115 pages the FAP 230 or the FAP 230 pages the AT 115). It is understood that the BD_ADDR of the other device is known by the paging device. Notably, the same or similar techniques may be used for other types of out-of-band addressing. For example, the devices may know each other's WiFi MAC address, etc. The AT 115 may then assist the macro network 100 in effecting the active hand-in.

After an OOB communications link 670 is established with the femto-proxy module 240, the AT 115 can communicate the cell identifier (e.g., PN offset) and the OOB identifier (e.g., Bluetooth device address) of the target FAP 230 to the MSC 650 as part of its measurement report. The FCS 640 maintains a mapping between the cell identifier and the OOB identifier, which can then be used to uniquely identify the target FAP 230 for active hand-in.

Techniques for AT 115 assisted active hand-in are described more fully in U.S. Provisional Patent Application No. 61/327,445, titled "A method for uniquely identifying target femtocell to facilitate FAP assisted active hand-in," filed Apr. 23, 2010, which is hereby incorporated by reference for any and all purposes. Notably, this technique involves upgrades at the AT 115 "air-interface" (i.e., new messages or modifications of existing messages are involved). Also, proper communication of new AT 115 messaging may involve changes to the macro BSCs 120, the MSC 650, the FCS 640, and the FAPs 230. These changes to the legacy macro network 100 may largely be software upgrades (rather than hardware upgrades), but operators may still be reluctant to implement the changes.

Another set of embodiments supports active hand-ins for both legacy macro networks 100 and legacy ATs 115. In particular, changes to the FAP 230 and the FCS 640 may allow for FAP 230 assisted active hand-in. Embodiments of FAP 230 assisted hand-in may be implemented without changes to the air-interface, the macro BSC 120, or the MSC 650. FAP 230 assisted hand-in exploits registration by FAPs 230 of ATs 115 at the FCS 640 (e.g., using OOB presence indication to effectively pre-register the AT 115 with the FCS 640). When a hand-off directive is received at the FCS 640 implicating an AT 115, registration of the AT 115 can be used by the FCS 640 to help determine the appropriate target FAP 230 for hand-in.

As described above with reference to FIG. 2A, embodiments of the FAP 230 maintain AT mappings 219. Typically the AT mappings 219 map a cell identifier of each AT 115 (e.g., the International Mobile Subscriber Identity (IMSI), Mobile Equipment Identifier (MEID), Electronic Serial Number (ESN), etc.) with an OOB identifier corresponding to the AT's 115 OOB radio (e.g., Bluetooth device address, WiFi MAC address, etc.). In certain embodiments, further mappings are maintained for each AT 115 by the AT mappings 219 including, for example, a public long code mask. When the FAP 230 is a restricted access femtocell, the AT mappings 219 may be maintained only for authorized users. For example, an access control list is maintained at the FAP 230 that includes or is associated with the AT mappings 219.

Notably, there may various ways to establish the AT mappings 219. According to one exemplary technique, the AT 115 calls a particular number, which may automatically trigger an OOB pairing (e.g., a Bluetooth pairing) between the AT 115 and the FAP 230. Thus the mapping between the AT identifier and OOB identifier is established. According to another exemplary technique, a user manually enters the AT's 115 cell identifier (e.g., IMSI) and OOB identifier (e.g., BD_ADDR) into a user interface at the FAP 230. According to yet another exemplary technique, a user enters the mapping information via a portal (e.g., a web page), and the FAP 230 downloads the information (e.g., or the FAP 230 includes a web server and the portal directly addresses the FAP 230).

Active hand-in functionality described herein involves use of a femto-proxy system 290 having a FAP 230 integrated with an OOB femto-proxy 240. As illustrated in FIG. 6A, and as described in a number of exemplary configurations above, the OOB femto-proxy 240 includes an OOB device (e.g., an OOB radio) that is communicatively coupled with the FAP 230. For example, the FAP 230 and the OOB femto-proxy 240 may be physically integrated into a sigle housing or assembly (e.g., and in communication over a bus or some other internal connection), or the OOB femto-proxy 240 may be separately housed and may be in communication with the FAP 230 using a wired or wireless connection. Typically, the OOB femto-proxy 240 is located close enough to the FAP 230 so that proximity detection by the OOB femto-proxy 240 indicates proximity also to the FAP 230.

Figure 6B:
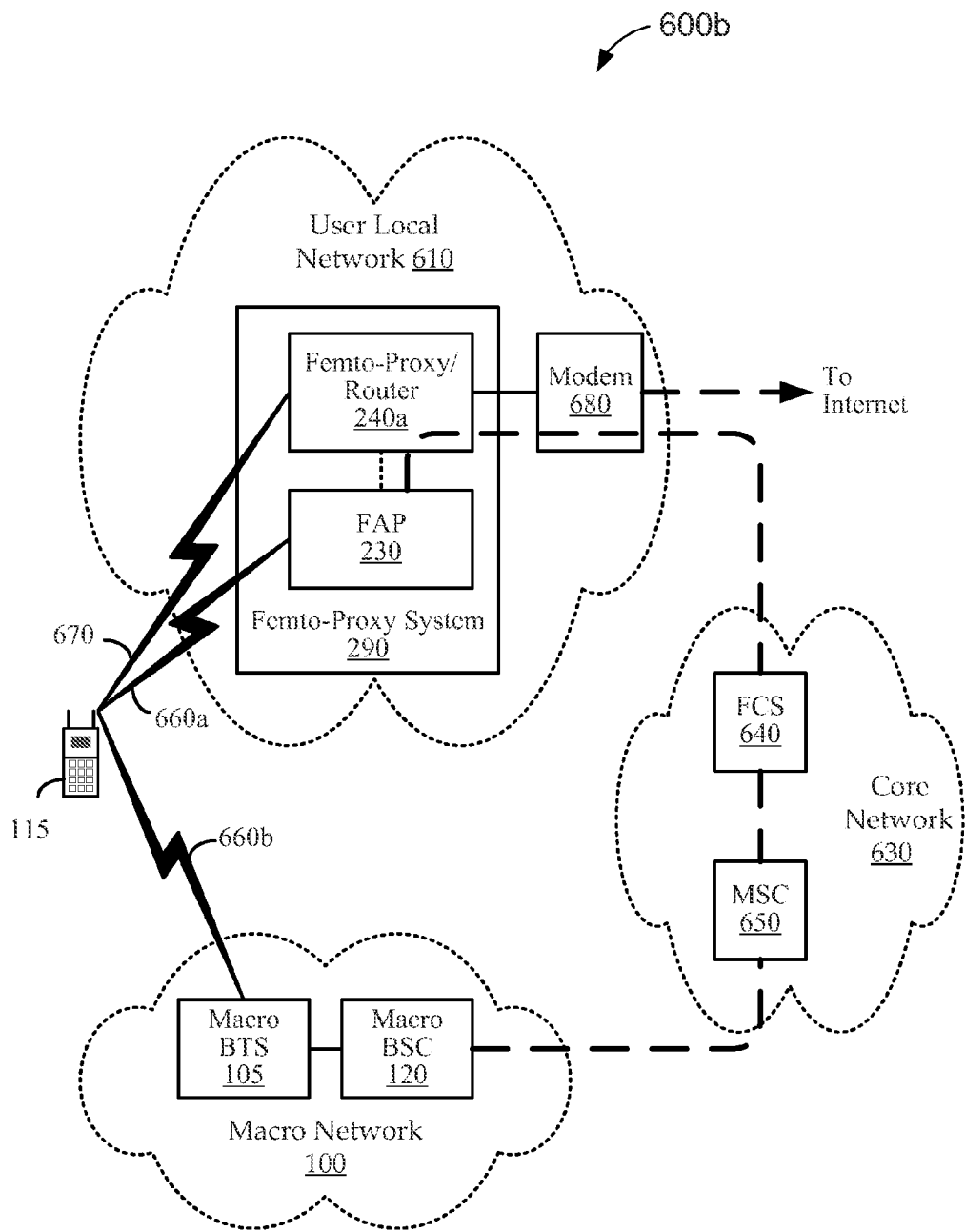
FIG. 6B shows a simplified network diagram of a communications system for facilitating active hand-in using a femto-proxy system having a femtocell sharing a subnet with a femto-proxy module.

In some other configurations, the OOB femto-proxy 240 is logically, rather than physically, integrated with the FAP 230 (e.g., the components can otherwise be logically associated with each other by the network). For example, even having the OOB femto-proxy 240 physically separated from the FAP 230, the components may be part of a common subnet so that proximity detection by the OOB femto-proxy 240 can be associated with proximity to the FAP 230. FIG. 6B shows a simplified network diagram of a communications system 600b for facilitating active hand-in in which the OOB femto-proxy 240 and the FAP 230 are logically integrated with respect to the core network 630.

As in FIG. 6A, the communications system 600b includes a macro network 100, a user local network 610, and a core network 630. The core network 630 includes, among other things, a femto convergence system (FCS) 640 and a mobile switching center (MSC) 650. The FCS 640 is in communication with a number of FAPs 230 (only one FAP 230 is shown for clarity), and the MSC 650 is in communication with multiple macro BTSs 105 via one or more macro BSCs 120 (only one macro BTS 105 is show for clarity). The FAP 230 is in communication with the macro network 100 via core network 630 elements, such that cellular communications may be facilitated through the FAP 230 using functionality of the FCS 640 and MSC 650.

As illustrated, the user local network 610 includes the FAP 230 and the OOB femto-proxy 240 as part of a femto-proxy system 290. The OOB femto-proxy 240 is shown as a combination OOB femto-proxy/router 240a. For example, broadband communications services are delivered to the user local network 610 via a modem 680. The modem 680 is then in communication with the OOB femto-proxy/router 240a, which is configured to provide the broadband communications services to a local subnet. For example, the OOB femto-proxy/router 240a is a WiFi router that acts as a WiFi "hot spot" for use by ATs 115 in its coverage area.

According to an exemplary scenario, an AT 115 moves into the proximity of the OOB femto-proxy/router 240a (e.g., within the WiFi coverage area), and the AT 115 detects or is detected by the OOB femto-proxy/router 240a. For example, the AT 115 detects a wireless network with a particular SSID (e.g., which may be previously known to the AT 115, previously authorized, etc.). Prior to providing service to the AT 115, the OOB femto-proxy/router 240a may attempt to assign an IP address to the AT 115. As part of the assignment process, the OOB femto-proxy/router 240*a* broadcasts a DHCP request to all the devices on the subnet.

The FAP 230 is configured to be a device on the subnet provided by the OOB femto-proxy/router 240*a*. Notably, the OOB femto-proxy 240 and the FAP 230 may or may not be physically collocated, physically integrated, etc. However, because the OOB femto-proxy 240 and the FAP 230 are part of the same subnet in the user local network 610, the FAP 230 receives the DHCP request from the OOB femto-proxy/router 240*a*. The DHCP request includes the AT's 115 WiFi MAC address (e.g., or other similar type of identifier).

At the FAP 230, a mapping is maintained between the AT's 115 MAC address and its cell identifier (e.g., the IMSI, MEID, ESN, etc.). When the FAP 230 sees the DHCP request with a MAC address that is recognized (e.g., for an AT 115 that is part of its access list, for an AT 115 known to be a cell phone, etc.), the FAP 230 sends the corresponding cell identifier for the AT 115 to the FCS 640 to facilitate active hand-in. Alternatively, the mapping between the MAC addresses and cell identifiers of the ATs 115 may be maintained at the FCS 640. Accordingly, the FAP 230 can send the MAC address to the FCS 640, and the FCS 640 can retrieve the corresponding cell identifier for the AT 115.

It will now be appreciated that configuring the OOB femto-proxy 240 and the FAP 230 to be on the same subnet may provide a logical integration between the components of the femto-proxy system 290, even if those components are not physically or otherwise integrated. Mapping the WiFi MAC address to the cell identifier allows ATs 115 to be registered (e.g., pre-registered) substantially as described above with reference to other types of OOB femto-proxy 240 integration with the FAP 230 (e.g., as described with reference to FIG. 6A).

Notably, while only one FAP 230 is shown, the OOB femto-proxy/router 240*a* may be in communication with multiple FAPs 230. For example, in an enterprise context, a number of FAPs 230 may be used to extend cellular service coverage to a large area (e.g., an office building). Multiple FAPs 230, and even multiple OOB femto-proxies 240, may all be part of a common subnet (e.g., a local area network) facilitated by a router. When proximity is detected anywhere on the subnet, the router may be able to send out an appropriate DHCP request and/or other types of signaling to improve the reliability of active hand-ins to femtocells in the subnet.

The configurations described in FIGS. 6A and 6B are intented only to be illustrative, and not limiting. Other configurations are possible for providing the same or similar types of integrative functionality between OOB femto-proxies 240 and FAPs 230. For example, many configurations may allow OOB proximity detection to be used to facilitate reliable active hand-in to a particular FAP 230, according to various embodiments.

Figure 7A:
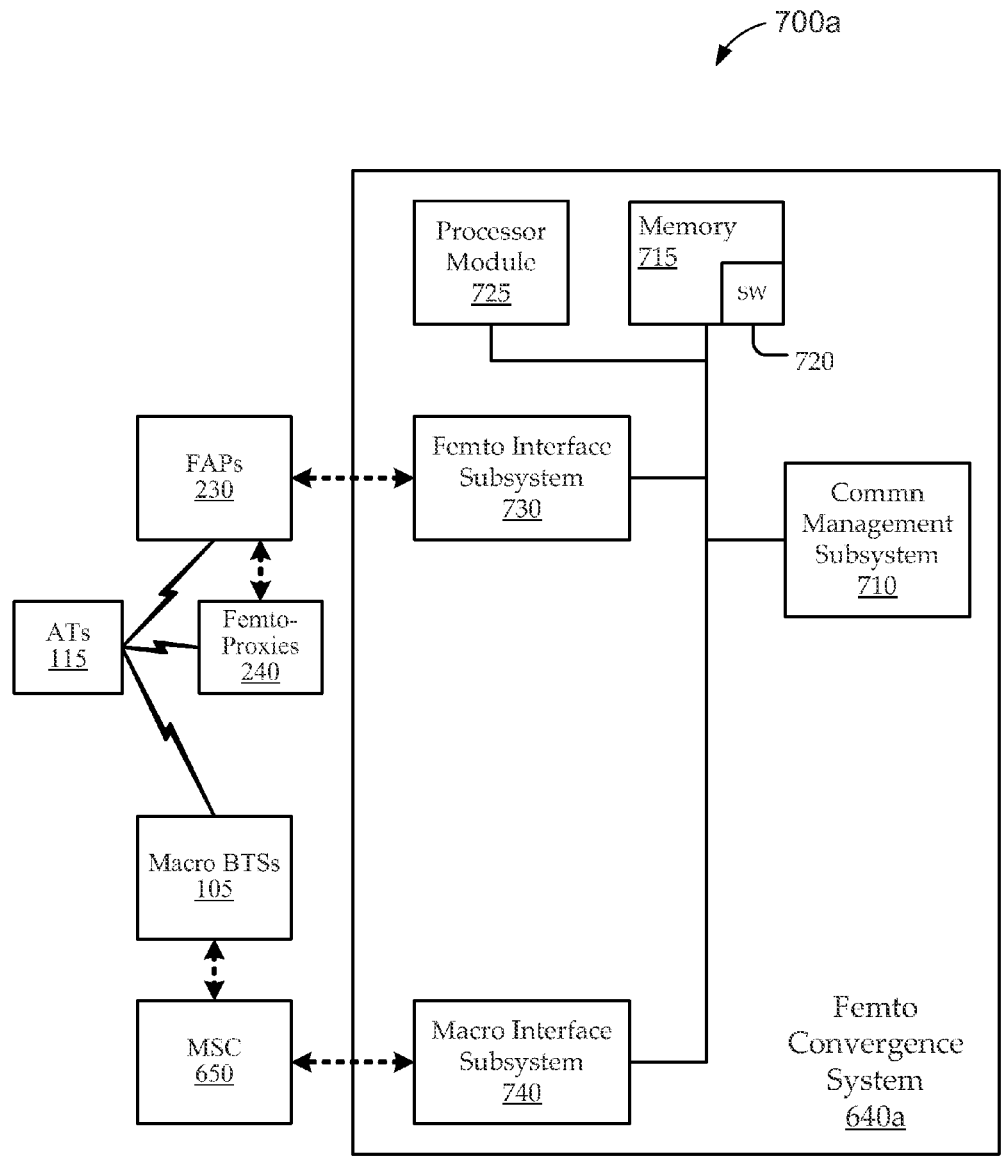
FIG. 7A shows a block diagram of a wireless communications system that includes a femto convergence system (FCS)
Figure 7B:
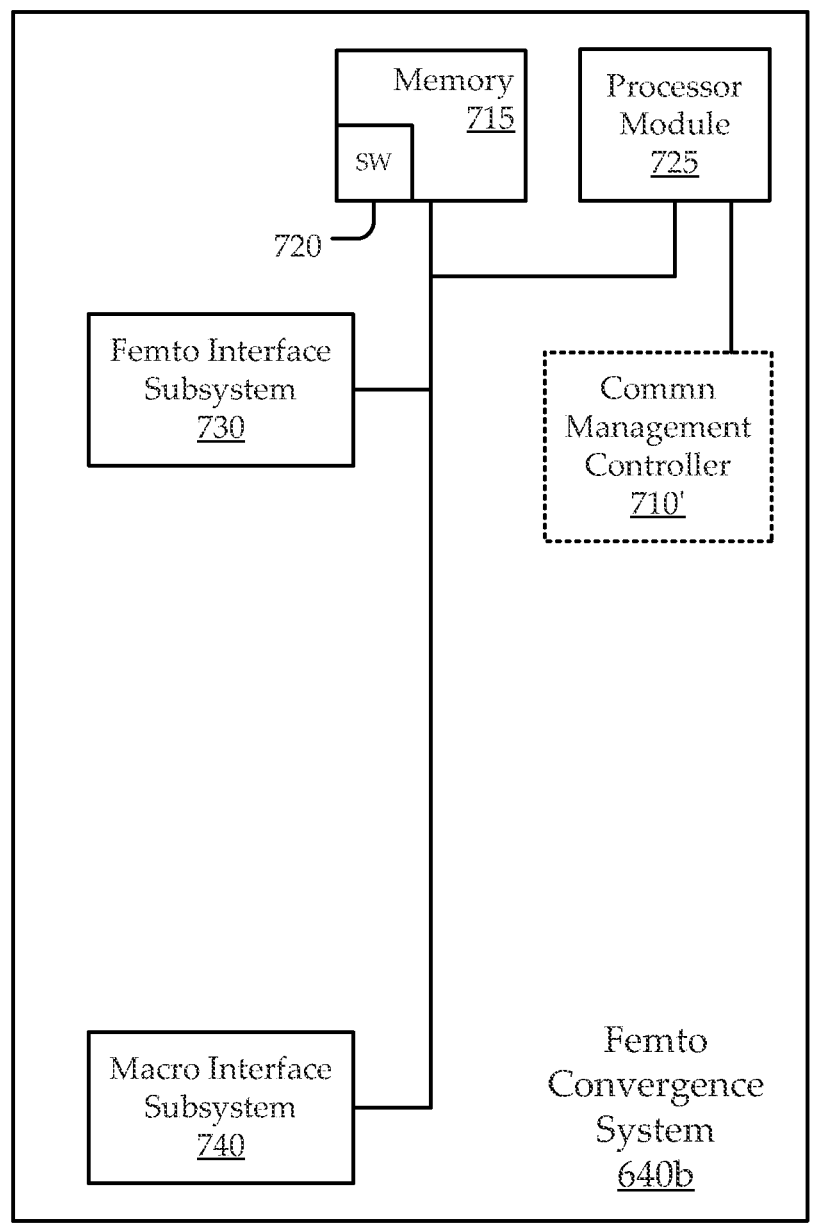
FIG. 7B shows a block diagram of an FCS that is an alternate configuration of the FCS of FIG. 7A.

To facilitate FAP 230 assisted hand-in, FAPs 230, like the one described in FIG. 2A, may interact with embodiments of FCSs 640, such as those described in FIGS. 7A and 7B. FIG. 7A shows a block diagram of a wireless communications system 700*a* that includes a femto convergence system (FCS) 640*a*. The FCS 640*a* includes a communications management subsystem 710, a femto interface subsystem 730, and a macro interface subsystem 740. The FCS 640*a* also includes memory 715 and a processor module 725. All the components of the FCS 640*a* may be in communication with each other directly or indirectly (e.g., over one or more buses).

For the sake of context and clarity, the femto interface subsystem 730 is shown in communication with FAPs 230, and the macro interface subsystem 740 is shown in communication with macro BTSs 105 (via an MSC 650 and/or one or more macro BSCs (not shown)). Various communications functions, including those involved in facilitating FAP 230 assisted hand-in, are implemented and/or managed using the communications management subsystem 710. For example, the communications management subsystem 710 may at least partially handle communications with macro network elements using functionality of the macro interface subsystem 740 and may at least partially handle communications with FAPs 230 using functionality of the femto interface subsystem 730. For example, the communications management subsystem 710 may be a component of the FCS 640*a* in communication with some or all of the other components of the FCS 640 via a bus.

The memory 715 may include random access memory (RAM) and read-only memory (ROM). In some embodiments, the memory 715 is configured to maintain registration-related information. As described more fully below, the registration-related information may include identifier mappings for FAPs 230, ATs 115, etc., as well as registration messages, flags, etc.

The memory 715 may also store computer-readable, computer-executable software code 720 containing instructions that are configured to, when executed, cause the processor module 725 to perform various functions described herein (e.g., call processing, database management, message routing, etc.). Alternatively, the software 720 may not be directly executable by the processor module 725 but be configured to cause the computer, e.g., when compiled and executed, to perform functions described herein.

The processor module 725 may include an intelligent hardware device, e.g., a central processing unit (CPU) such as those made by Intel® Corporation or AMD®, a microcontroller, an application specific integrated circuit (ASIC), etc. Embodiments of the processor module 725 may be configured to facilitate functionality, such as timer functionality. Further, embodiments of the processor module 725 include or facilitate some or all of the functionality of the communications management subsystem 710, the femto interface subsystem 730, or the macro interface subsystem 740.

For example, FIG. 7B shows a block diagram of an FCS 640*b* that is an alternate configuration of the FCS 640*a* of FIG. 7A. As with the FCS 640*a* of FIG. 7A, the FCS 640*b* of FIG. 7B includes a femto interface subsystem 730, a macro interface subsystem 740, memory 715, and a processor module 725, all in communication with each other directly or indirectly (e.g., over one or more buses). Unlike the FCS 640*a* of FIG. 7A, the FCS 640*b* of FIG. 7B includes communications management controller 710. Embodiments of the communications management controller 710 are implemented as part of the processor module 725 to provide substantially the same functionality as that of the communications management subsystem 710 shown in FIG. 7A.

As discussed above, embodiments of FCSs 640, such as those described in FIGS. 7A and 7B, can interact with FAPs 230, like the one described in FIG. 2A, to facilitate FAP 230 assisted hand-in. For example, when an AT 115 approaches a FAP 230, the FAP 230 detects the AT 115 in its proximity using an OOB link (e.g., Bluetooth paging procedure) or vice versa. In addition to or as part of the OOB detection procedure, the FAP 230 may determine whether the AT 115 is an authorized user. For example, the FAP 230 may check an access control list to determine whether the AT 115 is authorized to access macro communications services via the FAP 230.

Having discovered each other (and the FAP 230 having validated the AT 115 as an authorized user), the FAP 230 registers the AT 115 with the FCS 640. For example, the FAP 230 maintains an AT mapping 219 between the AT's 115 OOB identifier (e.g., the Bluetooth device address, WiFi MAC address) detected during the detection procedure and a cell identifier of the AT 115, like the AT's 115 IMSI. The FAP 230 may register the AT 115 with the FCS 640 according to the AT's 115 cell identifier.

In some embodiments, the OOB radio range (e.g., the edge of Bluetooth coverage) is greater than the FAP 230 coverage range, such that the detection and registration of the AT 115 may be performed before the AT 115 detects the FAP 230. Thus, in many cases, a, OOB presence indication may be communicated by the FAP 230 to the FCS 640 for the AT 115 before any handoff has been triggered by a measurement report of the AT 115 (i.e., the AT 115 may effectively be "pre-registered" upon receipt of any handoff request implicating the AT).

Notably, various types of registration or pre-registration may be available in the macro network 100 and/or FAP 230 context. As used herein, "registration" and "pre-registration" are intended to refer specifically to registration of an AT 115 with an FCS 640 using OOB presence indication. When a handoff is triggered and a handoff request is received at the FCS 640 (e.g., from the MSC 650), the FCS 640 may be able to correlate the OOB presence indication with the handoff request (e.g., according to the AT's 115 cell identifier). With this information, the FCS 640 can uniquely identify the appropriate target FAP 230 and reliably proceed with the hand-in.

In some cases, the FCS 640 communicates the handoff request to the FAP 230 with a flag indicating that FCS 640 thinks that the AT 115 is in proximity of the FAP 230 based on the FAP's 230 prior OOB presence indication with the AT's 115 cell identifier (e.g., IMSI). Having received the flag, the FAP 230 may try to detect the AT 115 again (e.g., over an OOB channel using the OOB femto-proxy, over a macro channel using reverse-link sensing, or both). If the AT 115 is no longer in the FAP's 230 proximity, the FAP 230 can reject the handoff request from the FCS 640. Further certain types of de-registration techniques may be used, as described below.

According to one de-registration technique, an AT 115 is explicitly deregistered by communicating an OOB absence indication to the FCS 640. For example, the OOB femto-proxy 240 and/or the FAP 230 may detect link loss with the AT 115 and send a de-registration request to the FCS 640 in the form of an OOB absence indication. According to another de-registration technique, an AT 115 may be de-registered if a certain amount of time elapses after registration without receiving a corresponding handoff request. According to yet another de-registration technique, an AT 115 may be explicitly or implicitly de-registered upon acknowledgement of handoff to the target FAP 230.

In some embodiments, registration is only performed for active ATs 115. In one illustrative scenario, as described above, registration is based on detection over an OOB link and subsequent communication to the FCS 640 of an OOB presence indication. In this scenario, the FAP 230 may not know whether the AT 115 is in WWAN idle state or active state (e.g., in a voice call). For idle handoff, the FAP's 230 pre-registration with the FCS 640 with the AT's 115 cell identifier (e.g., IMSI) is ignored. For example, implicit de-registration may occur if a handoff request message does not arrive at FCS 640 prior to a timeout.

In another illustrative scenario, also as described above, registration is based on detection over the OOB link and then over the WWAN using reverse-link sensing. In this scenario, the FAP 230 knows the AT 115 is in WWAN active state. In some embodiments, idle ATs 115 are not pre-registered. For example, the FAP 230 will not send a registration request to the FCS 640 if the AT 115 is detected over the OOB link but not by reverse-link sensing (i.e., indicating that the AT 115 is in proximity but operating in WWAN idle state).

In yet another illustrative scenario, a handoff request message arrives at the FCS 640 (e.g., as a FACDIR2 message from the core network 630) implicating an AT 115. Even if the AT 115 has been pre-registered (e.g., by an OOB presence indication), the FCS 640 may send a handoff request to the FAP 230 with a flag indicating that the FCS 640 believes the AT 115 is in proximity of that specific FAP 230 based on the pre-registration. In some embodiments, the FAP 230 again tries to detect the AT 115 over the OOB link or using reverse-link sensing. If it fails, the FAP 230 may reject the handoff request; if it succeeds, the FAP 230 may accept the handoff request.

Notably, in the above scenarios, reverse-link sensing may be triggered by OOB link detection and not done otherwise. The reverse-link sensing may typically be performed using the AT's 115 public long code mask that is fixed (i.e., the private long code mask may not typically be used commercially). Accordingly, the reverse-link sensing can be configured at the FAP 230, such that mappings between the cell identifier of the AT 115 (e.g., the IMSI), the OOB identifier of the AT 115 (e.g., Bluetooth device address or WiFi MAC address), and the public long code mask of the AT 115 are maintained at the FAP 230.

If the registration request is received at the FCS 640 after a corresponding handoff request implicating the AT 115 is received at the FCS 640, the FCS 640 may handle the hand-in in various ways, as described more fully below (e.g., with reference to the call flow diagram of FIG. 14). For example, even when the registration request is received after a corresponding handoff request, techniques described herein may be used to help facilitate active hand-in. Alternatively, there may be no hand-in, or techniques described above may be used, like blind hand-in, reverse-link sensing, etc.

It will be appreciated that the FAP 230 assisted hand-in techniques described herein provide certain features. One feature is that the techniques may be used to reliably determine an appropriate target FAP 230 for active hand-in. Another feature is that pre-registration through communication of OOB presence indications may reduce or eliminate latencies relating to the measurement request and response timer used in reverse link sensing techniques. Yet another feature is that core network signaling (e.g., from measurement request and response) may be reduced. Still another feature is that the FAP 230 may be implemented without the extra radio used for reverse link sensing (however, some embodiments may use techniques described herein as enhancements to reverse-link sensing techniques, such that the extra radio may still be desired). And another feature is that no changes may be needed in the AT 115, the air interface, or the legacy infrastructure. The techniques may be implemented with changes only to the FAP 230 and the FCS 640.

Figure 8A:
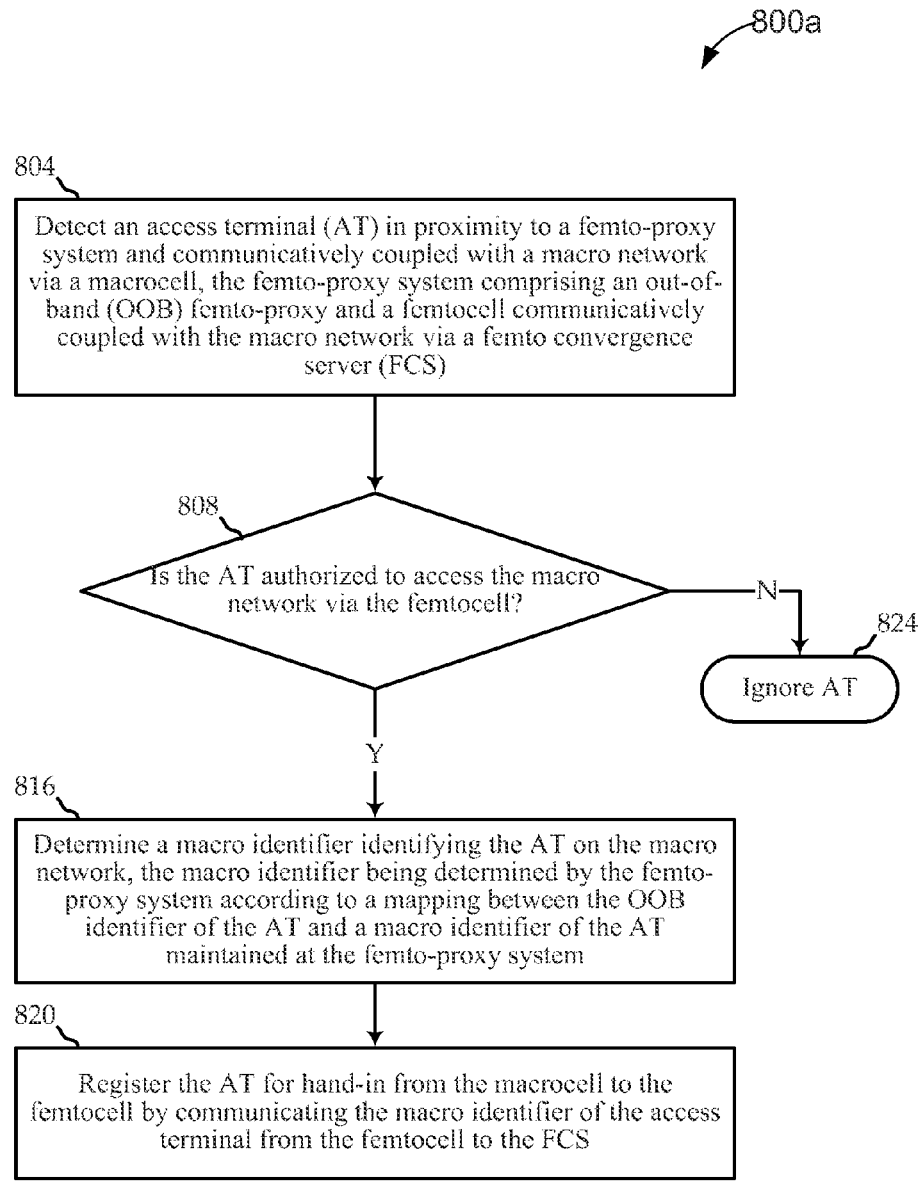
FIG. 8A shows a flow diagram of an exemplary method for handling AT registration with a FAP.

Embodiments of FAP 230 assisted hand-in techniques are described below with reference to methods of FIGS. 8A-17. Turning first to FIG. 8A, a flow diagram is shown of an exemplary method 800a for handling AT registration at an FCS using a FAP. The method 800a begins at stage 804 by detecting an AT 115 in proximity to a femto-proxy system 290 and communicatively coupled with a macro network 100 via a macrocell (macro BTS 105). For example, the AT 115 is camped on the macrocell and may or may not be in active cellular communications. The femto-proxy system 290 includes an OOB femto-proxy 240 and a femtocell (FAP 230)

communicatively coupled with the macro network 100 via a femto convergence system (FCS) 640.

At stage 808, a determination is made as to whether the AT 115 is authorized to access the macro network 100 via the FAP 230. For example, the FAP 230 maintains an access control list (e.g., a "white list") with ATs 115 authorized to attach to the FAP 230 (e.g., authorized to access macro communications services via the FAP 230). If it is determined at stage 808 that the AT 115 is not authorized to access the macro network 100 via the FAP 230, the method 800*a* may abort. For example, the method 800*a* may ignore the AT 115 at stage 824.

If it is determined at stage 808 that the AT 115 is authorized to access the macro network 100 via the FAP 230, a cell identifier identifying the AT 115 on the macro network 100 (e.g., the IMSI) is determined by the FAP 230 at stage 816. For example, as part of detecting the AT 115 at stage 804, an OOB identifier corresponding to the AT 115 (e.g., the BD_ADDR) is detected using the OOB femto-proxy 240 over an OOB communications link. As discussed above, the FAP 230 maintains AT mappings 219 between a corresponding OOB identifier and cell identifier for a particular AT 115.

At stage 820, the AT 115 is registered for hand-in from the macro BTS 105 to the FAP 230. For example, the FAP 230 communicates at least the AT's 115 cell identifier to the FCS 640 as part of a registration message. As discussed above, the OOB range may be greater than (e.g., or at least substantially the same as) the femto range, such that the stages of the method 800*a* (e.g., from the proximity detection at stage 804 to communication of the registration method at stage 820) may, in some cases, occur before the AT 115 enters the femto range. In this way, the registration may occur before the AT's 115 measurement report indicates the FAP 230 and before any handoff to the FAP 230 is determined by the macro network 100.

As described above with reference to FIGS. 6A and 6B, various configurations may use different types of OOB proximity detection to facilitate registration (e.g., pre- and/or post-registration using OOB presence indication). For example, portions of the method 800*a* may be different, depending on whether the OOB proximity detection was being performed using a configuration like the one shown in FIG. 6A (e.g., using a Bluetooth radio as an OOB femto-proxy 240 physically integrated with the FAP 230) or using a configuration like the one shown in FIG. 6B (e.g., using a WiFi access point as an OOB femto-proxy 240 logically integrated with the FAP 230). For the sake of added clarity, an example of each of these types of scenario is described in FIGS. 8B and 8C.

Figures 8B, 8C:
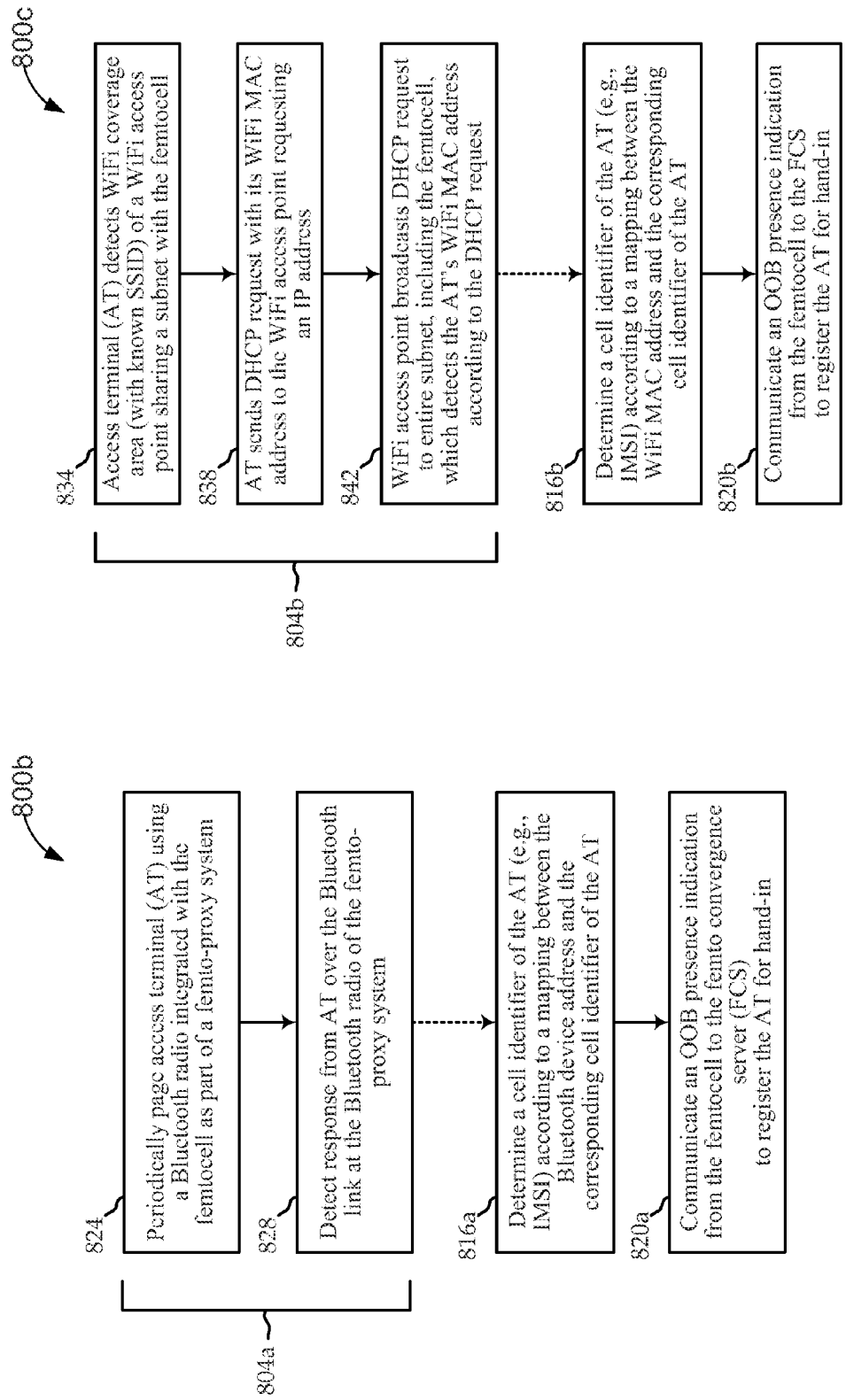
FIG. 8B shows a flow diagram of an exemplary method for handling AT registration with a FAP using a Bluetooth radio for out-of-band proximity detection.
FIG. 8C shows a flow diagram of an exemplary method for handling AT registration with a FAP using a WiFi access point for out-of-band proximity detection.

Turning first to FIG. 8B, a flow diagram is shown of an exemplary method 800*b* for handling AT registration in the context of a Bluetooth radio being used as an OOB femto-proxy 240 physically integrated with a FAP 230. For the sake of added clarity, reference numerals from FIG. 8A are used with the addition of a lower-case "a" to indicate a possible illustrative implementation of the corresponding stage from FIG. 8A in the context of FIG. 8B. Accordingly, the method 800*b* begins with stage 804*a* in which a Bluetooth radio, configured as an OOB femto-proxy 240 integrated with a femtocell (FAP 230) as part of a femto-proxy system 290, is used to detect an AT 115 in proximity to the femto-proxy system 290.

Stage 804*a* includes stages 824 and 828. At stage 824, the Bluetooth radio (i.e., OOB femto-proxy 240) periodically pages the AT 115 to see whether the AT 115 is in its proximity. As used herein, "periodically" is intended broadly to convey types of signaling that are non-continuous. For example, periodically may include signaling (e.g., paging) at predefined intervals, according to particular thresholds, etc. At stage 828, the Bluetooth radio detects a response from the AT 115 over a Bluetooth link.

Having received the response from the AT 115, the femto-proxy system 290 is aware that the AT 115 is in proximity, and the femto-proxy system 290 knows the Bluetooth device address (e.g., BD_ADDR) of the AT 115. As described above, the Bluetooth device address effectively provides a unique out-of-band identifier for the AT 115. In some configurations, the femto-proxy system 290 makes further determinations. For example, the femto-proxy system 290 may determine whether the AT 115 is authorized to access the macro network 100 via the FAP 230 (e.g., as described with reference to stages 808 and 824 of FIG. 8A).

At stage 816*a*, a cell identifier identifying the AT 115 on the macro network 100 (e.g., the IMSI) is determined. For example, AT mappings 219 between a corresponding OOB identifier and cell identifier for a particular AT 115 may be maintained by the FAP 230, such that the FAP 230 may determine the cell identifier of the AT 115 from its corresponding Bluetooth device address. Alternatively, the mappings may be maintained at the FCS 640.

At stage 820*a*, the AT 115 is registered for hand-in from the macro BTS 105 to the target FAP 230. In particular, the FAP 230 communicates an OOB presence indication to the FCS 640 with an identifier of the AT 115 to register the AT 115 with the FCS 640. In some exemplary configurations, in which the AT mappings are maintained at the FAP 230, the OOB presence indication may be communicated to the FCS 640 with the AT's 115 cell identifier (e.g., and OOB identifier, in some configurations). In other configurations, in which the AT mappings are maintained at the FCS 640, the OOB presence indication may be communicated to the FCS 640 with the AT's 115 OOB identifier, and the FCS 640 then determines the mapping to the corresponding cell identifier (e.g., according to stage 816*a*.

Using Bluetooth for proximity may provide a number of features. For example, Bluetooth may allow for relatively low-power paging, range that may be similar to that of the femtocell coverage area, etc. Further, many ATs 115 may already be equipped with Bluetooth radios, such that the techniques may be implemented with little or no changes to the ATs 115. However, certain limitations may manifest in some configurations. For example, the FAP 230 may need to be integrated with the Bluetooth radio, and certain types of provisioning may be difficult. Further, when using an open-femtocell (e.g., no access control list) or enterprise-type configuration, it may be difficult or inefficient to page the large number of Bluetooth addresses corresponding to all ATs 115 that may be in proximity.

According to another approach, FIG. 8C shows a flow diagram of an exemplary method 800*c* for handling AT registration in the context of a WiFi access point being used as an OOB femto-proxy 240 logically integrated with the FAP 230. For example, the method 800*c* may be implemented using the system 600*b* of FIG. 6B. For the sake of added clarity, reference numerals from FIG. 8A are used with the addition of a lower-case "b" to indicate a possible illustrative implementation of the corresponding stage from FIG. 8A in the context of FIG. 8C. Accordingly, the method 800*c* begins with stage 804*b* in which a WiFi access point, configured as an OOB femto-proxy 240 on a shared subnet with a femtocell (FAP 230) as part of a femto-proxy system 290, is used to detect an AT 115 in proximity to the femto-proxy system 290.

Stage 804*b* includes stages 834, 838, and 842. At stage 834, the AT 115 enters the coverage area of the WiFi access point and detects the WiFi access point with its Service Set Identifier (SSID). At stage 838, the AT 115 sends a Dynamic Host Configuration Protocol (DHCP) request to the WiFi access point. The AT 115 uses the DHCP request to request an internet protocol (IP) address from the WiFi access point, and the DHCP request includes the AT's 115 WiFi MAC address.

In response to the DHCP request, the WiFi access point broadcasts the request to all the devices on its subnet to ask for available IP addresses at stage 842. For example, the WiFi access point uses a subnet-wide broadcast address (e.g., 255.255.255.255) to communicate the DHCP request to the entire subnet. Notably, the FAP 230 is on the subnet, and the DHCP request includes the WiFi MAC address of the AT 115. Accordingly, the FAP 230 is made aware of the proximity of the AT 115 and the AT's 115 OOB identifier.

Having received indication of the AT's 115 proximity and its OOB identifier, the method 800c proceeds substantially as discussed with reference to FIGS. 8A and 8B. For example, at stage 816b, a cell identifier identifying the AT 115 on the macro network 100 (e.g., the IMSI) is determined by the FAP 230 (e.g., or by the FCS 640 subsequent to receiving a registration request). At stage 820b, the FAP 230 communicates an OOB presence indication to the FCS 640 with an identifier of the AT 115 to register the AT 115 with the FCS 640. As discussed above, the OOB presence indication may be communicated to the FCS 640 with the AT's 115 cell identifier and/or the OOB identifier, depending, for example, on where the AT mappings are maintained.

It is worth noting that, particularly when the AT 115 has not previously paired with the FAP 230, there may be no mapping between the AT's 115 WiFi MAC address and a corresponding cell identifier. For example, for some configurations, (e.g., some residential, enterprise, closed access, etc.), mappings may be generated as part of access control lists, pairing procedures, etc. However, in the context of an open access femtocell, any AT 115 may detect the FAP 230 via the WiFi access point. In one exemplary configuration, the AT 115 detects a Universal Plug and Play (UPnP) advertisement from the FAP 230 over the WiFi link. In response, the AT 115 may inform the FAP 230 of its cell identifier via a UPnP remote procedure call. In another exemplary configuration, an application is provided that periodically synchronizes the WiFi MAC addresses and cell identifiers with an operator (e.g., and/or whenever a SIM card is swapped).

Using WiFi for proximity may provide some similar features to those of Bluetooth, for example, including relatively low-power detection, range that may be similar to that of the femtocell coverage area, an increasing ubiquity of AT's 115 with integrated WiFi capabilities, etc. Further, the WiFi approach may provide certain features in an enterprise and/or open-fentocell context. For example, the WiFi access point may be located between coverage areas of two or more FAPs 230, both being within its subnet. In some configurations, when a first FAP 230 detects the AT 115 on the subnet (e.g., according to stages 834-842), the first FAP 230 may also request a soft handoff leg from a second FAP on the subnet. In this way, if the first FAP 230 is not the optimal FAP for the active hand-in, a soft handoff between the first and second FAPs 230 may be initiated.

Certain limitations may also manifest when using WiFi in some configurations. For example, where it is desirable to physically separate the FAP 230 from the WiFi access point, the FAP 230 may still need some way of communicating with the WiFi access point in order to receive the broadcast of the DHCP request. According to another potential limitation, using WiFi for proximity detection may adversely impact battery life; but various techniques may be used to mitigate this limitation (e.g., applications that turn the WiFi radio on or off according to geographic location of the AT 115).

Figure 9:
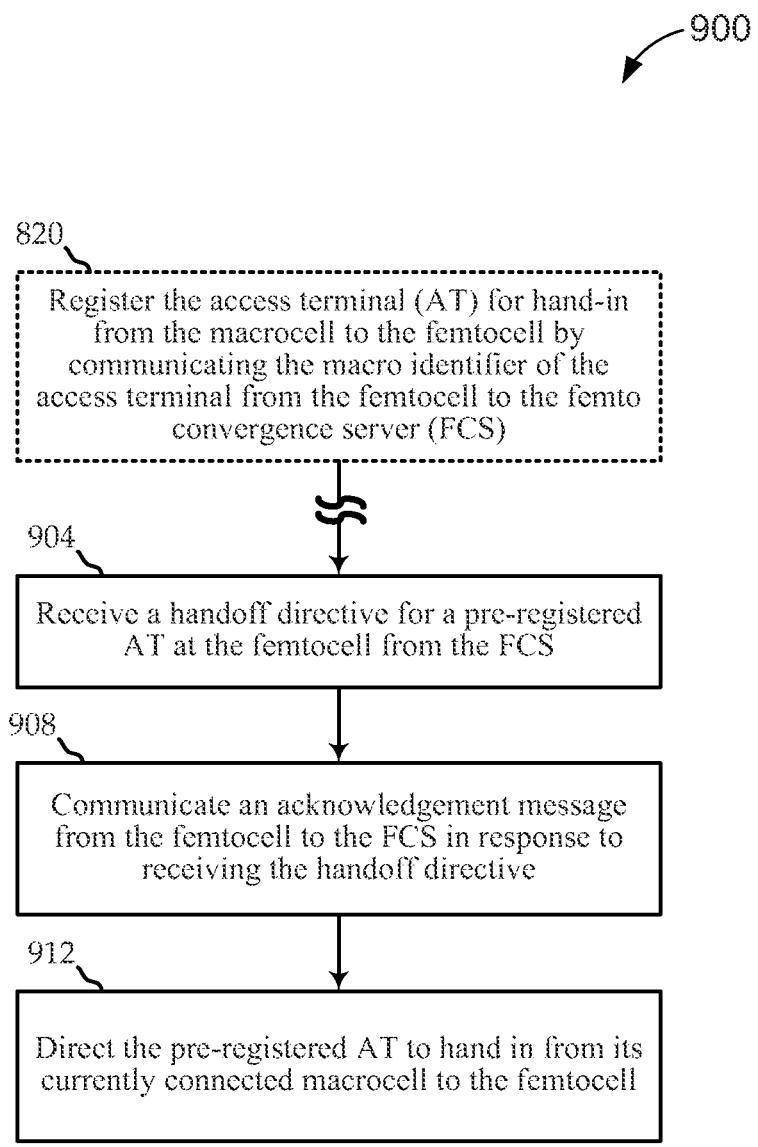
FIG. 9 shows a flow diagram of an exemplary method for handling active hand-ins with a FAP.

FIG. 9 shows a flow diagram of an exemplary method 900 for handling active hand-ins with a FAP. The method 900 is shown in the context of stage 820 of FIG. 8 for added clarity. For the sake of illustration, the method 900 is described for an AT 115 that was registered by the FAP 230 with the FCS 640, for example, according to the method 800 of FIG. 8.

Accordingly, the method 900 begins at stage 904 by receiving a handoff request for a pre-registered AT 115 (an AT 115 for which OOB presence indication has previously been communicated to the FCS 640) at the FAP 230 from the FCS 640. In some embodiments, the FAP 230 maintains an awareness of its registration of the AT 115, such that it is aware of the proximity of the AT 115 when the handoff request is received. In other embodiments, the handoff request includes a flag or other indication to the FAP 230 that the implicated AT 115 is believed to be in the FAP's 230 proximity (e.g., that the AT 115 has been pre-registered by the FAP 230 by communicating an OOB presence indication to the FCS 640).

At stage 908, an acknowledgement message may be communicated from the FAP to the FCS 640 in response to receiving the handoff request. The messaging between the FAP 230 and the FCS 640 may be implemented across one or more networks. For example, the acknowledgement message may be communicated from the FAP 230 to a secure gateway at the edge of a core network over an Internet Protocol Security (IPsec) tunnel, from the secure gateway to an IP Multimedia Subsystem (IMS) network in the core network, and from the IMS network to the FCS 640 in the core network.

At stage 912, the pre-registered AT is directed to hand in active communications from its currently connected (source) macro BTS 105 to the target FAP 230. Notably, the AT 115 does not typically receive any handoff direction from the FAP 230. Rather, the FAP 230 acknowleges the handoff request to indicate that it is an appropriate handoff target, and macro network 100 elements (e.g., the source macro BTS 105) ultimately communicate the handoff directive to the AT 115.

Figure 10:
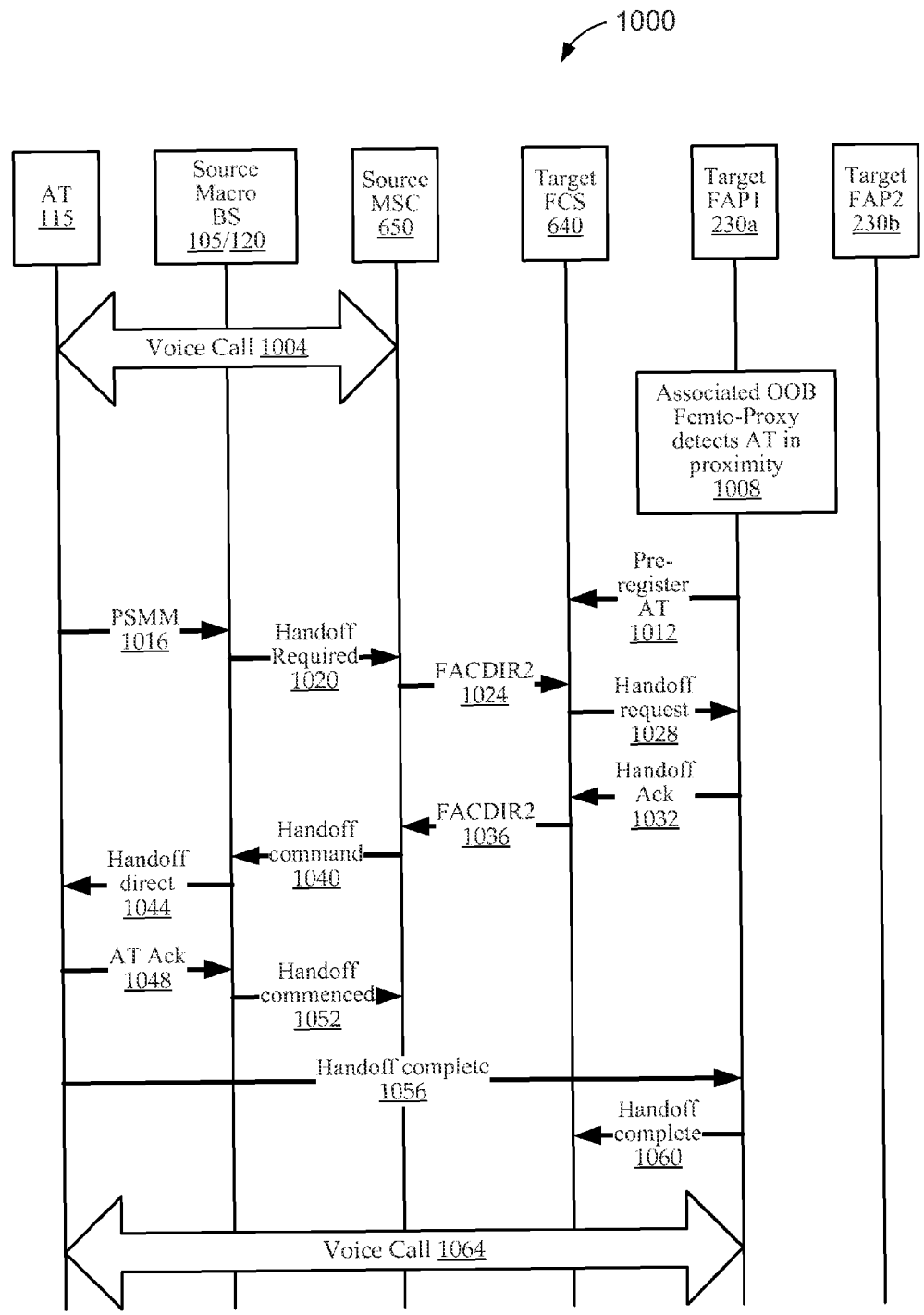
FIG. 10 shows an exemplary call flow diagram illustrating an active hand-in according, for example, to the methods of FIGS. 9 and 10.

An exemplary call flow diagram 1000 illustrating an active hand-in according to the methods 800 and 900 of FIGS. 8 and 9 is shown in FIG. 10. The call flow diagram 1000 shows communications between an AT 115, a currently connected (source) macro BS 105/120, a source MSC 650, a target FCS 650, and two potential target FAPs 230. For the sake of avoiding excess detail, the source macro BS includes a source macro BTS 105 in communication with a macro BSC 120, and signaling between those elements is not shown. It is assumed for the sake of the call flow diagram 1000 that the potential target FAPs 230 have a common cell identifier (e.g., they have the same PN offset). As such, it may be necessary to reliably determine the appropriate one of the potential target FAPs 230 to ensure a successful active hand-in.

The call flow diagram 1000 begins at stage 1004 with the AT 115 currently engaged in an active macro communications, like a voice call or a data call, facilitated by the source MSC 650 via the source macro BS 105/120. As some time, the AT 115 moves into proximity of the OOB femto-proxy 240 associated with a first of the potential target FAPs 230a (e.g., the OOB femto-proxy 240 and the first potential target FAP 230a are integrated into a femto-proxy system 290). At stage 1008, the OOB femto-proxy 240 detects the AT 115 in its proximity (e.g., as in stage 804 of FIG. 8). At stage 1012, the first potential target FAP 230a sends an OOB presence indication (a registration request) to the target FCS 650 to pre-register the AT 115 (e.g., according to stage 820 of FIG. 8).

At some time thereafter, the AT 115 moves into the femto coverage area of the FAP 230, detects the FAP 230, and sends a measurement report (e.g., PSMM) to the source macro BS 105/120 at stage 1016. The measurement report includes the pilot strength of the FAP 230 as observed by the AT 115 and the PN offset of the FAP 230. The source macro BS 105/120 determines that a handoff is required according to the measurement report and communicates a handoff required message to the source MSC 650 at stage 1020. At stage 1024, the handoff required message is communicated (e.g., as a FACDIR2 message over the core network) from the source MSC 650 to the target FCS 640.

Having received a handoff request, the target FCS 650 now determines which potential target FAP 230 is the correct target for the hand-in. For example, the handoff request includes the IMSI of the AT 115 and the PN offset of the target FAP 230. However, in this exemplary case, two potential target FAPs 230 have the same PN offset, such that one cannot be uniquely identified by the PN offset alone. Using traditional techniques, as described above, the handoff request may be addressed, for example, by ignoring the hand-in, by blindly selecting one of the potential target FAPs 230, by initiating reverse link sensing at potential target FAPs 230 to detect the AT 115, etc. However, having received the OOB presence indication at stage 1012, the target FCS 650 can reliably select the first potential target FAP 230*a* as the correct target FAP 230 for the hand-in.

At stage 1028, the target FCS 640 sends the handoff request to the first target FAP 230*a*. The first target FAP 230*a* responds to the target FCS 640 with a handoff acknowledgement message at stage 1032. The handoff is then communicated to the AT 115 via the core network and the macro network 100. Notably, while referred to generically herein in some instances as "handoff requests" for the sake of simplicity, each related message may, in fact, be of a different form and/or purpose. For example, as illustrated, a handoff acknowledgement may be communicated from the target FCS 640 to the source MSC 650 as a FACDIR2 message at stage 1036; a handoff command may be communicated from the source MSC 650 to the source macro BS 105/120 at stage 1040; and a handoff command may be communicated from the source macro BS 105/120 to the AT 115 at stage 1044.

The handoff process may then commence. For example, at stage 1048, the AT 115 communicates an acknowledgement message to the source macro BS 105/120; and, at stage 1052, the source macro BS 105/120 communicates a handoff commenced message to the source MSC 650. At stage 1056, the AT 115 also communicates a handoff complete message to the first potential target FAP 230*a*; and the first potential target FAP 230*a* communicates the handoff complete message to the target FCS 640 at stage 1060. Having completed the hand-in, the AT's 115 active macro communications (e.g., the voice call) continue at stage 1064 facilitated by the appropriately identified target FAP (i.e., previously the first potential target FAP 230*a*) instead of by the source macro BS 105/120.

It is worth noting that the call flow diagram 1000 is intended to show only an exemplary call flow and is simplified in many ways to add clarity. For example, while a "handoff request" is discussed in a number of stages, it will be appreciated that each element may communicate the message in similar or different forms with similar or different information included. As such, the call flow diagram 1000 should not be construed as limiting the scope of the disclosure or claims.

It is further worth noting that it may be necessary or desirable to de-register ATs 115 in certain cases. For example, suppose that an AT 115 is registered by a first FAP 230*a*. Later, the AT 115 moves into proximity of a second FAP 230*b* that has the same PN offset of the first FAP 230*a*, but is located well out of range of the first FAP 230*a* (e.g., miles away). The AT 115 may send a measurement report with the shared PN offset, triggering a handoff request. At this stage, the FCS 640 may have to use one or more techniques to determine that handoff to the second FAP 230*b*, rather than to the first FAP 230*a*, is desired. Otherwise, registration by the first FAP 230*a* may cause the FCS 640 to attempt a hand-in of the active communications of the AT 115 from its current macro BS 105 to the first FAP 230*a*, even though the AT 115 is well out of range of the first FAP 230*a*, which may cause undesirable results (e.g., an active voice call may be dropped). Registration timestamps, de-registration, and/or other techniques described herein may be used to address this issue, as described more fully below.

Figure 11:
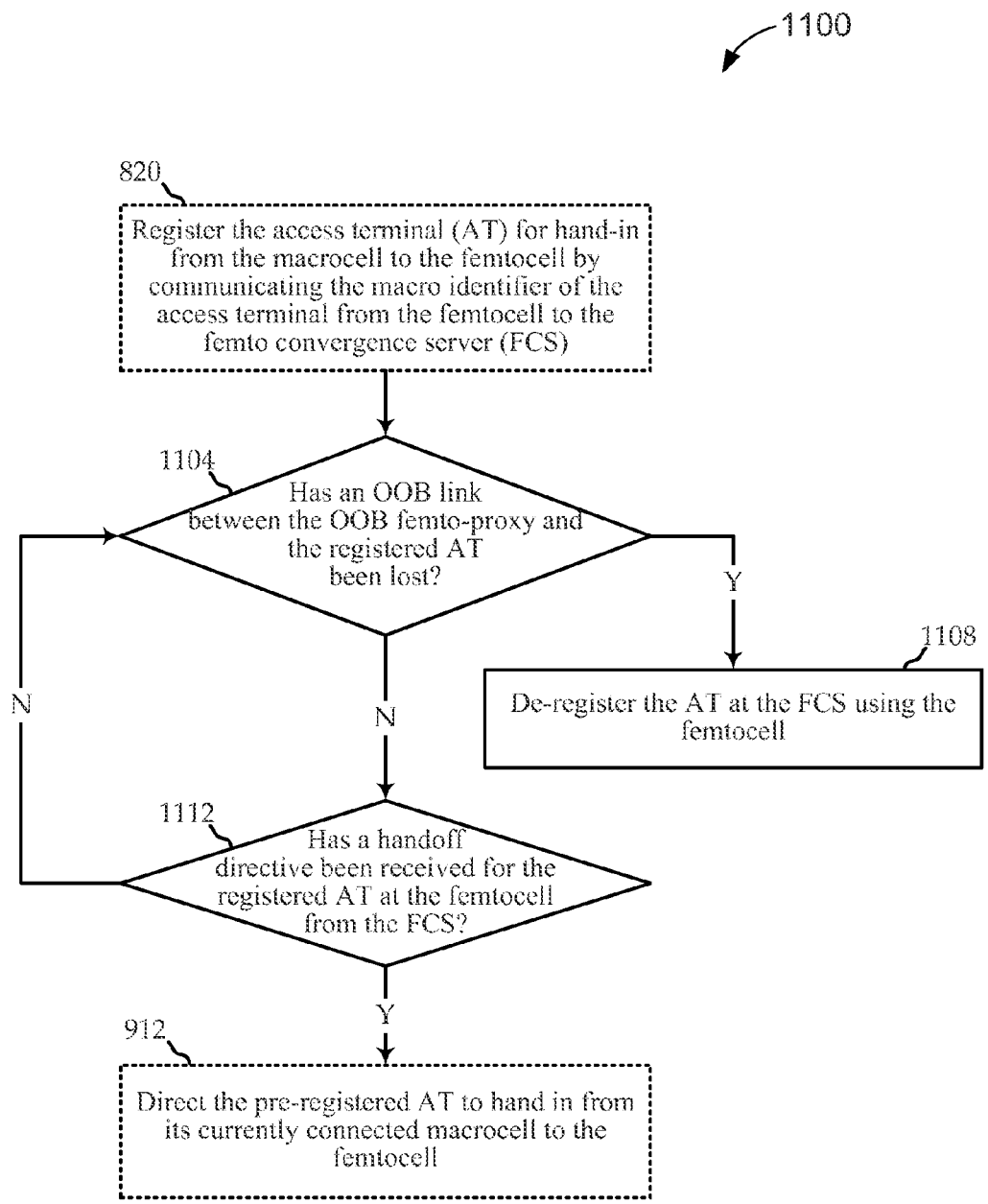
FIG. 11 shows a flow diagram of an exemplary method for handling de-registration of AT with a FAP.

FIG. 11 shows a flow diagram of an exemplary method 1100 for handling de-registration of ATs. The method 1100 is shown in the context of stage 820 of FIG. 8 for added clarity. For the sake of illustration, the method 1100 is described for an AT 115 that was registered by the FAP 230 with the FCS 640, for example, according to the method 800 of FIG. 8.

The method 1100 begins at stage 1104 by determining whether an OOB communications link between the OOB femto-proxy (femto-proxy 240) and the registered AT 115 has been lost. As described above (e.g., with reference to block 804 of FIG. 8), an OOB link may be established between the AT 115 and an OOB femto-proxy associated with the target FAP 230. If the OOB link is lost (e.g., at all, for a predetermined minimum duration, etc.), this may indicate that the AT 115 is no longer in proximity to the FAP 230.

If it is determined at stage 1104 that the OOB link has been lost (e.g., since registration of the AT 115), the AT 115 may be de-registered at the FCS 650 by the FAP 230 at stage 1108. If it is determined at stage 1104 that the OOB link has not been lost, the method 1100, a further determination may be made at block 1112 as to whether a handoff request has been received for the registered AT 115 at the FAP 230. If a handoff request has not been received, the method 1100 may iterate through stages 1104 and 1112 until either the OOB link is determined to be lost at stage 1104 or the handoff request is received at stage 1112. If a handoff request has been received for the registered AT 115 at the FAP 230, the registered AT 115 may be directed to hand-in (e.g., according to stage 912 of FIG. 9).

Certain embodiments may handle de-registration in other ways. For example, in one exemplary configuration, the method 1100 may explicitly de-register the AT 115 after completing the hand-in (e.g., successfully and/or unsuccessfully). Notably, however, it may be useful to maintain the registration (i.e., not de-register the AT 115) even after hand-in to provide the network with knowledge about the proximity of the AT 115 and/or other types of information that can be gained from the registration.

According to another exemplary configuration, when the AT 115 is registered at the FCS 640, the registration is associated with a timestamp. For example, the registering FAP 230 may communicate an OOB presence indication that includes the AT's 115 cell identifier (e.g., or OOB identifier) and a timestamp. If another FAP 230 subsequently sends a registration request to the FCS 640 for the same AT 115, the new registration request will include a later timestamp. The FCS 640 may then consider any prior registration request to be invalid, and facilitate handoff to the later-requesting FAP 230. For example, the AT 115 may implicitly be de-registered from prior-requesting FAPs 230 upon receiving a subsequent registration request at the FCS 640.

According to still another exemplary configuration, timer-based de-registration is implemented. For example, upon registering the AT 115, the FAP 230 may begin a timer (e.g., or otherwise begin tracking elapsed time). A certain timeframe (e.g., one minute) may be determined after which de-registration is appropriate. For example, setting the timeframe too small may cause the FAP 230 to have to re-register the AT 115 inefficiently, while setting the timeframe too large may allow the AT 115 to enter coverage areas of other FAPs 230 potentially sharing the same PN offset prior to the de-registration. Notably, timer-based de-registration may be undesirable in certain configurations. For example, after registration, a handoff request may not be received for a long time due to the AT 115 being idle or due to some other circumstance. If the AT 115 were implicitly de-registered prior to receiving the handoff request, benefits of the registration may be lost.

FIGS. 8-11 are discussed above primarily in context of pre-registration (i.e., communicating the OOB presence indication for an AT 115 prior to receiving a handoff request for the AT 115). It will be appreciated that similar techniques may be used in cases where the OOB presence indication is communicated subsequent to receiving a handoff request implicating the AT 115. For example, as described above, the FCS 640 may be unable to determine the appropriate target FAP 230 for hand-in based only on the cell identifier provided in the handoff request from the MSC 650, and may communicate a measurement request to all candidate target FAPs 230 (e.g., simultaneously).

Figure 12:
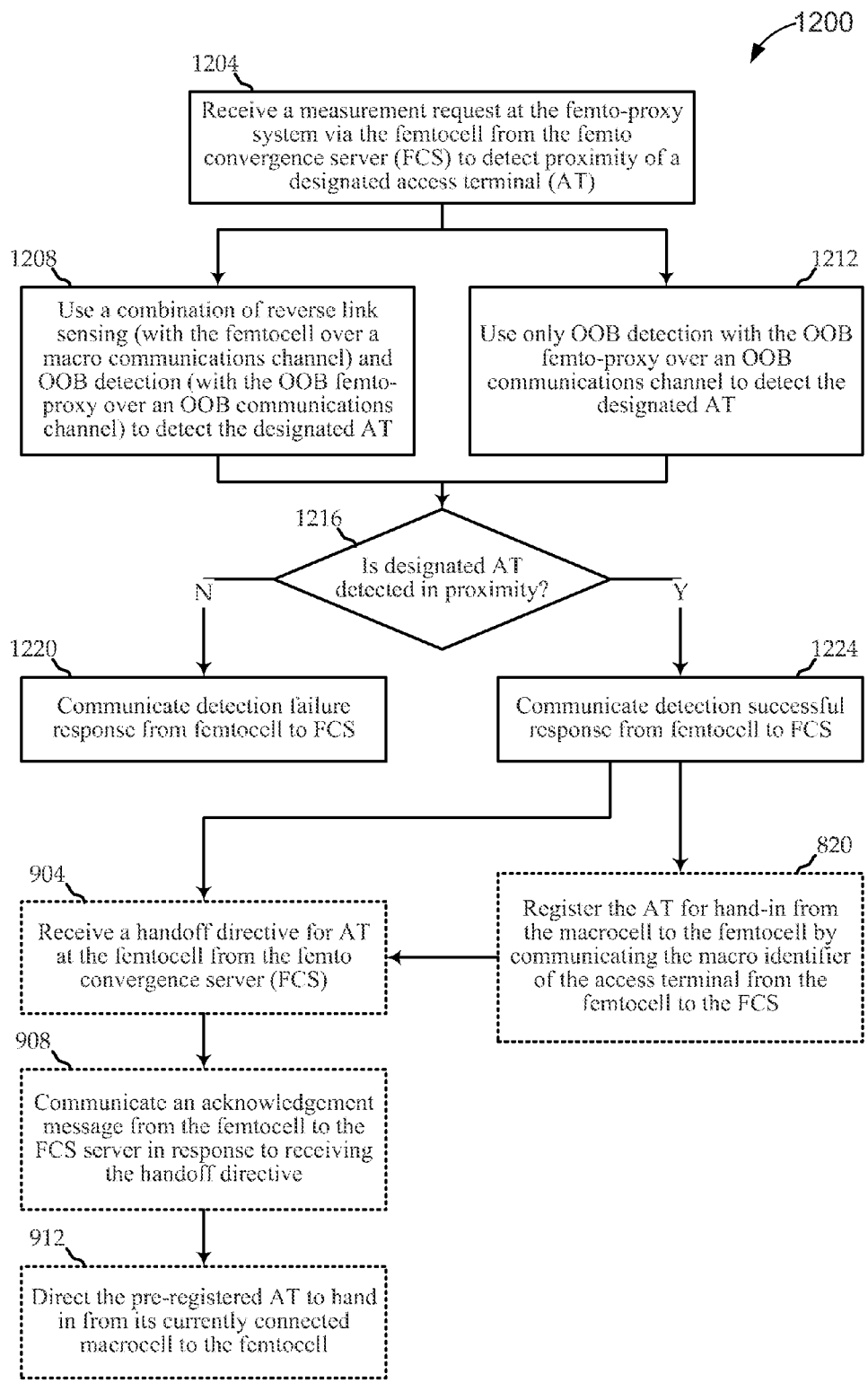
FIG. 12 shows a flow diagram of an exemplary method for implementing certain active hand-in functionality without OOB presence indication.

FIG. 12 shows a flow diagram of an exemplary method 1200 for implementing certain active hand-in functionality without pre-registration (i.e., without having communicated the OOB presence indication for an AT 115 prior to receiving a handoff request for the AT 115). The method 1200 begins at stage 1204 by receiving a measurement request at a femto-proxy system 290 via its FAP 230 from an FCS 640 to detect proximity of a designated AT 115. The proximity detection may be performed in various ways.

According to one embodiment, the FAP 230 may be implemented with an additional WWAN radio, as described above, for reverse-link sensing. At stage 1208, reverse link sensing is used by the FAP 230 (e.g., over a macro communications channel) to detect the designated AT 115, typically in combination with OOB sensing. For example, the FCS 640 may provide the FAP 230 with a public identifier of the AT 115, like its public long code mask, for use in the reverse-link sensing. Certain types of reverse-link sensing are described in the 3GPP2 technical specification. According to stage 1208, in addition to the reverse-link sensing using the WWAN radio, OOB sensing may be performed over the OOB link using an OOB femto-proxy 240 of the femto-proxy system 290. As described further below, adding OOB sensing to the reverse-link sensing may help mitigate the chance that multiple FAPs 230 will concurrently return a successful detection of the AT 115, as could occur when using reverse-link sensing alone.

According to another embodiment, the OOB femto-proxy 240 of the femto-proxy system 290 is used to detect the AT 115 over an OOB communications channel without also performing WWAN reverse-link sensing. For example, if the AT 115 is in the FAP's 230 AT mappings 219 (e.g., in the FAP's 230 access control list), the FAP 230 may be able to use the AT's 115 public long code mask, IMSI, etc. to determine the AT's 115 OOB identifier (e.g., BD_ADDR, WiFi MAC address). The FAP 230 may then detect the AT 115 over the OOB link.

Having used one or more techniques (e.g., according to stages 1208 and/or 1212) to detect the AT 115, a determination is made at stage 1216 as to whether the AT 115 is detected in proximity to the FAP 230. If it is determined at stage 1216 that the AT 115 is not detected in proximity to the FAP 230, the FAP 230 may communicate a detection failure response to the FCS 640 at stage 1220. If it is determined at stage 1216 that the AT 115 is detected in proximity to the FAP 230, the FAP 230 may communicate a detection successful response to the FCS 640 at stage 1224.

Having successfully detected the AT 115 in its proximity, the FAP 230 may handle the hand-in in various ways. According to one technique, the FAP registers the AT 115 for hand-in to the FAP 230 (e.g., by communicating the cell identifier of the AT 115 from the FAP 230 to the FCS 640 according to stage 820 of FIG. 8). Either having registered the AT 115 according to stage 820, or otherwise having communicated relevant information to the FCS 640 for the hand-in (e.g., as part of the detection successful message at stage 1224), the AT's 115 communications may be handed off to the FAP 230 in a reliable fashion. For example, the hand-in may be effectuated according to blocks 904-912 described with reference to FIG. 9.

FIGS. 8 and 12 focus primarily on handling of hand-in functionality from the perspective of an exemplary FAP 230. As described above and as illustrated by the call flow diagram 1000 of FIG. 10, active hand-in functionality is further facilitated by actions of the FCS 640. Exemplary techniques for handling of hand-in functionality from the perspective of an exemplary FCS 640 are described in FIGS. 13-16.

Figure 13:
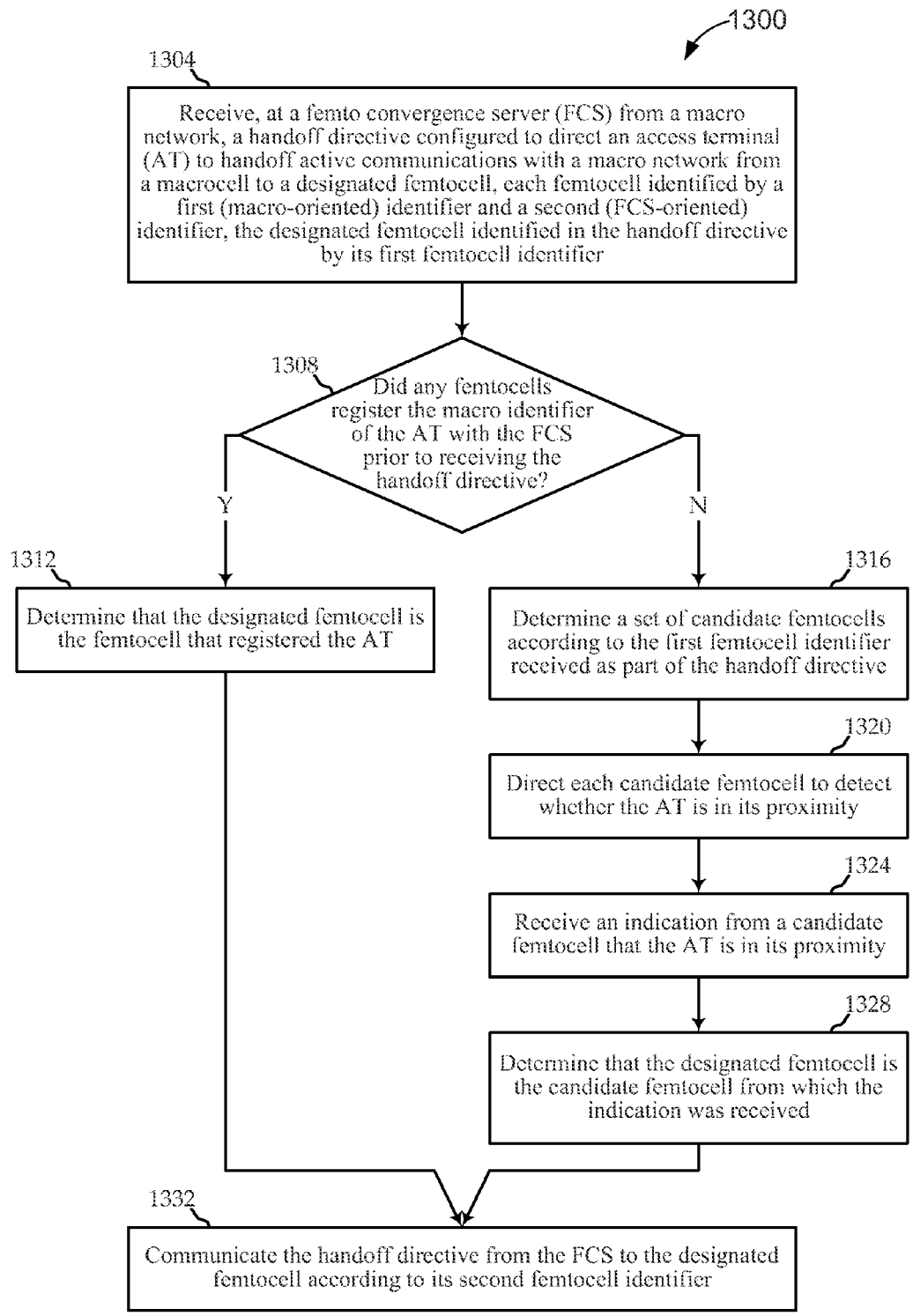
FIG. 13 shows a flow diagram of an exemplary method for handling FAP-assisted active hand-in at an exemplary FCS.

Turning to FIG. 13, a flow diagram is shown of an exemplary method 1300 for handling FAP-assisted active hand-in at an exemplary FCS. The method 1300 begins at stage 1304 by receiving a handoff request at the FCS 640 from a macro network 100 (e.g., from the MSC 650 over the core network). The handoff request is configured to direct an AT 115 to hand off active macro communications from a current (source) macro BTS 105 to a designated FAP 230. The designated FAP 230 is one of a number of FAPs 230 in communication with the FCS 640, and each FAP 230 is identifiable by a first cell identifier (e.g., a PN offset) and a second FCS-oriented identifier (e.g., an identifier used by the FCS 640 to uniquely address all the FAPs 230 in communication with the FCS 640).

As described above, the first femtocell identifier is substantially non-unique. For example, a number of FAPs 230 in the same macro sector may share the same first femtocell identifier (e.g., PN offset). On the contrary, the second femtocell identifier is substantially or completely unique. For example, the second femtocell identifier is at least unique enough so as to be used to reliably identify a particular FAP 230 from the perspective of the FCS 640. It is assumed that the designated FAP 230 is identified in the handoff request by its first femtocell identifier. For example, the first femtocell identifier is how the FAP 230 is identified by the AT 115 as part of its measurement report, which is then used to trigger the handoff request.

At stage 1308, a determination is made as to whether any FAPs 230 registered the cell identifier of the AT 115 (e.g., the IMSI) with the FCS 640 prior to receiving the handoff request at the FCS 640. If it is determined at stage 1308 that a particular ("registering") FAP 230 registered the cell identifier of the AT 115 with the FCS 640 prior to receiving the handoff request at the FCS 640, the designated FAP 230 is determined to be the "registering" FAP 230 at stage 1312 (i.e., the "registering" FAP 230 is determined to be the target FAP 230 for hand-in). Accordingly, at stage 1332, the handoff request may be communicated from the FCS 640 to the designated FAP 230 (i.e., the "registering" FAP) according to its second femtocell identifier. For example, the FCS 640 maintains a mapping for all its connected FAPs 230 between their respective first and second identifiers. The FCS 640 can uniquely address the handoff request to the designated FAP 230 by mapping the received first femtocell identifier (which may be substantially non-unique) to the maintained second femtocell identifier (which may be substantially unique).

If it is determined at stage 1308 that no FAPs 230 registered the cell identifier of the AT 115 (using an OOB presence indication) with the FCS 640 prior to receiving the handoff request at the FCS 640, the FCS 640 may use one or more techniques to handle the hand-in without being able to exploit pre-registration. For example, at stage 1316, a set of candidate target FAPs 230 may be determined by the FCS 640. For example, the FCS 640 may include in the set of candidates all FAPs 230 in the relevant macro sector associated with the received first femtocell identifier. As described above, the FCS 640 may implement a blind hand-off to any of the FAPs 230 in the candidate list.

In some embodiments, the FAPs 230 of the candidate list are directed to detect the AT 115 at stage 1320. For example, the FAPs may engage in proximity detection according to techniques described with reference to stages 1204-1224 of FIG. 12. It is possible that none of the candidate FAPs 230 will detect the AT 115 in its proximity, or that multiple candidate FAPs 230 will detect the AT 115 in their proximity. Various techniques may be used to abort the method 1300 where there is no successful detection (e.g., as described below in FIG. 15), or to select a "best" result when there are multiple successes. Notably, embodiments may use only OOB detection (e.g., according to stage 1208) or a combination of reverse-link and OOB detection (e.g., according to stage 1212). Use of the OOB detection may obviate the possibility that multiple successes would occur. Accordingly, and for the sake of clarity, it is assumed that one of the candidate FAPs 230 is identifiable by the FCS 640 as having successfully detected the AT 115 in its presence.

At stage 1324, an indication is received at the FCS 640 from one of the candidate FAPs 230 that the AT 115 is in its proximity. As discussed above, this may be a measurement response to a measurement request message, a registration message, etc. At stage 1328, the designated FAP 230 is determined to be the successful candidate FAP 230. Accordingly, at stage 1332, the handoff request may be communicated from the FCS 640 to the designated FAP 230 (i.e., the successful candidate FAP 230) according to its second femtocell identifier. For example, the FCS 640 determines the second femtocell identifier according to its maintained mapping, according to the detection successful message received at stage 1324, etc.

Figure 14:
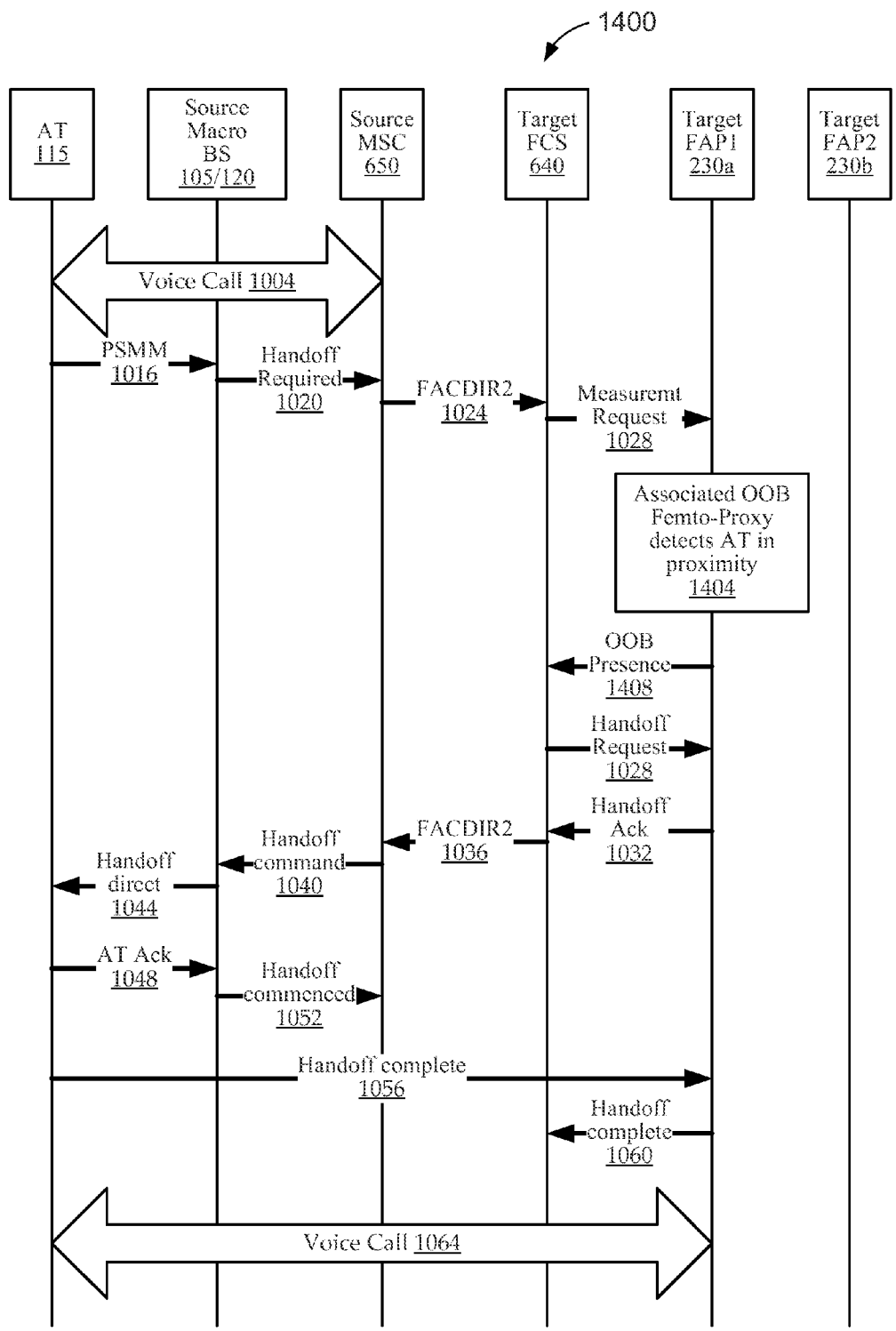
FIG. 14 shows an exemplary call flow diagram illustrating an active hand-in according, for example, to the methods of FIGS. 12 and 13, respectively.

An exemplary call flow diagram 1400 illustrating an active hand-in according to the methods 1200 and 1300 of FIGS. 12 and 13, respectively, is shown in FIG. 14. The call flow diagram 1400 is similar to the call flow diagram 1000 of FIG. 10, and similar messaging is described according to the same reference numbers as those used in FIG. 10. It will be appreciated that the messaging, while similar, may not be identical according to the circumstances of the different call flows. In particular, FIG. 10 described a pre-registration scenario, while FIG. 14 described a post-registration scenario.

As in FIG. 10, the call flow diagram 1400 shows communications between an AT 115, a currently connected (source) macro BS 105/120, a source MSC 650, a target FCS 650, and two potential target FAPs 230. For the sake of avoiding excess detail, the source macro BS includes a source macro BTS 105 in communication with a macro BSC 120, and signaling between those elements is not shown. It is assumed for the sake of the call flow diagram 1400 that the potential target FAPs 230 have a common cell identifier (e.g., they have the same PN offset). As such, it may be necessary to reliably determine the appropriate one of the potential target FAPs 230 to ensure a successful active hand-in.

The call flow diagram 1400 begins at stage 1004 with the AT 115 currently engaged in an active macro communications, like a voice call or a data call, facilitated by the source MSC 650 via the source macro BS 105/120. At some time, the AT 115 moves into the femto coverage area of the FAP 230, detects the FAP 230, and sends a measurement report (e.g., PSMM) to the source macro BS 105/120 at stage 1016. The measurement report includes the pilot strength of the FAP 230 as observed by the AT 115 and the PN offset of the FAP 230. The source macro BS 105/120 determines that a handoff is required according to the measurement report and communicates a handoff required message to the source MSC 650 at stage 1020. At stage 1024, the handoff required message is communicated (e.g., as a FACDIR2 message over the core network) from the source MSC 650 to the target FCS 640.

It is assumed in FIG. 14 that, at this stage, the AT 115 has still not been registered by any FAP 230 sharing the identifier indicated in the PSMM, such that multiple FAPs 230 are candidate target FAPs 230 for the hand-in. At stage 1404, the OOB femto-proxy 240 associated with a first of the potential target FAPs 230a (e.g., the OOB femto-proxy 240 and the first potential target FAP 230a are integrated into a femto-proxy system 290) detects the AT 115 in its proximity. For example, as described with reference to stages 1208 and 1212 of FIG. 12, the OOB proximity detection may be performed over the OOB link alone or in combination with other reverse-link detection techniques.

At stage 1408, when the AT 115 is detected by the first of the potential target FAPs 230a, the FAP 230a sends an OOB presence indication to the target FCS 640. For example, a mapping is maintained at the FAPs 230 and/or at the target FCS 640, which maps the cell identifier of the AT 115 (e.g., IMSI) with the corresponding OOB identifier of the AT 115 (e.g., Bluetooth device address or WiFi MAC address). This mapping may be used to identify the AT 115 as the one requiring the handoff per stage 1020.

Having received the OOB presence indication at stage 1408, the target FCS 650 can now reliably select the first potential target FAP 230a as the correct target FAP 230 for the hand-in. At stage 1028, the target FCS 640 sends the handoff request to the first target FAP 230a. The first target FAP 230a responds to the target FCS 640 with a handoff acknowledgement message at stage 1032. The handoff is then communicated to the AT 115 via the core network and the macro network 100. Notably, while referred to generically herein in some instances as "handoff requests" for the sake of simplicity, each related message may, in fact, be of a different form and/or purpose. For example, as illustrated, a handoff acknowledgement may be communicated from the target FCS 640 to the source MSC 650 as a FACDIR2 message at stage 1036; a handoff command may be communicated from the source MSC 650 to the source macro BS 105/120 at stage 1040; and a handoff command may be communicated from the source macro BS 105/120 to the AT 115 at stage 1044.

The handoff process may then commence. For example, at stage 1048, the AT 115 communicates an acknowledgement message to the source macro BS 105/120; and, at stage 1052, the source macro BS 105/120 communicates a handoff commenced message to the source MSC 650. At stage 1056, the AT 115 also communicates a handoff complete message to the first potential target FAP 230a; and the first potential target FAP 230a communicates the handoff complete message to the target FCS 640 at stage 1060. Having completed the hand-in, the AT's 115 active macro communications (e.g., the voice call) continue at stage 1064 facilitated by the appropriately identified target FAP (i.e., previously the first potential target FAP 230a) instead of by the source macro BS 105/120.

Figure 15:
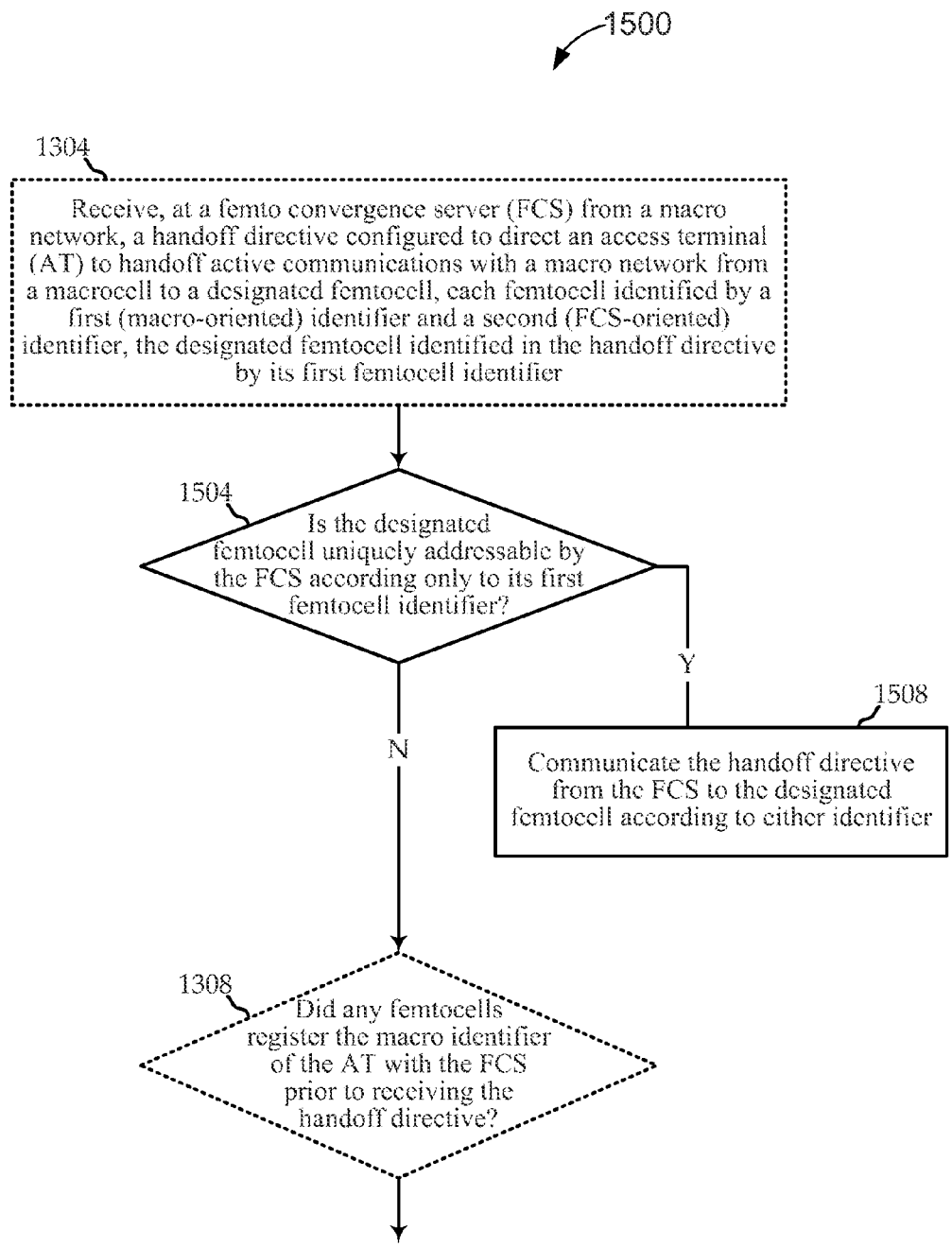
FIG. 15 shows a flow diagram of an exemplary method for determining when to implement certain portions of the method of FIG. 14.

In some embodiments, portions of the methods described above (e.g., method 1300 of FIG. 13) are only performed when the designated FAP 230 cannot otherwise be uniquely identified. For example, FIG. 15 shows a flow diagram of an exemplary method 1500 for determining when to implement certain portions of the method 1300 of FIG. 13. The method 1500 is shown in the context of stage 1304 of FIG. 13 for added clarity, such that a handoff request has been received at the FCS 640 from the macro network 100.

The method 1500 begins at stage 1504 by determining whether the designated FAP 230 (designated by the received handoff request) is uniquely addressable by the FCS 640 according only to its first femtocell identifier. For example, in some cases, the FCS 640 may only be connected to a single FAP 230 associated with the first femtocell identifier received as part of the handoff request). Alternatively, the FCS 640 may be able to narrow down the scope of possible matches according to other information. For example, knowledge of a general or specific location of the AT 115 (e.g., according to its current macro BTS 105, a recent GPS measurement, etc.), the set of possible FAPs 230 may be limited, such that only a single match remains.

If it is determined at stage 1504 that the designated FAP 230 is uniquely addressable by the FCS 640 according only to its first femtocell identifier, the handoff request may be communicated from the FCS 640 to the designated FAP 230 at stage 1508. According to one technique, the hand-in could be treated substantially like a typical macro-to-macro handoff using the substantially unique first femtocell identifier. According to another technique, the FCS 640 could address the FAP 230 according to its second femtocell identifier, for example, according to stage 1332 of FIG. 13. If it is determined at stage 1504 that the designated FAP 230 is not uniquely addressable by the FCS 640 according only to its first femtocell identifier, it may be necessary or desirable to determine an appropriate FAP 230 for the hand-in according to other techniques. For example, the method 1500 may proceed according to the method 1300 of FIG. 13.

Figure 16:
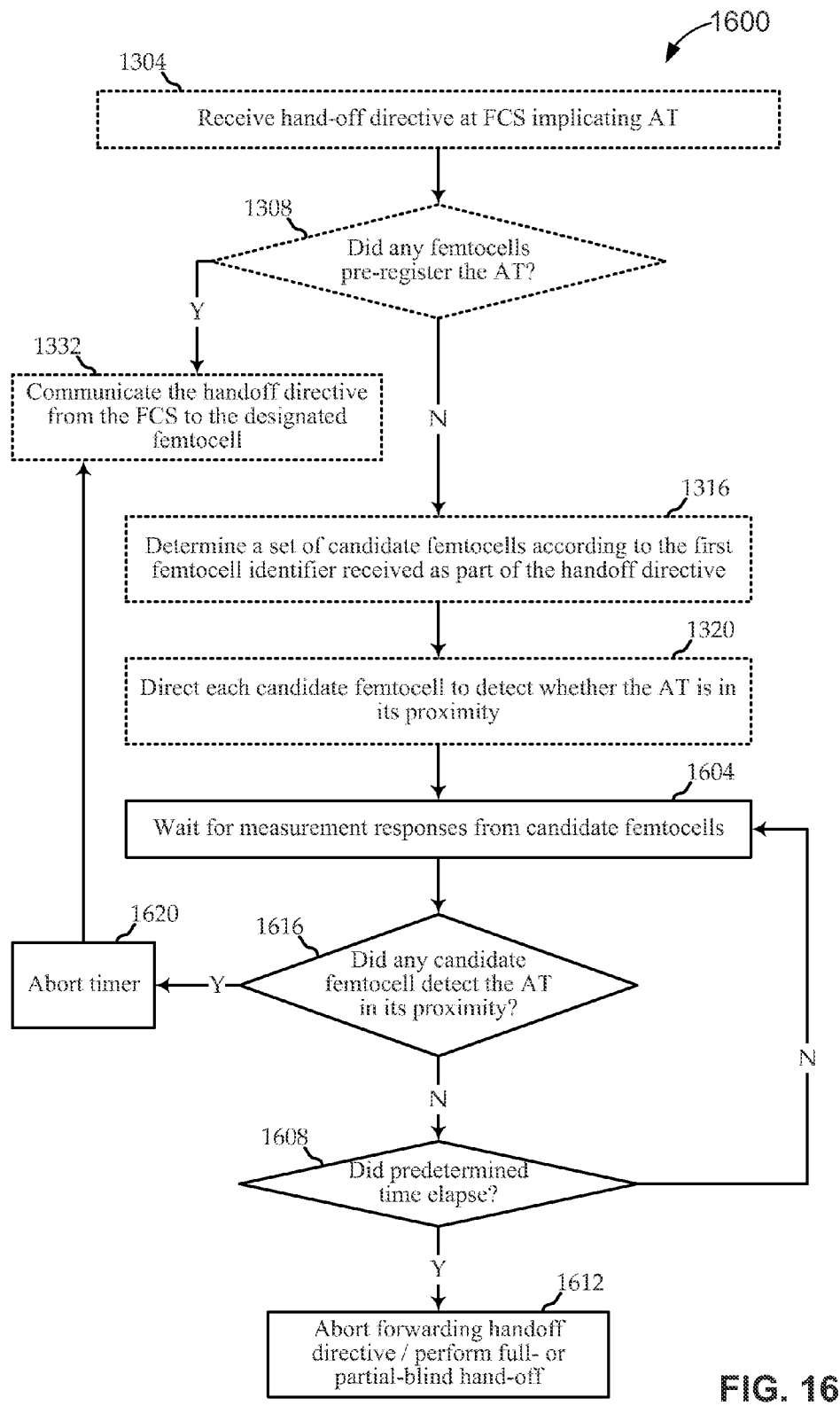
FIG. 16 shows a flow diagram of an exemplary method for adding certain functionality to the method of FIG. 14.

FIG. 16 shows a flow diagram of an exemplary method 1600 for adding certain functionality to the method 1300 of FIG. 13. The method 1600 is shown in the context of portions of the method 1300 of FIG. 13 for added clarity. For the sake of context, it is assumed that a handoff request is received at the FCS 640 implicating a designated AT 115 (e.g., according to stage 1304), and that there was no pre-registration of the AT 115 (e.g., according to the determination of stage 1308). A set of candidate FAPs 230 is determined (e.g., according to stage 1316), and each candidate is directed to detect the AT 115 in its proximity (e.g., according to stage 1320).

At stage 1604, the FCS 640 waits for a measurement response from the candidate FAPs 230. For example, as described above, the measurement response may be a detection successful or detection unsuccessful message, a registration message, etc. In some embodiments, a timer is initiated (or time is otherwise monitored) to determine how much time has elapsed since the measurement requests were communicated to the candidate FAPs 230. If the timer elapses prior to receiving a successful response from any of the candidate femtocells, the method 1600 may abort.

At stage 1616, a determination may be made as to whether any candidate FAPs 230 have detected the AT 115 in their proximity. For example, the determination at stage 1616 may involve determining whether any or all of the measurement responses have been received. If one of the candidate FAPs 230 is determined at stage 1616 to have detected the AT 115 in its proximity, the method 1600 may abort the timer at stage 1620. The handoff request may then be communicated to the successful FAP 230. For example, the communication to the successful FAP 230 may be implemented according to stage 1332 of FIG. 13.

If none of the candidate FAPs 230 is determined at stage 1616 to have detected the AT 115 in their proximity, the method 1600 may continue to wait for a detection. For example, a further determination at stage 1608 is made as to whether a predetermined amount of time has elapsed. If it is determined at stage 1608 that the predetermined amount of time has elapsed, it may be assumed that none of the FAPs 230 detected the AT 115 in their proximity (i.e., none of the femtocells has detected the AT in its proximity according to stage 1616, and the timer has elapsed at stage 1608). Accordingly, at stage 1612, the handoff request can be ignored or otherwise handled. For example, any forwarding of the handoff request can be aborted, a blind hand-off may be implemented by the FCS 640, etc.

If it is determined at stage 1608 that the predetermined amount of time has not elapsed, the method 1600 may continue to iterate through stages 1604, 1616, and 1608 until either the predetermined time elapses at stage 1608 or detection is determined at stage 1616. Notably, if messages from all the candidate FAPs 230 are received as unsuccessful, the method 1600 may abort (e.g., the timer may abort).

Figure 17:
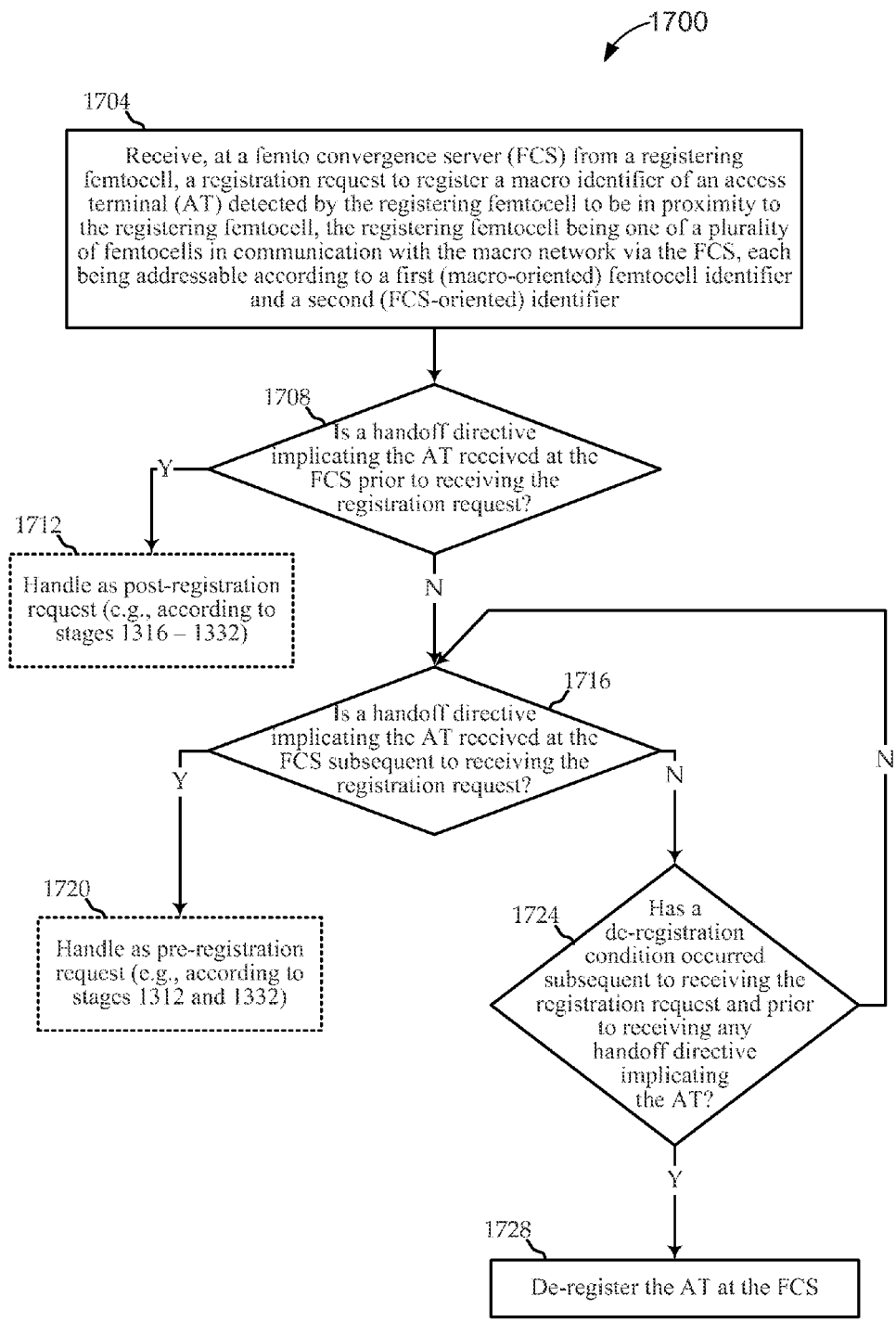
FIG. 17 shows a flow diagram of an exemplary method for handling receipt of handoff requests and registration requests at an FCS in various orders and in various contexts.

In some cases, handoff requests and/or registration requests are treated differently by the FCS 640 according to an order in which they are received and/or occurrences of other events. For example, FIG. 17 shows a flow diagram of an exemplary method 1700 for handling receipt of handoff requests and registration requests at an FCS 640 in various orders and in various contexts. The method 1700 begins at stage 1704 by receiving a registration request at an exemplary FCS 640 from a registering FAP 230. The registration request intends to register a cell identifier of an AT 115 detected by the registering FAP 230 to be in proximity to the registering FAP 230. The registering FAP 230 is one of a number of FAPs 230 in communication with the macro network 100 via the FCS 640, and each FAP 230 is addressable, as described above, according to a first (macro-oriented, substantially non-unique) femtocell identifier and a second (FCS-oriented, substantially unique) identifier.

At stage 1708, a determination is made as to whether a handoff request implicating the AT 115 (e.g., directing handoff of the AT 115 from a macro BTS 105 to a designated FAP 230, for example, according to stage 1304 of FIG. 13) is received at the FCS 640 prior to receiving the registration request. If it is determined at stage 1708 that the handoff request is received at the FCS 640 prior to receiving the registration request, the registration request may be considered as a post-registration condition at block 1712. For example, the hand-in may be handled as described above with reference to stages 1316-1332 of FIG. 13.

If it is determined at stage 1708 that no corresponding handoff request was received at the FCS 640 prior to receiving the registration request, a determination is made at stage 1716 as to whether any handoff request implicating the AT 115 has been received at the FCS 640 subsequent to receiving the registration request. For example, whenever there is a registration request, there may be three possible scenarios: the registration request is received subsequent to a corresponding handoff request (e.g., post-registration), the registration request is received prior to a corresponding handoff request (e.g., pre-registration), or the registration request is received without receiving a corresponding handoff request (e.g., ever or prior to some other condition, as described below).

If it is determined at stage 1716 that a corresponding handoff request is received at the FCS 640 subsequent to receiving the registration request, this may be considered at stage 1720 substantially as the same pre-registration condition discussed in stage 1308 of FIG. 13 (i.e., the OOB presence indication will have been received by the FCS 640 prior to receiving the handoff request). As such, the designated FAP 230 is determined to be the registering FAP 230 (e.g., according to stage 1312), and the handoff request may be communicated from the FCS 640 to the designated FAP 230 (i.e., the registering FAP) according to its second femtocell identifier (e.g., according to stage 1332).

If it is determined at stage 1716 that a corresponding handoff request has not been received at the FCS 640 subsequent to receiving the registration request, the method 1700 may continue to wait for a corresponding handoff request either until one is received or some other condition occurs to abort the waiting. At stage 1724, a further determination is made as to whether a de-registration condition occurred subsequent to receiving the registration request and prior to receiving any handoff request implicating the AT 115.

For example, if it is determined at stage 1724 that no de-registration condition has occurred subsequent to receiving the registration request and prior to receiving any handoff request implicating the AT 115, the method may continue to wait by iterating through stages 1716 and 1724 until either a corresponding handoff request is received at stage 1716 or a de-registration condition occurs at stage 1724. If it determined at stage 1724 that a de-registration condition occurred subsequent to receiving the registration request and prior to receiving any handoff request implicating the AT 115, the AT 115 may be de-registered at stage 1728, as described above.

According to various embodiments, different types of de-registration conditions may occur. For example, similar de-registration conditions may be evaluated from the FCS 640 perspective as from the FAP 230 perspective. As discussed above with reference to FIG. 11, de-registration conditions may relate to determining whether a timestamped registration request has been superceded, whether a predetermined amount of time has elapsed since the registration message was received, whether an OOB communications link between the OOB femto-proxy 240 and the registered AT 115 has been lost, etc.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for macrocell-to-femtocell hand-in, the method comprising:
   detecting, with a femto-proxy system, an access terminal in proximity to the femto-proxy system and communicatively coupled with a macro network via a macrocell, the femto-proxy system comprising an out-of-band (OOB) femto-proxy and a femtocell communicatively coupled with the macro network via a femto convergence system;
   establishing, by the OOB femto-proxy, an OOB communications link with the access terminal;
   communicating a service advertisement from the femtocell to the access terminal via the OOB femto-proxy;
   receiving, from the access terminal, a cell identifier identifying the access terminal on the macro network in response to the service advertisement; and
   registering the access terminal for hand-in from the macrocell to the femtocell by communicating an OOB presence indication, including at least the cell identifier, from the femtocell to the femto convergence system indicating proximity of the access terminal to the femtocell.

2. The method of claim 1, wherein detecting the access terminal in proximity to the femto-proxy system comprises:
   paging the access terminal using the OOB femto-proxy over the OOB communications link; and
   detecting a response to the paging from the access terminal using the OOB femto-proxy over the OOB communications link.

3. The method of claim 1, wherein detecting the access terminal in proximity to the femto-proxy system comprises:
   receiving a request for a network address from the access terminal using the OOB femto-proxy over the OOB communications link, the request comprising an OOB identifier of the access terminal, the OOB femto-proxy disposed as part of a subnet comprising the femtocell; and
   communicating the request for the network address to the femtocell.

4. The method of claim 3, wherein:
   the request for the network address is a Dynamic Host Configuration Protocol (DHCP) request;
   the OOB identifier of the access terminal is a MAC address; and
   communicating the request for the network address to the femtocell comprises broadcasting the DHCP request to the subnet such that the request is received at least by the femtocell.

5. The method of claim 1, further comprising:
   determining, with the femto-proxy system, whether the access terminal is authorized to access the macro network via the femtocell, wherein the registering the access terminal for hand-in from the macrocell is performed only when the access terminal is authorized to access the macro network via the femtocell.

6. The method of claim 5, further comprising:
   maintaining an access control list at the femto-proxy system comprising a list of cell identifiers corresponding to access terminals authorized to access the macro network via the femtocell, wherein determining whether the access terminal is authorized to access the macro network via the femtocell comprises determining whether the access terminal is authorized to access the macro network via the femtocell according to the access control list.

7. The method of claim 1, further comprising:
   receiving a handoff request for the access terminal at the femtocell from the femto convergence system, the handoff request being:
      configured to direct the access terminal to hand off active communications with the macro network from the macrocell to the femtocell;
      generated by the macro network according to a measurement message received from the access terminal via the macrocell; and
      communicated from the macro network to the femtocell via the femto convergence system according to the registering of the access terminal.

8. The method of claim 7, wherein the handoff request is received subsequent to registering the access terminal for hand-in from the macrocell to the femtocell.

9. The method of claim 1, further comprising:
   receiving a handoff request for the access terminal at the femtocell from the femto convergence system, wherein the handoff request is received prior to registering the access terminal for hand-in from the macrocell to the femtocell, and
   wherein detecting the access terminal comprises detecting the access terminal in response to receiving the handoff request.

10. The method of claim 9, wherein detecting the access terminal in response to receiving the handoff request comprises:
    directing the OOB femto-proxy to detect the access terminal over the OOB communications link according to an OOB identifier associated with the access terminal.

11. The method of claim 10, wherein detecting the access terminal in response to receiving the handoff request further comprises:
    using reverse link sensing to detect the access terminal according to a fixed public identifier of the access terminal.

12. The method of claim 11, wherein:
    the fixed public identifier of the access terminal is a public long code mask of the access terminal.

13. The method of claim 1, further comprising:
    detecting a loss of the OOB communications link between the access terminal and the OOB femto-proxy of the femto-proxy system; and
    de-registering the access terminal according to detecting the loss of the OOB communications link.

14. The method of claim 1, wherein the OOB presence indication comprises a timestamp corresponding to a registration time.

15. The method of claim 1, wherein detecting, with the femto-proxy system, the access terminal in proximity to the femto-proxy system comprises detecting an OOB subsystem of the access terminal using the OOB femto-proxy of the femto-proxy system over the OOB communications link.

16. The method of claim 15, wherein the OOB communications link is a Bluetooth link and the OOB identifier is a Bluetooth device address.

17. The method of claim 15, wherein the OOB communications link is a WiFi link and the OOB identifier is a WiFi MAC address.

18. The method of claim 1, wherein the femtocell is one of a plurality of femtocells on the macro network each having a first femtocell identifier according to which the femtocell is non-uniquely addressable by the macro network and a second femtocell identifier according to which the femtocell is uniquely addressable by the femto convergence system.

19. The method of claim 18, wherein the first femtocell identifier is a PN offset of the femtocell.

20. The method of claim 1, wherein the cell identifier of the access terminal is an International Mobile Subscriber Identity (IMSI) associated with the access terminal.

21. The method of claim 1, wherein:
    the femtocell is configured to communicatively couple with the access terminal over a femto range;
    the OOB femto-proxy is configured to communicatively couple with the access terminal over an OOB range; and
    the OOB range exceeds the femto range.

22. A femto-proxy system comprising:
    a femtocell, communicatively coupled with a macro network via a femto convergence system and configured to provide macro network access to access terminals;
    an out-of-band (OOB) femto-proxy, communicatively coupled with the femtocell and configured to communicate with the access terminals over OOB communications links; and
    a communications management subsystem, communicatively coupled with the femtocell and the OOB femto-proxy, and configured to:
        detect a proximate access terminal that is in its proximity and communicatively coupled with the macro network via a macrocell;
        establish, by the OOB femto-proxy, an OOB communications link with the proximate access terminal;
        communicating a service advertisement from the femtocell to the proximate access terminal via the OOB femto-proxy;
        receive, from the proximate access terminal, a cell identifier identifying the proximate access terminal on the macro network in response to the service advertisement; and
        register the proximate access terminal for hand-in from the macrocell to the femtocell by communicating an OOB presence indication, including at least the cell identifier, from the femtocell to the femto convergence system indicating proximity of the proximate access terminal to the femtocell.

23. The femto-proxy system of claim 22, the communications management subsystem further configured to:
    receive a handoff request for the proximate access terminal at the femtocell from the femto convergence system, the handoff request being:
        configured to direct the proximate access terminal to hand off active communications with the macro network from the macrocell to the femtocell;
        generated by the macro network according to a measurement message received from the proximate access terminal via the macrocell; and
        communicated from the macro network to the femtocell via the femto convergence system according to the registering of the proximate access terminal.

24. The femto-proxy system of claim 23, wherein the handoff request is received subsequent to registering the proximate access terminal for hand-in from the macrocell to the femtocell.

25. The femto-proxy system of claim 22, the communications management subsystem further configured to:
    receive a handoff request for the proximate access terminal at the femtocell from the femto convergence system, wherein the handoff request is received prior to registering the proximate access terminal for hand-in from the macrocell to the femtocell, and
    wherein the communications management subsystem is configured to detect the proximate access terminal in response to receiving the handoff request.

26. The femto-proxy system of claim 22, the communications management subsystem further configured to:
    detect a loss of the OOB communications link between the proximate access terminal and the OOB femto-proxy; and
    de-register the proximate access terminal according to detecting the loss of the OOB communications link.

27. The femto-proxy system of claim 22, the communications management subsystem configured to detect the proximate access terminal by:
    paging the proximate access terminal using the OOB femto-proxy over the OOB communications link; and
    detecting a response to the paging from the access terminal using the OOB femto-proxy over the OOB communications link.

28. The femto-proxy system of claim 22, the communications management subsystem configured to detect the proximate access terminal by:
    receiving a request for a network address from the proximate access terminal using the OOB femto-proxy over the OOB communications link, the OOB femto-proxy disposed as part of a subnet comprising the femtocell; and
    communicating the request for the network address to the femtocell.

29. A processor for macrocell-to-femtocell hand-in in a femto-proxy system comprising a femtocell communicatively coupled with a macro network via a femto convergence system, and an out-of-band (OOB) femto-proxy configured to communicate over OOB communications links, the processor comprising:
    a communications management controller configured to:
        detect a proximate access terminal that is in its proximity and communicatively coupled with the macro network via a macrocell;
        establish, by the OOB femto-proxy, an OOB communications link with the proximate access terminal;

communicate a service advertisement from the femtocell to the proximate access terminal via the OOB femto-proxy;

receive, from the proximate access terminal, a cell identifier identifying the proximate access terminal on the macro network in response to the service advertisement; and register the proximate access terminal for hand-in from the macrocell to the femtocell by communicating an OOB presence indication, including at least the cell identifier, from the femtocell to the femto convergence system indicating proximity of the proximate access terminal to the femtocell.

30. The processor of claim 29, the communications management controller further configured to:

receive a handoff request for the proximate access terminal at the femtocell from the femto convergence system, the handoff request being:

configured to direct the proximate access terminal to hand off active communications with the macro network from the macrocell to the femtocell;

generated by the macro network according to a measurement message received from the proximate access terminal via the macrocell; and communicated from the macro network to the femtocell via the femto convergence system according to the registering of the proximate access terminal.

31. The processor of claim 30, the communications management controller further configured to:

detect a loss of the OOB communications link between the proximate access terminal and the OOB femto-proxy; and de-register the proximate access terminal according to detecting the loss of the OOB communications link.

32. A computer program product residing on a processor-readable medium and comprising processor-readable instructions, which, when executed, cause a processor to perform steps comprising:

detecting, with a femto-proxy system, an access terminal in proximity to the femto-proxy system and communicatively coupled with a macro network via a macrocell, the femto-proxy system comprising an out-of-band (OOB) femto-proxy and a femtocell communicatively coupled with the macro network via a femto convergence system;

establishing, by the OOB femto-proxy, an OOB communications link with the access terminal;

communicating a service advertisement from the femtocell to the access terminal via the OOB femto-proxy;

receiving, from the access terminal, a cell identifier identifying the access terminal on the macro network in response to the service advertisement; and directing the femtocell to register the access terminal for hand-in from the macrocell to the femtocell by communicating an OOB presence indication, including at least the cell identifier, from the femtocell to the femto convergence system indicating proximity of the access terminal to the femtocell.

33. The computer program product of claim 32, the processor-readable instructions, when executed, causing a processor to perform steps further comprising:

receiving a handoff request for the access terminal via the femtocell from the femto convergence system, the handoff request being:

configured to direct the access terminal to hand off active communications with the macro network from the macrocell to the femtocell;

generated by the macro network according to a measurement message received from the access terminal via the macrocell; and communicated from the macro network to the femtocell via the femto convergence system according to the registering of the access terminal.

34. The computer program product of claim 32, the processor-readable instructions, when executed, causing a processor to perform steps further comprising:

detecting a loss of the OOB communications link between the access terminal and the OOB femto-proxy of the femto-proxy system; and directing the femtocell to de-register the access terminal according to detecting the loss of the OOB communications link.

35. A system for macrocell-to-femtocell hand-in comprising:

means for detecting an access terminal in proximity to a femto-proxy system and communicatively coupled with a macro network via a macrocell, the femto-proxy system comprising an out-of-band (OOB) femto-proxy and a femtocell communicatively coupled with the macro network via a femto convergence system;

means for establishing, by the OOB femto-proxy, an OOB communications link with the access terminal;

means for communicating a service advertisement from the femtocell to the access terminal via the OOB femto-proxy;

means for receiving, from the access terminal, a cell identifier identifying the access terminal on the macro network in response to the service advertisement; and means for directing the femtocell to register the access terminal for hand-in from the macrocell to the femtocell by communicating an OOB presence indication, including at least the cell identifier, from the femtocell to the femto convergence system indicating proximity of the access terminal to the femtocell.

36. The system of claim 35, further comprising:

means for receiving a handoff request for the access terminal via the femtocell from the femto convergence system, the handoff request being:

configured to direct the access terminal to handoff active communications with the macro network from the macrocell to the femtocell;

generated by the macro network according to a measurement message received from the access terminal via the macrocell; and communicated from the macro network to the femtocell via the femto convergence system according to the registering of the access terminal.

37. The system of claim 35, further comprising:

means for detecting a loss of the OOB communications link between the access terminal and the OOB femto-proxy of the femto-proxy system; and means for directing the femtocell to de-register the access terminal according to detecting the loss of the OOB communications link.

* * * * *